United States Patent [19]

Gavril

[11] 4,004,277
[45] Jan. 18, 1977

[54] SWITCHING SYSTEM FOR NON-SYMMETRICAL SHARING OF COMPUTER PERIPHERAL EQUIPMENT

[76] Inventor: Bruce D. Gavril, 444 E. 75th St., New York, N.Y. 10021

[22] Filed: May 5, 1975

[21] Appl. No.: 574,585

Related U.S. Application Data

[63] Continuation-in-part of Ser. No. 474,196, May 29, 1974, abandoned, which is a continuation of Ser. No. 234,185, March 13, 1972, abandoned.

[52] U.S. Cl. .......................................... 340/172.5
[51] Int. Cl.² ......................................... G06F 3/04
[58] Field of Search ................... 340/172.5; 445/1; 444/1

[56] References Cited

UNITED STATES PATENTS

| | | | |
|---|---|---|---|
| 3,214,739 | 10/1965 | Gountanis et al. | 340/172.5 |
| 3,253,262 | 5/1966 | Wilenitz et al. | 340/172.5 |
| 3,274,561 | 9/1966 | Hallman et al. | 340/172.5 |
| 3,510,844 | 5/1970 | Aranyi et al. | 340/172.5 |
| 3,593,302 | 7/1971 | Saito et al. | 340/172.5 |
| 3,623,014 | 11/1971 | Doelz et al. | 340/172.5 |
| 3,634,830 | 1/1972 | Baskin | 340/172.5 |
| 3,641,505 | 2/1972 | Artz et al. | 340/172.5 |
| 3,680,052 | 7/1972 | Arulpragasam et al. | 340/172.5 |
| 3,702,462 | 11/1972 | England | 340/172.5 |
| 3,771,134 | 11/1973 | Huettner et al. | 340/172.5 |

Primary Examiner—Melvin B. Chapnick
Attorney, Agent, or Firm—Peter L. Berger

[57] ABSTRACT

Switching apparatus and methods are disclosed by which one or more secondary computers of a loosely-coupled multiprocessing system may communicate directly with selected items of active peripheral equipment of a main computer of the system. This invention, which is an improvement over device-sharing means and indirect-accessing methods of the prior art, may be applied to existing computer systems without modification to any element of their hardware and without modification to the operating system software of the main computer. An essentially autonomous "intelligent switch," connected to an input/output interface (bus) of each processor and completely transparent to the main processor, is used to switch one or more items of operating peripheral equipment from the main computer to a secondary computer in response to asynchronous service requests from the secondary computer. Two modes of operation are provided: Interface Capture and Data Capture. Interface Capture provides a means for temporarily borrowing items of peripheral equipment having off-line operating capabilities, such as buffered line-printers, and is performed during a normal off-line operation of such equipment. With Interface Capture, the requesting secondary computer obtains complete control of the captured item of peripheral equipment for an arbitrary period of time. Data Capture, on the other hand, is designed for use primarily with direct-access auxiliary storage devices and is performed while a device is executing a read or write operation initiated by the main computer. Data Capture provides a secondary computer with the means for directly accessing shared data space in auxiliary storage without, however, requiring the secondary computer to duplicate or replicate the access-method software and input/output hardware capabilities of the main computer system. Instead, the secondary computer draws parasitically upon the hardware and software resources of the main computer to access the requested data space. Unlike indirect-accessing methods of the prior art, however, this is accomplished without burdening the main processor, its main storage, and its input/output channels with the overhead tasks of buffering data blocks and dispatching data to or from the requesting secondary computer.

119 Claims, 11 Drawing Figures

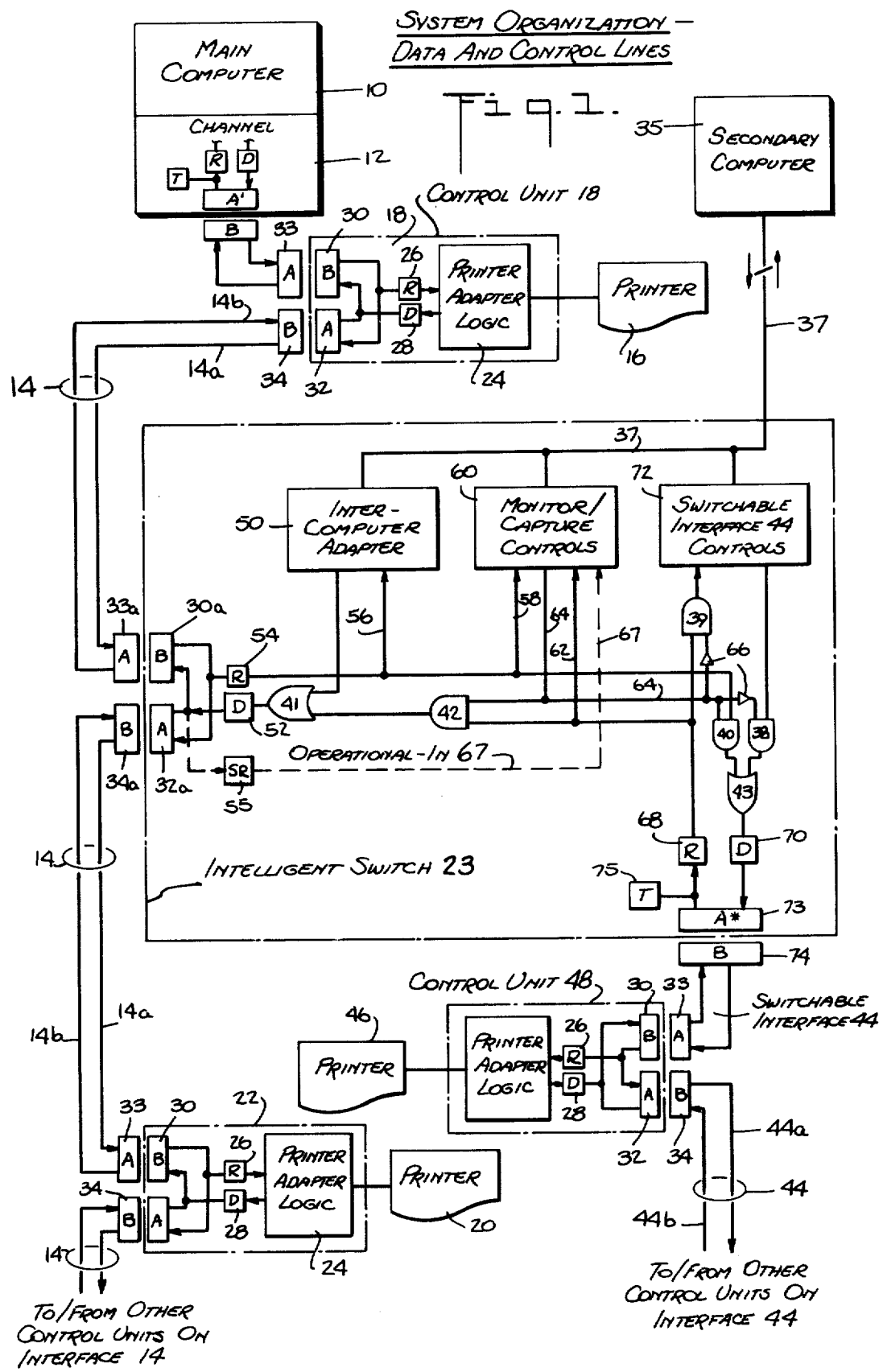

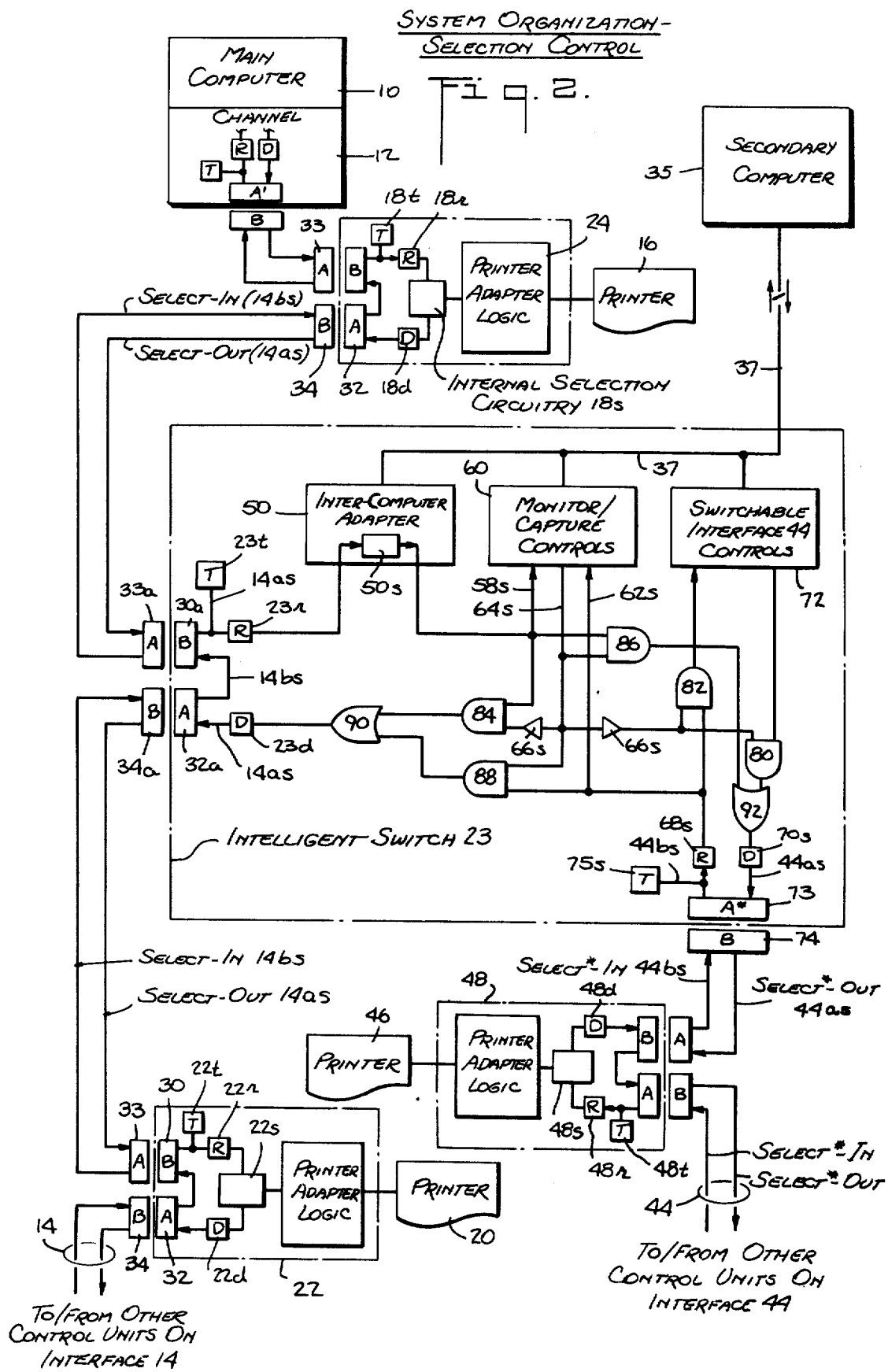

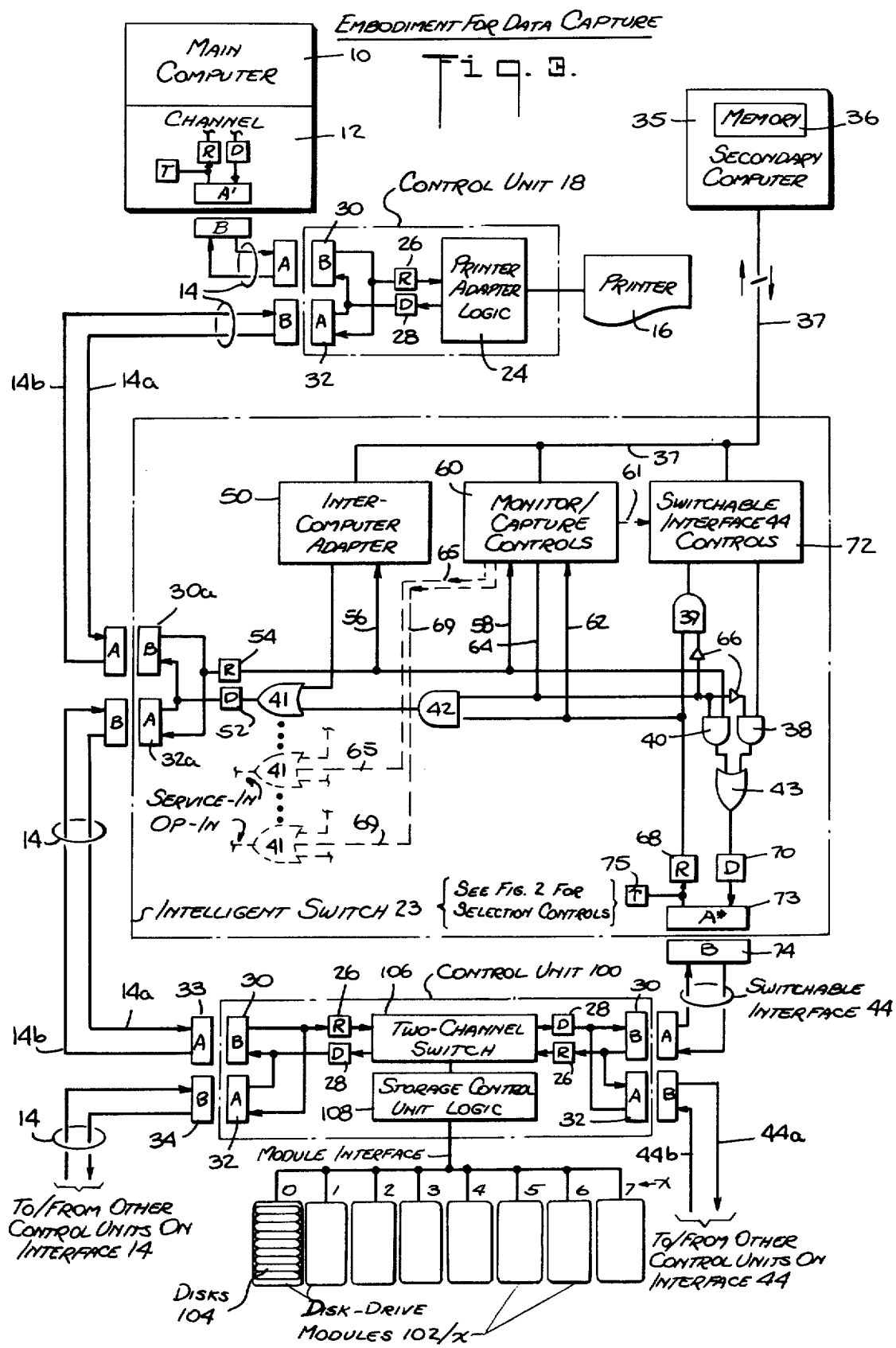

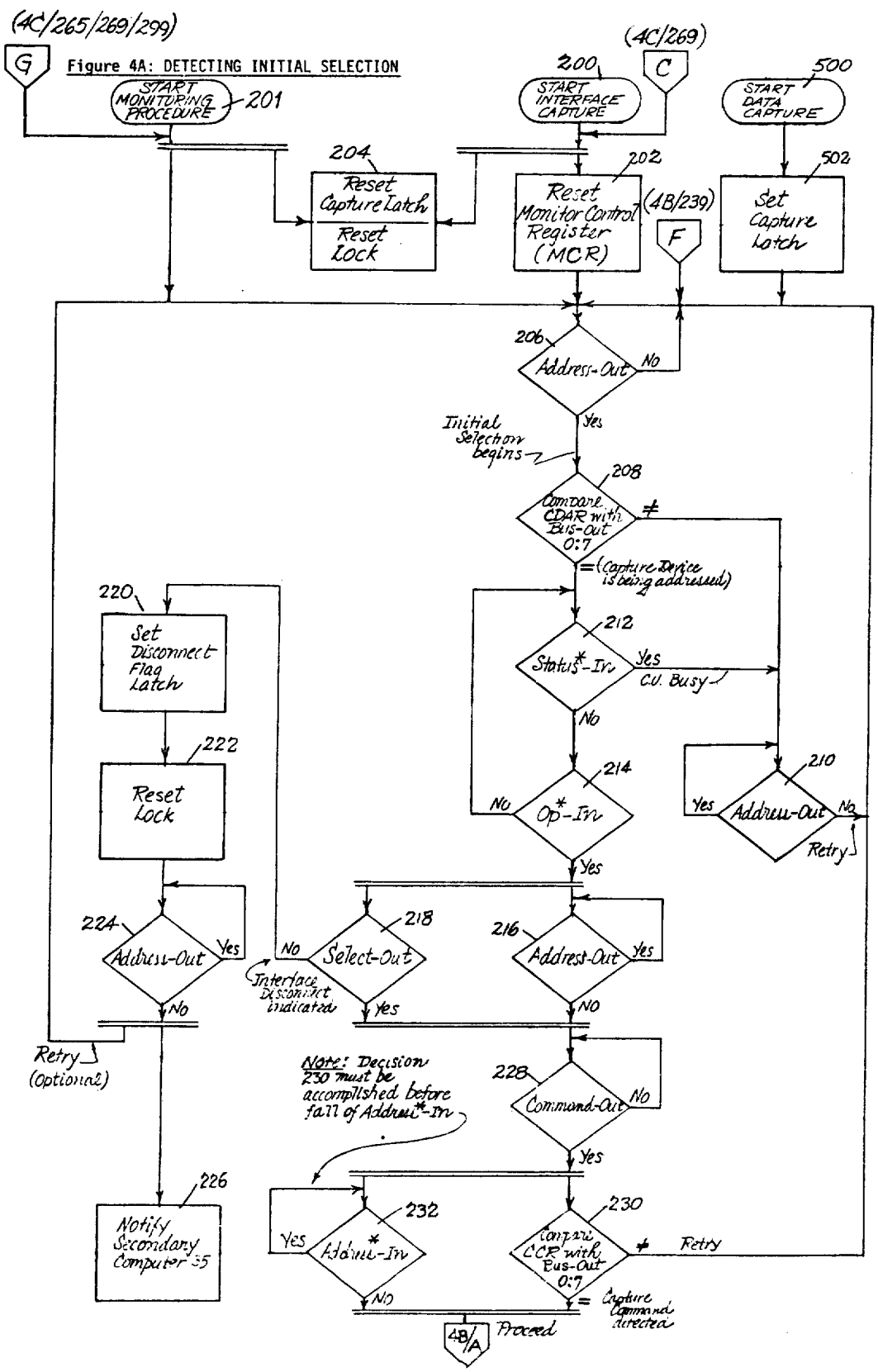

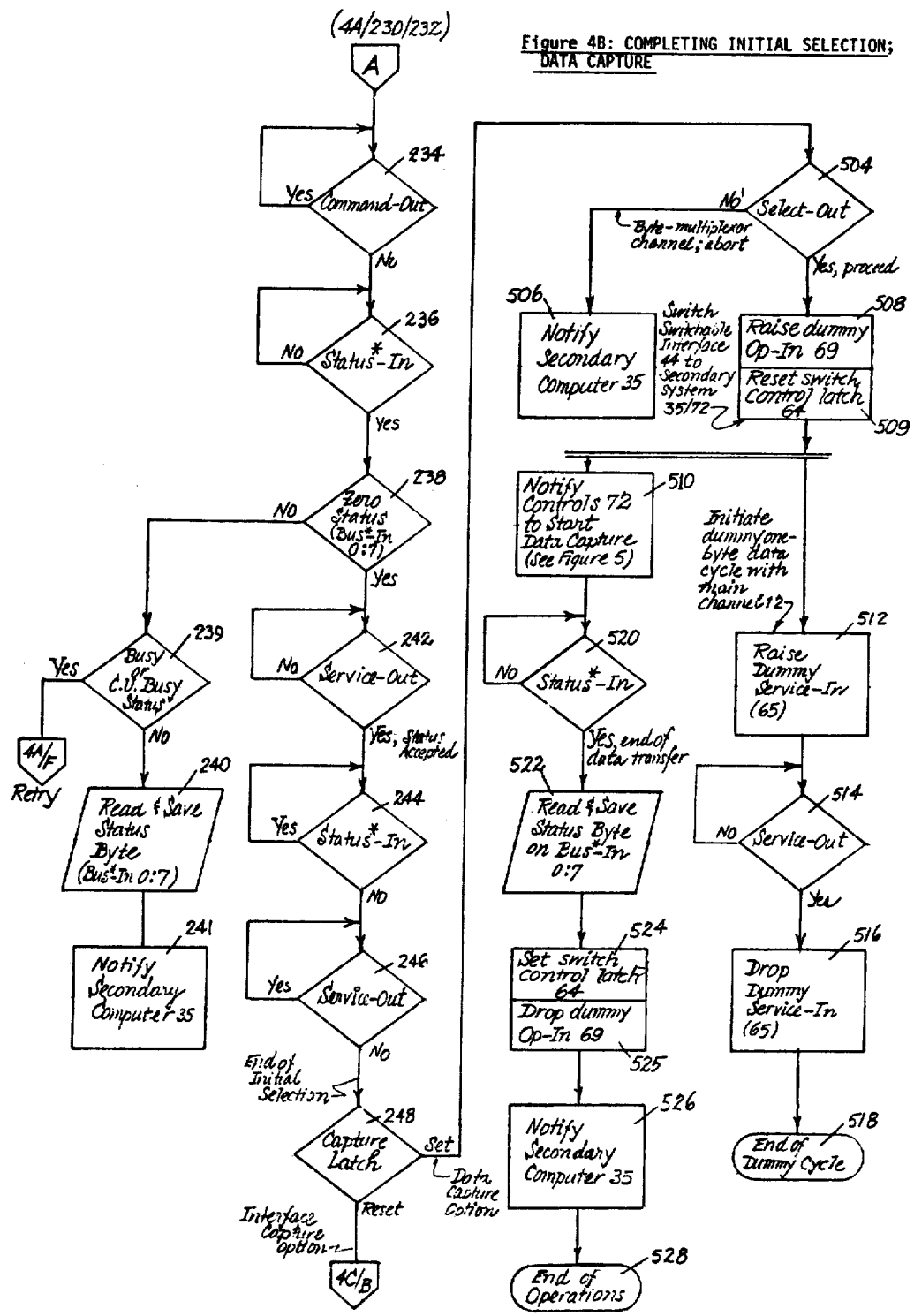

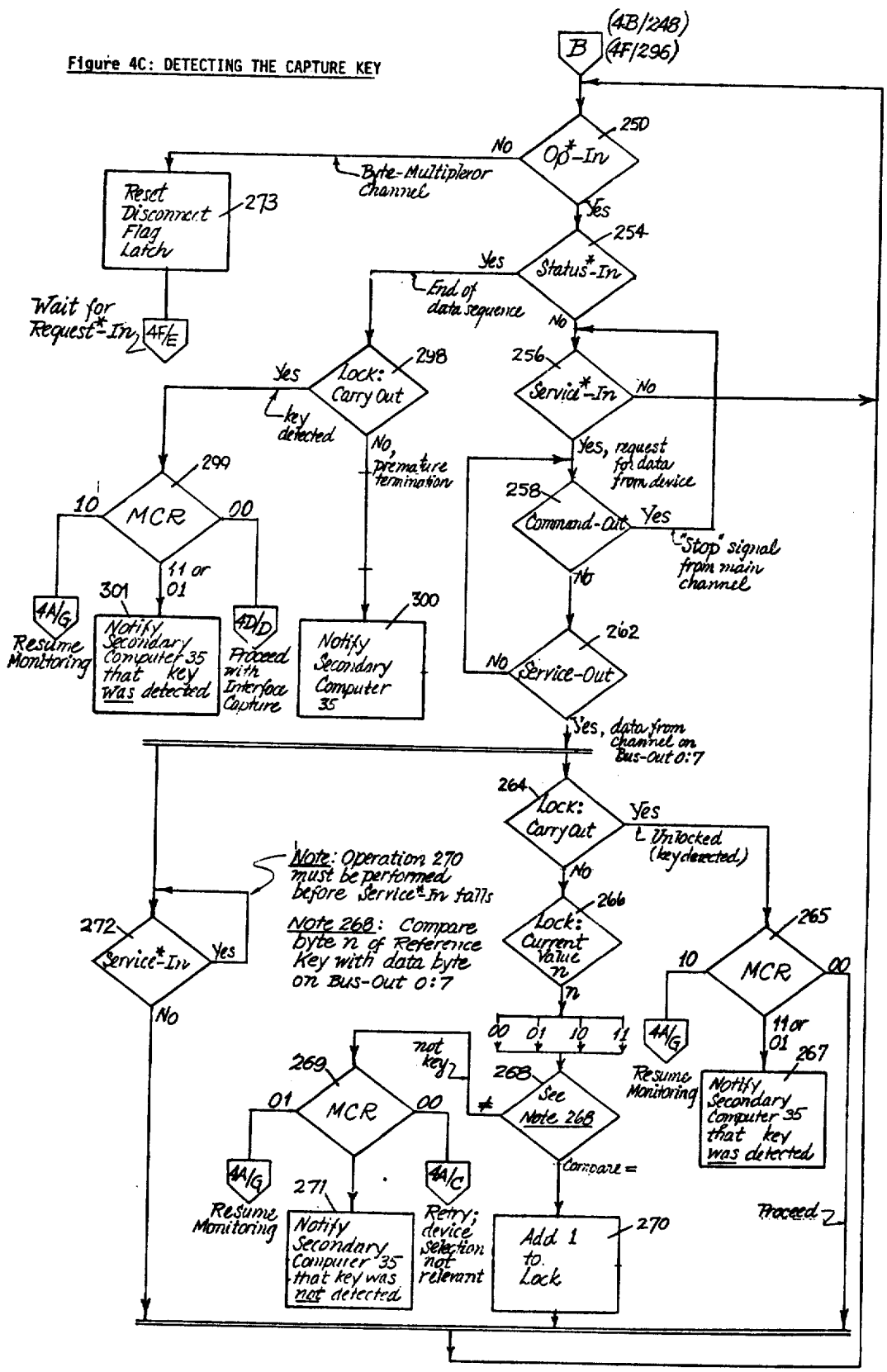
Figure 4C: DETECTING THE CAPTURE KEY

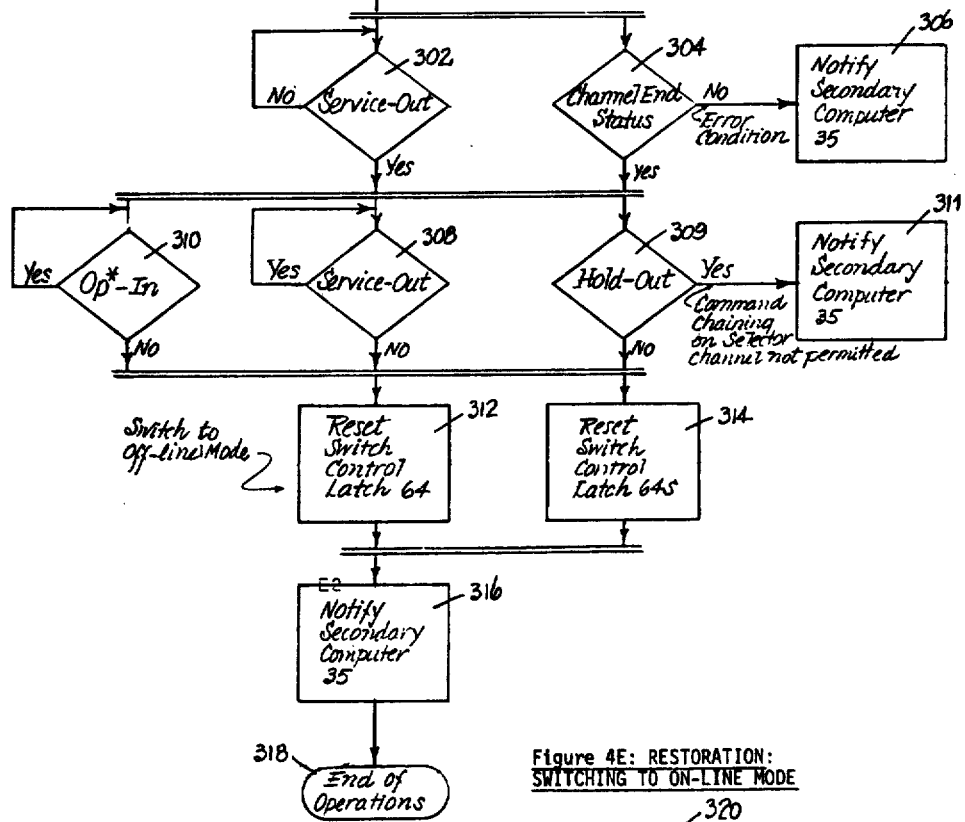
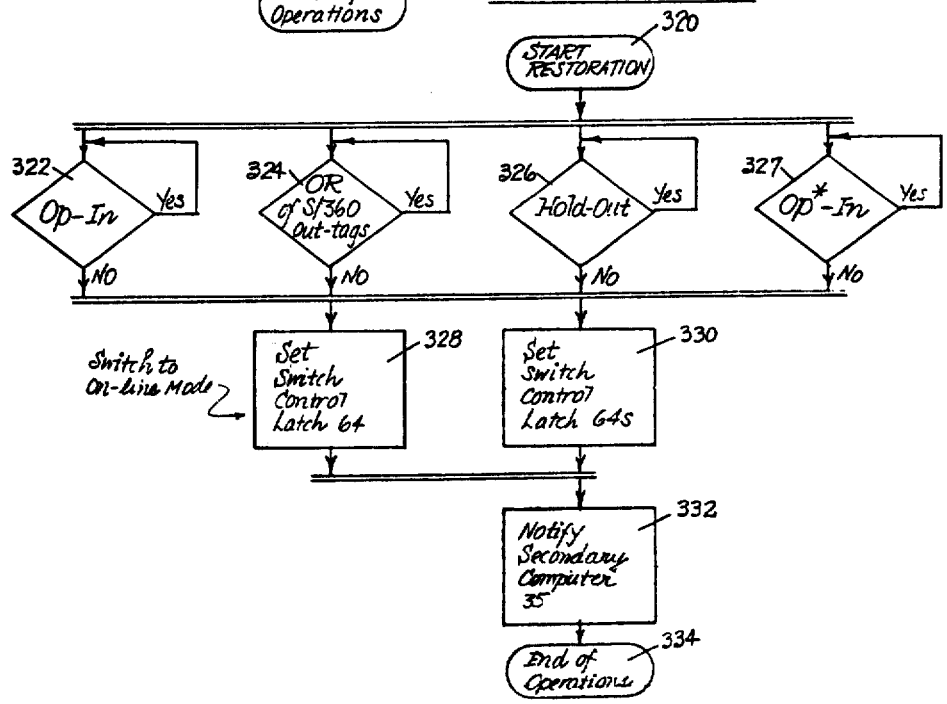

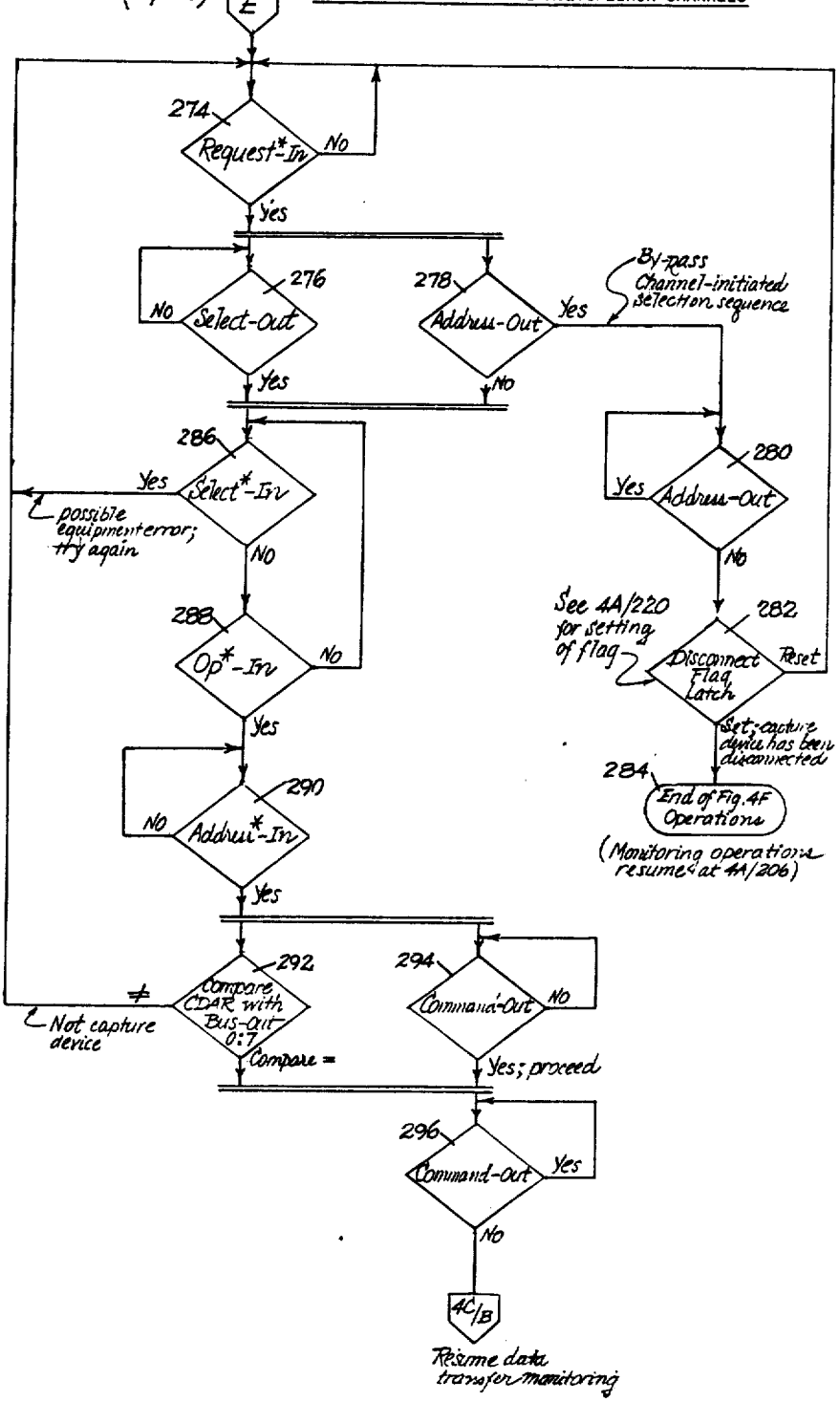

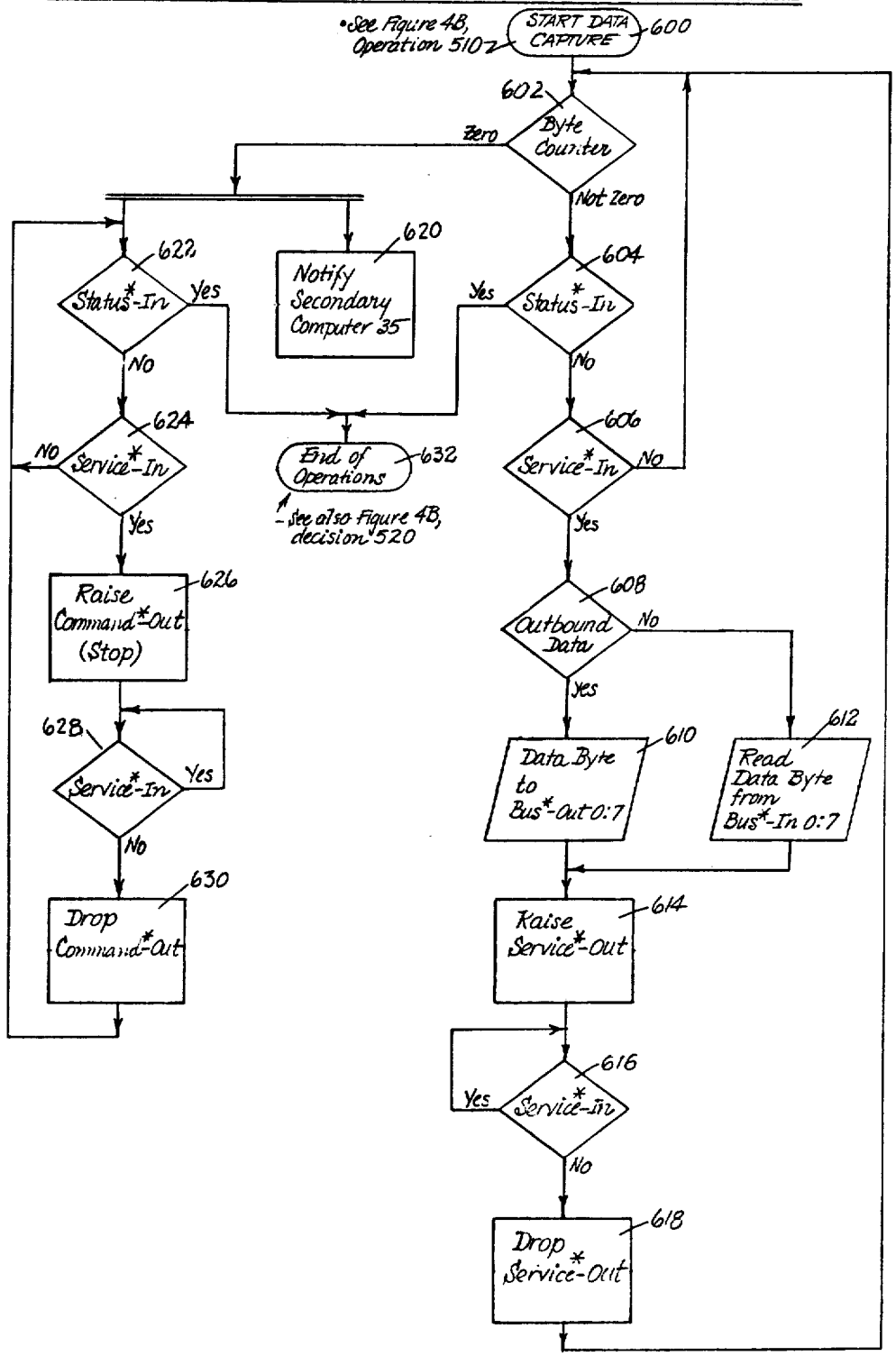
Figure 5: OPERATION OF THE SWITCHABLE INTERFACE CONTROLS 72 DURING DATA CAPTURE

SWITCHING SYSTEM FOR NON-SYMMETRICAL SHARING OF COMPUTER PERIPHERAL EQUIPMENT

This application is a continuation-in-part of application Ser. No. 474,196, filed May 29, 1974, said application Ser. No. 474,196 itself being a continuation of application Ser. No. 234,185, filed Mar. 13, 1972. Both applications Ser. No. 474,196 and 234,185 have been abandoned.

This invention relates in general to the non-symmetrical sharing of peripheral equipment by two or more computer systems and, in particular, to the dynamic capture by a secondary computer system of selected items of peripheral equipment of a main computer system. More particularly, this invention describes apparatus and techniques for temporarily switching selected items of active peripheral equipment of a main computer system to the control of and use by a secondary computer system without stopping the main computer system, without disturbing its normal operating capability, without requiring prior alteration of its hardware or operating system software to accommodate the invention, and, for one of the operational modes of the invention, without requiring implementation at the secondary computer of full-function input-/output control facilities for communicating with the shared items of mainframe peripheral equipment. The apparatus and techniques of this invention also enable the secondary computer system to share data space in auxiliary storage devices organized and controlled by the main computer system without requiring duplication at the secondary computer of the access-method software of the main computer and without the limitations and disadvantages of prior-art indirect-accessing methods.

BACKGROUND OF THE INVENTION

A basic computer system consists of a central processing unit (CPU), main storage, and various items of peripheral equipment such as input/output devices (printers, card readers, etc.) and auxiliary storage devices (magnetic tape, magnetic disk, etc.). If a computer system consists of two or more interconnected CPUs that can communicate without manual intervention, it is called a multiprocessing system. The activities of such multiple processors can be highly coordinated with one another, or they can be relatively independent.

If an item of peripheral equipment can communicate directly with more than one processor—whether of a multiprocessing system or not—and if it can do so without manual intervention, such an item of peripheral equipment is said to be "shared" by such processors. The sharing of peripheral equipment by multiple processors thus gives each of such processors essentially independent access to the shared devices. Shared peripheral equipment can be used, therefore, to permit one CPU to backup another, to provide a means for CPU-to-CPU communication and for sharing of data in multiprocessing systems (through sharing of auxiliary storage devices), and/or to provide a common pool of peripheral equipment for use by two or more active processors—particularly in multiprocessing systems. Since the costs of CPUs are decreasing, relative to the costs of electro-mechanical peripheral equipment, and since the costs of creating, accessing, and maintaining large data bases are high, these latter two applications of shared peripheral equipment are of particular importance—and it is to these applications this invention is primarily related.

Shared peripheral equipment can be used in multiprocessing systems of various types. It can, for example, be used with highly coordinated processors to facilitate distributed, concurrent processing, or it can be used with relatively independent processors simply to make the peripheral equipment resources of one system available to another. In either case, peripheral equipment can be more efficiently utilized than with single-processor systems, and it is not necessary for any one computer to be used as an input/output control processor and data transfer buffer for the other processors of the multiprocessing system with an attendant elimination or avoidance of concomitant overhead at such a computer.

Independent of the application, however, the sharing of peripheral equipment always requires a switching means for automatically connecting each item of shared peripheral equipment to the appropriate CPU at the appropriate time. And it is a particular form of this switching means, i.e., a new switching architecture, that is the specific subject of this invention.

Description of the Prior Art

Existing, commercially available switching means for sharing computer peripheral equipment are illustrated by so-called "two-channel switches" found in certain IBM control units and, specifically, by the two-channel switch feature of the IBM 2314 Direct Access Storage Facility (Reference 5). Though this type of switch is program-controlled and therefore permits dynamic switching of its associated peripheral equipment, it nevertheless has several significant disadvantages relative to the scope and purpose of this invention:

1. It is device-resident—each item of shared peripheral equipment must have its own separate switch. If several devices are to be shared, this multiplies the hardware costs. Moreover, if an already installed item of non-shared peripheral equipment is to be shared, it must be modified to include the two-channel switch.
2. It is not commercially available as a standard product for all items of peripheral equipment. Thus, in order to share an item of peripheral equipment for which the two-channel switch feature is not available, it is necessary to modify the equipment—and this can be expensive. Moreover, even if the switch is available, it must for some equipment be plant-installed, thereby adding further to the cost and inconvenience of peripheral equipment modification.
3. It requires operating system software support. Inasmuch as this type of switching is dynamic, i.e., under program control, each CPU must be provided with the programs to operate the switch and, in particular, to reserve and release a shared item of peripheral equipment, and to recognize and react to status messages—as when a shared device is found to be busy with another CPU of the system. Such software is not always available, or it may be applicable only to very large computer systems.
4. The switch is completely symmetrical—each CPU to which it is attached must have the necessary hardware/software capability to control the switch and the peripheral equipment with which it is associated. Moreover, when sharing organized data space (i.e., data fields) in direct-access auxiliary storage devices, each sharing processor must have similar software facilities to access the shared data space, i.e., to locate files and records within files distributed throughout the storage devices. Device-sharing by means of the two-channel switch can therefore require a costly duplication of system resources at each of such CPUs.

Thus, while this type of switch permits automatic, dynamic sharing of peripheral equipment, it is nevertheless synonymous with a variety of disadvantages which limit its flexibility and applicability. As a result, shared peripheral equipment is found primarily in relatively large multi-processing systems consisting of processors of similar architecture supplied and supported by a single manufacturer.

Scope and Purpose of the Invention

If it were possible to share the peripheral equipment of a main computer system without the disadvantages of existing switching means, that is, without any prior constraints as to main system size, availability of device-resident switches, program support, etc., it would permit the sharing of peripheral equipment—with all its attendant advantages—to be readily and economically applied to a much larger population of main computer systems, including, in particular, small- to medium-scale systems.

Moreover, if it were possible to share selected items of peripheral equipment of a main computer system with a secondary computer system without having to duplicate at the secondary system all of the input/output hardware and software resources of the main system, such a secondary system could be smaller in scale and lower in cost than the main computer system. Such secondary system could, in turn, (1) draw upon the peripheral equipment resources of the larger system to enhance its own performance capabilities, and/or (2) it could be used to augment externally the performance and/or functional capabilities of the main computer system. In the latter role the secondary system could be used in highly coordinated way with the main computer system to which it is attached, for example, to relieve the latter input/output control tasks, or it could operate relatively independent of the main computer system, for example, as an outboard batch processor. In either case, the secondary system could be chosen for its particular suitability to the tasks it is to perform, and the resulting multiprocessing system could have significant performance and/or functional advantages over the original main computer system.

Multiprocessing systems of the above type therefore appear to be quite attractive, and, because of the large population of computer systems from which they could be created, they also appear to be of considerable commercial importance. Thus, it is to provide the means to create this type of multiprocessing system that this invention is primarily directed.

Specifically, it is a purpose of this invention to provide the switching apparatus and controls necessary to permit one or more secondary computer systems to share selected items of peripheral equipment of a main computer system 1. without requiring modification to any element of main computer system hardware including, specifically, its CPU, main storage, and any item of peripheral equipment, 2. without requiring modification to the operating system software of the main computer system.

3. without disrupting the effective input/output configuration or operating capability of the main computer system, and 4. without necessarily duplicating at the secondary computer system all of the costly hardware and software of the input/output facilities of the main computer system.

And, because auxiliary storage devices can be shared without necessarily sharing organized data space (data fields) on such devices, it is another purpose of this invention to provide means for one or more secondary computers to access directly data space organized and controlled by a main computer on shared auxiliary storage devices 1. without duplicating at the secondary computer the (ordinarily extensive and subject-to-change) access-method software of the main computer system, i.e., without introducing an overhead burden at the secondary computer associated with storing and executing fully implemented access-method software, and 2. without requiring the secondary computer to know the precise location in the shared auxiliary storage device of any particular data field it may wish to access.

The sharing of organized data space in auxiliary storage devices can, however, be accomplished alternatively by indirect-accessing methods of the prior art, that is, by methods which draw upon the existing hardware and access-method software of the main computer to access shared data space in a non-shared auxiliary storage device on behalf of a requesting secondary computer. These methods require that data be routed through the facilities of the main computer—a process which creates a variety of overhead loadings at the main computer system. It is, therefore, a further purpose of this invention to provide means for a main computer system to perform indirect-accessing services on behalf of a requesting secondary computer system without the limitations and disadvantages of prior-art indirect-accessing methods, namely 1. without using main storage space of the main computer system for buffering data in transit to/from the secondary computer system, 2. without creating interference at main storage of the main computer as data is moved from/to the file and to/from the secondary system, 3. without using the processing resources of the main computer to manage the dispatching of data to/from the secondary system, 4. without using the channels of the main computer (and requiring channel-to-channel adapters) to move data to/from the main storage of the secondary computer, and 5. without introducing buffering and dispatching time delays.

BRIEF DESCRIPTION OF THE INVENTION

This invention is here summarized, in brief, as applied to a single secondary computer system, a main computer system, and a single item of peripheral equipment of the main computer system. A complete and more general description of the invention will be found in the Description of the Preferred Embodiments.

Before proceeding, however, it will be helpful for the reader to note that the term "interface" will always be used herein to refer to a set of wires which carries data and control signals to and/or from the system with which the interface is itself associated. This usage does not, in contrast with other common usage of the term, refer to intervening hardware components which adapt one system to another. Such hardware is herein regarded to connect the interface of one system with that of another, and such hardware is herein called an "adapter".

The invention requires the use of an interface switch which is, in effect, inserted into the interface connecting the main computer system and the item of peripheral equipment to be shared with the secondary computer system. This item of peripheral equipment is herein called the "capture device." The interface switch is also connected to the secondary system and is controlled by hardware, firmware, and software associated only with the secondary computer system. The capture device is thenceforth switchable either to the main computer system (on-line mode) or to the secondary computer system (off-line mode). When the capture device is in on-line mode, the switch is entirely transparent to the main computer system so that normal operations with the device are not affected.

The invention further requires a means for CPU-to-CPU communication between the two systems, and, in the preferred embodiments, this is accomplished by adapting the secondary computer to connect and appear to the main computer system as a standard input-/output device, e.g., a card read/punch or magnetic tape device. Finally, a means for the secondary computer system to monitor the interface signalling must also be provided, and this is accomplished herein through facilities of the interface switch.

The invention then sets forth the procedures for switching the capture device in such a manner that transitions from on-line to off-line mode, and back again to on-line mode, will neither disturb the main computer nor interrupt its normal operations with the capture device. Two switching procedures are provided: (1) interface capture and (2) data capture.

The first is characterized by the transfer to the secondary computer system of full responsibility for off-line control of the capture device. In particular, the secondry system must have the hardware/software capability to perform all of the control functions associated with the unrestricted, off-line use of the shared item of peripheral equipment. Interface capture can, however, be performed only with devices having output capability and certain other characteristics.

The second switching procedure, on the other hand, can be used with any device and, moreover, is much less demanding upon the secondary computer system since off-line operation occurs only during the actual transfer of data to/from the capture device. All other control sequencing is performed by the main computer system. Thus, in effect, the secondary computer system draws parasitically upon the extensive, already existing hardware and software resources of the main computer system to perform significant tasks of device control and data management. As a consequence, the data capture procedure makes it possible for much less complex, and hence expensive, secondary processors to share mainframe peripheral equipment—but it does impose upon the main commputer system some degree of control overhead. As will be seen, however, this overhead is less than that which would be imposed by alternative indirect-accessing methods of the prior art, that is, by methods which draw upon the existing hardware and access-method software of the main computer system to perform input/output services for a requesting secondary computer.

The choice of switching procedure will depend, therefore, upon the nature of the capture device, the desired trade-off between complexity at the secondary system and operating overhead at the main computer system, and/or the application in general. But, with neither procedure can the main computer system itself directly control the switching of its peripheral equipment; and it is one of the reasons that the switching architecture of this invention is considered to be nonsymmetric.

Interface Capture

Interface capture is initiated by a request from the secondary system to the main computer system. This request can be presented at any time. The request asks the main computer system to execute an application-type program which is permanently resident in the main computer system. This program is called the "capture program". The request includes the necessary execution parameters of the capture program, and, in particular, identifies the device that is to be captured. The main computer system will eventually execute the capture program in accordance with the usual procedures and priorities provided by its operating system software.

The capture program, upon execution, causes the main computer system to perform a standard output operation on the device previously requested by the secondary computer system, i.e., the capture device. The capture program provides as output data an encoded message, called the "capture key", which, upon transmission to the capture device over the device interface, is detected by the secondary computer system which monitors all signals on the device interface. The secondary system then switches the capture device to off-line mode at the precise moment that the device itself disconnects normally from the main computer system to perform the current output operation. The device henceforth appears busy to the main computer system in the normal way, and the off-line state of the device does not, therefore disturb the main computer system. It follows that the necessary conditions for interface capture are that the capture device have output capability and the property of switching to independent, off-line operation to perform its normal functions. A typical example of such a device is a line printer which automatically switches to off-line operation as soon as its print-line buffer has been filled by the controlling CPU. Actual printing, a slow process, is performed independent of the controlling CPU.

Once the capture device has been switched to off-line mode, the secondary computer assumes full control of the device it terminates the operation in progress and thenceforth uses the device for its own purposes. Subsequent return of the capture device to on-line mode is accomplished by the secondary system, whenever desired, by placing the device in the usual state which exists at the completion of its normal off-line operation, i.e., in a state of requesting re-intervention of the controlling CPU. The interface is then switched by the secondary computer system back to on-line mode, and the device appears to the main computer system as if it had just completed a normal operation, namely the operation initiated earlier by the capture program.

The net effect of interface capture relative to the main computer system, therefore, is merely a prolongation of what appears to be the normal off-line state of the device. Since this off-line time is not measured by the main computer system, the operation is thus transparent to the main computer system and requires no modification of its hardware or operating system software.

Data Capture

Data capture is initiated in a similar way to interface capture; The secondary computer system transmits a request to the main computer system to execute a particular "data capture program"—the choice of program depending upon the application. Again, this program is an application-type program permanently resident in the main computer system. The request includes the necessary execution parameters for the data capture program and, in particular, defines the capture device and/or the particular data record that is to be captured.

The data capture program, upon execution by the main computer system, causes the main computer system to perform a sequence of input/output operations directed at the requested capture device. This sequence of operations is known to a sufficient degree, and thus detectable by, the secondary computer system which is monitoring the device-to-main CPU interface. The secondary computer thus "screens" all operations on the interface and, when the desired sequence is detected, the secondary computer system causes the device to be switched to off-line mode, but only after the subsequent detection of particular command called the "capture command". Switching to off-line mode then occurs at the precise moment that data transfer, which can be either input or output, is initiated for the capture command. As a consequence, data flows directly to or from the secondary computer system, i.e., none of the data is transferred to/from the main computer system. When the data sequence portion of the operation is complete, the device is returned at once to the main computer system which, in turn, performs the normal terminating control sequences associated with the current operation.

The significance of data capture is that the capture device remains connected to the main computer system for all phases of its operation except the data transfer sequence. Data transfer is performed by the secondary system and is ordinarily a relatively simple procedure. The main computer system thus remains responsible, in its normal manner, for performing all the other—and much more complex-control sequences and software tasks associated with the operation of the device. As a result, it is not necessary for the secondry computer to duplicate all of the input/output hardware and software facilities of the main computer system in order to share the capture device. This, in turn, leads to significant economies at the secondary computer system—particularly when sharing data space in direct-access storage devices—and is a major feature of the data capture procedure.

Another major feature of the data capture procedure is that it achieves the same result as that which could be achieved by indirect-accessing methods of the prior art—but with a lower overhead loading at the main computer system. This lower overhead loading is a direct consequence of the fact that, with data capture, data is not routed through the facilities of the main computer on its way to or from the requesting secondary computer. With data capture, therefore, the main processor, its main storage, and/or its input/output channels are not burdened with the overhead tasks of buffering data blocks and dispatching data to or from the requesting secondary computer.

Data capture is, therefore, another aspect of the non-symmetrical character of the switching architecture described by this invention.

BRIEF DESCRIPTION OF THE FIGURES

FIGS. 1 and 2 are block schematic illustrations of one embodiment of this invention. These figures indicate an arrangement of equipment which permits switching a switchable interface and its attached item/s of peripheral equipment either to an interface of a main computer or to control facilities of a secondary computer.

FIG. 2 is similar to FIG. 1 except that, for convenience, FIG. 2 separately illustrates the selection control lines of the embodiment while FIG. 1 illustrates only the data and other control lines.

FIG. 3 is a block schematic illustration similar to FIG. 1 but shows the additional facilities required for the data capture procedure. In addition, a direct-access storage facility is shown attached to both the switchable interface 44 and to the main interface 14. The printer/control units 20/22 and 46/48 are omitted only because of the absence of space, and their presence or absence is irrelevant for the purposes of FIG. 3. The selection control facilities of FIG. 2 also apply to FIG. 3.

FIGS. 4A through 4F are a set of related flowcharts which describe the steps employed in one embodiment of the invention to effect the two types of capture and subsequent restoration by a secondary computer of a switchable interface and its attached item/s of peripheral equipment which normally operate with a main computer system.

FIG. 5 is a flowchart which illustrates the steps of actual data transfer performed in connection with the data capture procedure. FIG. 5 is used in conjunction with FIG. 4B (see block 510).

FIG. 6 is a simplified version of FIG. 3 and highlights the essential elements of the invention. FIG. 6 also illustrates the application of the invention to multiple secondary computers, as described herein under the heading "Variations and Extensions/Multiple Secondary Computers."

DESCRIPTION OF THE PREFERRED EMBODIMENTS

INTRODUCTION
THE BASIC SYSTEM: ORGANIZATION AND OPERATION (FIG. 1)
  Shared Data and Control Lines
  Control Units
  Switchable Interface
  Secondary Computer
  Controls for Switchable I/O Interface
  Inter-Computer Adapter
  Monitor/Capture Controls
  Summary of Functions of the Intelligent Switch
THE BASIC SYSTEM: SELECTION CONTROL (FIG. 2)
  The Select Line
  Singularity of Selection Controls
  General Description
  Establishing Off-Line/On-Line Routing of the Select Line Routing of the Select Line for Off-Line Mode
Routing of the Select Line for On-Line Mode
Monitoring the Select Lines
General Remarks
INTERFACE CAPTURE
  Brief Synopsis of Capture Procedure
  Summary of Assumptions for Preferred Embodiment
  The Capture Program
    Choosing a Capture Key
    Initiating the Capture Program
    Executing the Capture Program
  Operation of the Monitor/Capture Controls
    Brief Synopsis
    Using the Flowcharts
    Glossary of Terms
    Detecting Initial Selection (FIG. 4A)
    Completing Initial Selection (FIG. 4B)
    Detecting the Capture Key (FIG. 4C)
    Switching to Off-Line Mode (FIG. 4D)
    Detection of Reselection of Capture Device by Byte-Multiplexor Channels (FIG. 4F)
    Summary of Conditions for Switching
  Completing Interface Capture
  State of the Main Channel and Main Computer
  Duration of Off-Line Mode
  Restoration
    Preliminary Procedures
    Operation of Monitor/Capture Controls (FIG. 4E)
  Use of a Selector Channel
  Condition for Capture: Device Capturability
  Multiple Devices on the Switchable Interface
    Multiple Capturable Devices
    Input Devices
    Other Devices
  Departures from IBM System/360 Architecture
DATA CAPTURE
  Introduction and Brief Synopsis of Procedure
  System Organization (FIG. 3)
    Main Channel 12
    Intelligent Switch 23
    Attached Peripheral Devices
    Switchable Interface 44
  Direct-Access Storage Facility (DASF)
    Physical Organization
    Addressing
    SEEK Command
    Track Address
    Record Format
    SEARCH Command
    READ/WRITE Data
    Summary; Reading a Record
  An Application: Information Retrieval
  The Data Capture Program
    Initiating the Data Capture Program
    Executing the Data Capture Program
  Screening Procedures
    Monitoring Facilities of the Monitor/Capture Controls
    Assumptions for the Preferred Embodiment
    Screening Procedure for the Preferred Embodiment
  Glossary of Terms
  Initialization of the Intelligent Switch 23
    Switchable Interface Controls 72
    Monitor/Capture Controls 60
    Inter-Computer Adapter 50
  Operation of the Intelligent Switch 23
    Introductory Remarks
    Monitoring Procedure (FIGS. 4A:4C)
    Re-Initialization of the Monitor/Capture Controls 60
    Detecting the Capture Command (FIGS. 4A and 4B)
    Switching to Off-Line Mode (FIG. 4B)
    Data Capture (FIG. 5)
    Dummy Data Cycle (FIG. 4B)
    Return to On-Line Mode (FIG. 4B)
    Summary of Conditions for Data Capture
  Comparison with Conventional Information Retrieval Procedures
  Variations and Extensions
    Implementation
    Screening Procedures
    Other Applications
    Mixing Data Capture and Interface Capture
    Byte-Multiplexor Channels
    Role Reversal/Applying System/360 as a Secondary Computer
    Modified Data Capture (MDC)
    A Block Storage Subsystem (BSS) for System/360 (and Other Computers)
    Multiple Secondary Computers
    A Data Capture Organized Multiprocessor
  Scope, Importance, and Features of Data Capture
    Features which Distinguish Data Capture from Interface Capture
    Features of Data Capture in Common with Interface Capture SUMMARY: COMPARATIVE HIGHLIGHTS OF THE TWO CAPTURE PROCEDURES
  Common Characteristics
    Basic Capability
    Significance
    General Application
  Distinctive Characteristics
    Degree and Duration of Off-Line Control
    State of the Main System During Off-Line Operations
    Required Facilities at the Secondary System
    Responsibilities of the Main System
    Trade-Offs
  Method of Execution
    Initiation
    Capture Programs
    Conditions for Switching
    Moment of Switching to Off-Line Mode
    Restoration to On-Line Mode
  Indicated Application
CLAIMS
REFERENCES
 1. IBM System/360 and System/370 I/O Interface Channel to Control Unit Original Equipment Manufacturer's Information, Form No. GA22–6974 (copyright IBM Corporation 1971).
 2. W. F. Beausoleil, J. D. Calvert and Andris Padegs, *Interlocked Communication System*, U.S. Pat. No. 3,336,582, issued Aug. 15, 1967.
 3. *IBM System/360 Operating System Introduction*, Form No. GC28–6534 (copyright IBM Corporation 1964, 1966, 1969)
 4. *IBM System/360 Principles of Operation*, Form No. A22–6821
 5. *IBM System/360 Component Descriptions* — 2314 *Direct Access Storage Facility* and 2844 *Auxiliary Storage Control*, Form No. A26–3599–4

INTRODUCTION

This invention is herein described as applied to an IBM System/360 "main computer system." The application of the invention to a computer system other than one having the type of input/output (I/O) architecture of System/360 may require some change in the fine structure of the invention, but the broad relational concepts and broad inventive concepts will still apply. Insofar as the broad inventive concepts are concerned, it is important to note that the term "main computer" does not always have to refer to the larger or more powerful computer of the set of computers to which this invention may be applied. These designations are chosen only because they are appropriate to the embodiment that is described herein. The fundamental meaning of the term main computer is to refer to the computer from which an item of peripheral equipment is captured by some other computer — that other computer being called the "secondary computer". Thus, a main computer can very well be of smaller scale than a secondary computer, or the two computers could have virtually identical capabilities. Indeed, the secondary computer of this specification can itself be a System/360/370. Moreover, these roles of the computer elements of this invention need not be static — the computers could switch roles for some applications. (Further discussion of these variations on the preferred embodiment may be found in the section on data capture, under the heading Variations and Extensions.)

The description of this invention contains considerable detail regarding IBM System/360/370 I/O interface signal sequencing, operating system procedures, and instruction execution; and it is assumed that the reader is familiar with these topics. For those who are not, however, a full and sufficient treatment may be found in References 1 through 4. Reference 5 is provided to augment the description of Data Capture.

THE BASIC SYSTEM: ORGANIZATION AND OPERATION (FIG. 1)

FIG. 1 is a schematic representation of an arrangement of this invention. In FIG. 1, a main computer 10 is connected to various items of peripheral equipment through the input/output interface 14 of one of its channels 12. To represent the ordinary items of peripheral equipment that might be attached to the interface 14, there is shown a first printer 16 with its associated control unit 18 and a second printer 20 with its associated control unit 22. Also connected in the standard manner to the I/O interface 14 is a special peripheral device, herein called an intelligent switch 23. This device consists of various controls and adapters which will be described later.

Typically, up to eight electrically-distinct control units may be attached to the interface 14. The intelligent switch 23 occupies one such control unit position on the interface 14.

Shared Data and Control Lines

FIG. 1 represents all data and control lines of the interface 14 with the exception of the serially-connected lines used for selection control, the latter being presented separately in FIG. 2 and described later. All of the output lines from the main computer channel 12 are here collectively represented by a single line 14a, and, similarly, all of the interface 14 lines that provide input to the channel 12 are collectively represented by the single line 14b. All peripheral devices attached to interface 14 are connected in parallel to the lines shown in FIG. 1.

Control Units

A conventional control unit 18 is shown as consisting of adapter logic 24, line-receivers 26, line-drivers 28, a B-connector block 30, and an A-connector block 32. The control unit 22 is identical to the control unit 18, and thus the components of control unit 22 are identified with the same numbers as are those of control unit 18. Each of the components of the control units 18, 22 performs its usual function, and is described briefly in the following three paragraphs.

The B-style connector 3 and the A-style connector 32 are standard panel-mounted connectors which mate with corresponding A and B connectors 33, 34, respectively, of the interface cable 14. Through cabling internal to the control units 18, 22 between the B-connector 30 and the A-connector 32, the interface 14 is continued uninterrupted through each control unit (except for the selection control lines, which are serially-connected as shown in FIG. 2).

The receivers 26 tap signals from the output lines 14a of the interface 14 and provide the proper electrical matching for transmitting these interface signals to the adapter logic 24. Similarly, the drivers 28 provide the electrical matching necessary for transmitting signals from the adapter logic 24 to the input lines 14b of the interface 14. It is to be reminded that the receivers 26 and drivers 28 in each control unit are referred to herein in the plural because a separate receiver is associated with each output line of the interface 14 and a separate driver is associated with each input line of the interface 14. For the same reason, components yet to be described (such as the drivers 52, the receivers 54, and the various gates 38, 39, 40, 41, 42 and 43) are herein also referred to in the plural. Excluding the selection control lines, FIG. 1 thus represents the treatment of a typical output line and a typical input line. (The selection control lines will be described later in connection with FIG. 2.)

The adapter logic 24 adapts the interface 14 (i.e., the bundle of wires which represents the channel) to the independent characteristics of the printer 16 and thus permits two-way communication between the printer and the channel 12.

Switchable Interface

A second System/360 I/O interface, called herein the switchable interface 44, originates at the intelligent switch 23 at connector block 73. This interface is functionally identical with interface 14 and permits the attachment of up to eight standard control units, or their electrical equivalent. For convenience, only one item of peripheral equipment is shown connected to the switchable interface 44, but more than one item could be so connected in the conventional manner. The item shown is a printer 46 and its control unit 48. The control unit 48 is identical with control units 18 and 22 so that similar reference numerals are used for the components of control unit 48.

The switchable interface 44 may be logically connected through the facilities of the intelligent switch 23 either to the interface 14 (on-line mode) or to the secondary computer 35 (off-line mode). Whether connected on-line or off-line, inbound signals from the switchable interface 44 are received and terminated, respectively, by a separate set of receivers 68 and terminators 75 provided by the intelligent switch 23. Similarly, outbound signals from the intelligent switch 23 to the switchable interface 44 are driven onto the interface 44 cable by a separate set of drivers 70. In this fashion, the treatment of the switchable interface 44 by the intelligent switch 23 is electrically identical with the treatment of interface 14 by the channel 12. The switchable interface 44 is thus electrically independent of interface 14.

When the switchable interface 44 operates in on-line mode (i.e., when the on-line gates 40, 42 are in the enabled state, and the off-line gates 38, 39 are in the disabled state), in-bound signals from the receivers 68 are routed (via gates 42) to the drivers 52 which, in turn, re-drive the signals onto the main interface 14. Similarly, signals from the main channel interface 14 are received by the receivers 54 and applied through the enabled on-line gates 40 to the drivers 70, which re-drive the signals onto the switchable interface 44. Thus, when in on-line mode, the switchable interface is effectively a branch of the interface 14.

When the switchable interface 44 is operating in off-line mode, the inbound signals from the receivers 68 are routed instead (via gates 39) to the secondary computer 35, via the controls 72. Similarly, the outbound signals fed to the drivers 70 are, for off-line mode, supplied by the controls 72, via the off-line gates 38. Thus, when the switchable interface 44 operates in off-line mode, the secondary computer 35 and the controls 72 collectively perform the functions of a System/360 channel, and the switchable interface 44 is electrically isolated from the interface 14.

Secondary Computer

A secondary computer 35 is shown together with its input/output interface 37 used for communication with the intelligent switch 23. The functional organization of interface 37 will depend entirely upon the architecture of the particular machine used as the secondary computer 35. If, for example, the secondary computer 35 is an Interdata Model 3, the interface 37 would consist of its micro-program-controlled interface and, optionally, the M-Bus of the High-Speed Memory Bus Controller. On the other hand, if the secondary computer were another System/360 CPU, interface 37 would include a channel interface (identical with interface 14 or 44) and possibly also the System/360 Direct-Control Interface. In any case, the interface 37 provides all the facilities for operating and for moving data to/from the intelligent switch 23.

Controls for Switchable I/O Interface

In view of the fact that the choice of secondary computer 35 is arbitrary while the functional organization of the switchable interface 44 is specifically that of the main computer 10, intermediate hardware must be provided in order to permit off-line operation of the switchable interface 44, except, of course, when the architecture of the secondary computer 35 is identical with that of the main computer 10. This intermediate hardware is represented in FIG. 1 by the controls 72 of the intelligent switch 23. This arrangement thus permits the controls 72 together with any type of secondary computer 35 to collectively perform the functions of the channel 12 of the main computer 10.

The distribution of functional capability between the secondary computer 35 and the controls 72 is entirely arbitrary. At one extreme, the controls might be as simple as a set of flip-flops corresponding to each line of interface 44. At the other extreme, the controls 72 could include a complete CPU which might also share the main memory of the secondary computer 35. (This latter implementation is sometimes called a "stand-alone" channel.) Because of this arbitrary distribution of functional capability, it will be convenient herein to refer collectively to the secondary computer 35 and the controls 72 as the "secondary system 35/72".

Inter-Computer Adapter

Communication between the main computer 10 and the secondary computer 35 is handled in this embodiment at the intelligent switch 23 by the inter-computer adapter logic 50.

As noted earlier, the intelligent switch 23 is coupled to the main interface 14 in a conventional fashion through the drivers 52 and the receivers 54. (The associated connectors 30a, 32a are standard panel-mounted connectors which mate with the corresponding cable connectors 33a, 34a, respectively, of the interface 14.) Signals from the interface 14 are thus fed to the inter-computer adapter logic 50 over the lines 56. Similarly, signals from the adapter 50 are fed directly to the drivers 52 via the OR-gates 41. Both of these data paths are independent of the state of the control line 64. Thus, the adapter 50, the drivers 52, and the receivers 54, are together analogous to the control unit 18, with the adapter logic 50 itself corresponding the the printer adapter logic 24. Similarly, the secondary computer 35 is analogous to the printer 16.

In order to provide the two-way inter-system communication function without disturbing the normal operation of the main computer 10, all that is necessary is for the adapter logic 50 and the control provided by the secondary computer 35 to conform jointly to the architecture of the interface 14. However, it is convenient and desirable to design the adapter 50 in such a way that it and the facilities provided by the secondary computer 35 together simulate a standard Operating System/360-supported input/output device. If this is done, no special programming is required at the main computer 10. In one preferred form the adapter 50 and the secondary computer 35 together simulate a card read-punch, such as the IBM 2540/2821.

Again, as with the controls 72, the distribution of functional capability between the adapter 50 and the secondary computer 35 is entirely arbitrary. For example, much of the simulation function could be performed by the secondary computer 35 entirely through programming. Alternatively, the inter-computer adapter 50 itself could be designed to provide all of the function necessary to simulate a card read-punch, thus relieving the secondary computer 35 of the programming overhead required for such simulation.

In any case, however, acting as a simulated card read-punch, the adapter 50 can initiate a read operation by transmitting asynchronous status (see Reference 1) to the main channel 12, after which the adapter 50 is treated by the main channel 12 as a standard card reader. As will be seen later, the adapter 50 will signal the channel 12 in this manner in order to initiate the sequence of operations that will lead ultimately to dynamic switching of the switchable interface 44 from on-line to off-line mode.

Conversely, the channel 12 may initiate a WRITE operation (i.e., data transfer to the adapter 50) by treating the adapter 50 as a standard output device, here a card punch. Operation in this manner is entirely conventional.

Monitor/Capture Controls

The monitor/capture controls 60 perform the switching function with two switch control lines: control line 64 (FIG. 1) and control line 64s (FIG. 2). Control line 64 is distributed directly to all on-line control gates 42, 40 and also, after logical inversion 66, to all off-line control gates 38, 39. Thus, for a given control line 64 logic level, the enabled/disabled state of the on-line gates 40, 42 will always be the inverse of the enabled/disabled state of the off-line gates 38, 39. When the on-line gates 40, 42 are in the enabled state, the switchable interface 44 is connected to the interface 14 of the main computer 10. Similarly, when the on-line gates 40, 42 are in the disabled state, the switchable interface 44 is connected to the secondary computer 35 via the concurrently enabled off-line gates 38, 39.

The monitor/capture controls 60 perform this switching function in response to requests from the secondary computer 35, but the precise moment of switching occurs only after the monitor/capture controls 60 detect certain pre-defined sequences involving the switchable interface 44 and the main interface 14. The monitor/capture controls 60 thus monitor signals from both of the aforementioned interfaces. Outbound signals from the main interface 14 are provided by the receivers 54 and monitored via the lines 58. Similarly, inbound signals from the switchable interface 44 are fed from the receivers 68 and monitored via the lines 62. In addition, a single monitor line 67 (illustrated in FIG. 1 by a dashed line to emphasize its singularity) is used to monitor the state of Operational-In on the main interface 14. The monitoring signal is taken from a "special" receiver 55 which does not disturb the transmission of Operational-In over the interface 14. (The designation "special" is used here only to highlight the fact that Operational-In is not normally received by attachments to a channel interface. The receiver 55 is otherwise conventional.)

The monitor/capture controls 60 also participate, in a limited way, in certain interface sequences using a dummy Service-In tag-line 65 (see FIG. 3). The operation and function of this line (together with a companion Op-In line 69) will be described later in connection with the Data Capture procedure. As with monitor line 67, a dashed line is used in FIG. 3 to emphasize the singularity of the lines 65 and 69.

The monitor/capture controls 60 are designed to perform the switching operations independently on request from the secondary computer 35. This is necessary in order to free the secondary computer 35 from the high-performance demands of the switching operations. These operations, which will be described later, may be implemented either in logic, in a micro-program, or in a combination of both.

Finally, it should be noted that a single micro-processor could be used to implement the functions of both the monitor/capture controls 60 and the switchable interface controls 72 since their functions are never performed concurrently.

Summary of Functions of the Intelligent Switch

In brief, the intelligent switch 23 provides facilitates for (a) off-line operation of the switchable interface 44, (b) inter-computer communication, and (c) switching the switchable interface 44 either to the main computer 10 or to the secondary computer 35.

The switchable interface controls 72, used in conjunction with the facilities of the secondary computer 35, provide an operational capability equivalent to that of the main channel 12, for any type of secondary computer 35.

The inter-computer adapter logic 50 provides the necessary intermediate circuitry to permit communication at any time between the main computer 10 and the secondary computer 35. In one embodiment the inter-computer adapter 50 and the secondary computer 35 jointly appear to the main computer 10 as a standard item of peripheral equipment, namely a card read-punch.

The monitor/capture controls 60 perform the function of switching the switchable interface 44 in response to requests from the secondary computer 35.

THE BASIC SYSTEM: SELECTION CONTROL (FIG. 2)

FIG. 2 illustrates the same system configuration as does FIG. 1. FIG. 2, however, shows the facilities and interconnections required for selection control, that is, for logically selecting a specific item of peripheral equipment for communication either with the secondary computer 35 or with the main computer 10.

The Select Line

Control unit selection is accomplished by each computer using a single select line originating at its I/O interface controls. With the main computer 10, for example, this line originates at the channel 12 and passes serially through all control units 18, 23, 22, etc. ... connected to the interface 14. At the last control unit (not shown in the Figures) on the interface 14, the select line is returned to the channel 12, again serially through the same control units. The outbound leg of the select line is called select-out 14as, and the inbound leg is called select-in 14bs. The select-out 14as line and select-in 14bs line thus form a continuous daisy-chained loop with the channel 12 at both extremities.

The switchable interface 44 includes a similar selection loop formed by select*-out 44as and select*-in 44bs, with the asterisk being used merely to distinguish similarly named lines of the switchable interface 44 from their counterpart in the main interface 14. As will be described in greater detail later, the selection loop of the switchable interface 44 may be either independent of that of the main interface 14, or the former may be inserted serially into the selection loop of the main interface 14.

Control unit selection circuitry can be attached either to the outbound select line 14as, 44as or to the inbound select line 14bs, 44bs, thereby permitting any control unit to terminate the propagation of a selection signal either on its way from the channel or on its way back. The choice is fixed at the time of installation and determines the relative priority of the control unit in the selection loop. For simplicity, the internal selection circuitry of each control unit attached to interface 14 is shown in FIG. 2 connected to select-out 14as. By contrast, the internal selection circuitry of control unit 48 is shown connected to select*-in 44bs Singularity of Selection Controls The reference numerals employed in FIG. 2 are similar to those in FIG. 1 where a similar basic function is involved. However, in FIG. 2 the circuit elements relating to the routing of the select line are no longer a plurality of elements. In order to stress the singularity and independence of the selection circuitry, these elements in FIG. 2 are either denominated with an s after the reference number or they are given the control unit number with an added suffix. For example, the receiver in the control unit 18 that receives the select-out signal is designated 18r.

General Description

In general, for any control unit connected through connectors B and A to the interface 14, the select signal (either select-out 14as or select-in 14bs, but not both) is received and terminated. It is then processed by internal selection circuitry (such as 18s) where it either initiates selection or is propagated. If propagated, it is re-driven onto the interface 14 and propagated as select-out 14as to the next control unit in the selection loop. When a control unit terminates the propagation of the select signal and raises Operational-In, the control unit is said to be "selected".

Since the control units 18, 23, 22 are in series with one another relative to the select line 14s of the interface 14, it is said that the select signal "polls" each item of peripheral equipment. If any control unit in this series is not to be selected, then that control unit will immediately pass the select signal on to the next control unit. This by-passing is effected in each control unit by its internal selection circuitry (such as 18s) which regenerates the select signal and feeds it to a driver (such as 18d) which redrives the select signal back onto the interface 14. The first control unit in the selection loop that is selected, however, stops the select signal in its internal selection circuitry and returns an Operational-In response to the channel 12 to notify the latter that it is prepared for receipt of the controls and command which are to follow. On the other hand, the control unit may also respond at once, over the non-select lines 14 with Status-In to initiate a control unit busy sequence which will indicate that the control unit is not free to receive the controls and command which would otherwise follow a select signal.

The inter-computer adapter 50 is selected by the main channel 12 in exactly the same manner as is any other control unit on the interface 14. Thus, the select line 14as passes serially through internal selection circuitry 50s as in all other control units. Select-Out is received by receiver 23r and terminated at terminator 23t; if propagated by adapter 50, the select signal is subsequently re-driven onto either interface 14 or 44 by either driver 23d or 70s, the choice depending upon whether the switchable interface 44 is in off-line or on-line mode, respectively.

In order to fix ideas, it is useful to re-emphasize the distinction between the select line in FIG. 2 and the other lines of interface 14. As indicated in FIG. 1, the information on the data and control lines is tapped from and driven onto the interface lines by the receivers 26, 54, and drivers 28, 52, respectively. Control units 18, 23, 22 are therefore always in parallel with one another relative to the data and control lines of interface 14. And, control unit 48 may also be added to this group when the switchable interface 44 operates as an on-line branch of interface 14.

Establishing Off-line/On-line Routing of the Select Line

The routing of the select line for each of the two operating modes of the switchable interface 44 is determined by the single control line 64s shown in FIG. 2. The control line 64s is separate and distinct from the control line 64 illustrated in FIG. 1 in order to permit independent gating when required (as, for example, during Data Capture).

Control line 64s is distributed directly to the two on-line gates 86, 88 and also, after logical inversion 66s, to the three off-line gates 80, 82, 84. The logical inversion 66s permits the single control line 64s to establish concurrently compatible states for each of the five control gates.

Routing of the Select Line for Off-Line Mode

Off-line mode is established when the three off-line gates 80, 82 and 84 are enabled and, simultaneously, the two on-line gates 86, 88 are disabled. As shown in FIG. 2, this occurs when the control line 64s is inactive (false).

Thus, upon establishing the off-line condition, the select-out signal 14as from the main channel 12, after proceeding through the intercomputer adapter 50, is gated through the off-line gate 84 to the driver 23d where it is re-driven to continue via the A-connector 32a as select-out 14as on the main interface 14. Accordingly, when in the off-line condition, the select signals from the main computer are not seen by and cannot affect peripheral equipment attached to the switchable interface 44.

In the off-line condition, the select-out signal for the switchable interface 44 originates instead at the switchable interface controls 72. The select signal is gated via the enabled off-line gate 80 and driven by the associated line driver 70s of the intelligent switch 23 onto the select*-out line 44as of the switchable interface 44. The select signal may then return to the controls 72 as select*-in 44bs through the receiver 68s and the enabled off-line gate 82. As explained earlier, the on-line gate 88 is concurrently disabled so that the select*-in signal 44bs from the switched interface 44 is not coupled to the main interface 14.

Routing of the Select Line for On-Line Mode

When the system is switched to an on-line state, then the off-line gates 80, 82 and 84 are disabled, and the on-line gates 86, 88 are simultaneously enabled. Under this condition, no select signal from the secondary computer 35 via its switchable interface controls 72 can be coupled to any part of the system shown because the off-line gate 80 is disabled. In this on-line mode, the select-out signal 14as from the main channel 12 is received by the intelligent switch 23 at the receiver 23r and then passed on as usual through the adapter 50, through the enabled on-line gate 86 (note that the off-line gate 84 is disabled), to the driver 70s, and onto the switchable interface 44as as select*-out. This select signal may return as select*-in from the switchable interface 44bs, in which case it is received by the intelligent switch 23 at the receiver 68s. It then passes through the on-line gate 88 to the driver 23d where it is redriven as select-out onto the main interface 14as. In this fashion, the adapter 50 and each control unit on the switchable interface 44 is connected in series with the rest of the control units on the main interface 14 as far as the select signal is concerned.

Monitoring the Select Lines

The monitor/capture controls 60 continuously monitor the select-out loop in order to detect propagation of select-out by the inter-computer adapter 50 (see monitor line 58s in FIG. 2). The monitor/capture controls 60 do not, however, contain internal selection circuitry and are never addressed by the main computer 10. Similarly, the return of any select signal from the switchable interface 44 as select*-in is detected using the monitor line 62s. It should be noted that the above monitoring is independent of the operating mode of the switchable interface 44, i.e., of the condition of the control line 64s.

General Remarks

It should be noted that when the switchable interface 4 operates in off-line mode, the adapter 50 can still be selected by the main computer 10. The communication with between the computers 10 and 35 is entirely independent of the switched state of the switchable interface 44.

It should also be noted that as described here for on-line mode, the routing of the select line through the intelligent switch 23 gives the inter-computer adapter 10 a higher selection priority than any control unit attached to the switchable interface 44. This routing is, however, essentially arbitrary and could be reversed, if desired, by introducing the inter-computer adapter 50 immediately after the OR-gate 90. Either alternative can be used to satisfy application requirements.

Further information on the general aspects of selection control may be found in References 1 and 2.

INTERFACE CAPTURE

The facilities of the intelligent switch 23, illustrated FIGS. 1 and 2, permit the switchable interface 44 to operate with either the main computer 10 or the secondary computer 35. If of course follows that any item of peripheral equipment attached to the switchable interface 44 is potentially available for operation with either of the computers 10, 35. This is a common arrangement for pooling peripheral equipment in multiprocessor systems, and switching is ordinarily performed manually after first shutting down both systems. Furthermore, with conventional switching, there is usually no characteristic distinction between the two computers 10, 35 insofar as the switch is concerned.

A major object of the present invention, however, is to permit a secondary, and often lesser, computer 35 to control the switching functions in such a way that the switchable interface 44 can be switched dynamically from operation with the main, and usually larger, computer 10. The switchable interface 44 may then be used by the secondary computer 35 for an extended period of time. The procedure for switching the switchable interface 44 from on-line mode to off-line mode in this manner is herein called "interface capture" and is one of the subjects of this invention. The inverse procedure, that is, returning the switchable interface 44 to on-line operation, is herein called "restoration" and is, of course, a necessary corollary to interface capture.

Interface Capture is characterized by the following unusual features: (a) Switching requests may be initiated by the secondary computer 35 any time; (b) switching is dynamic — neither the main computer 10 nor the secondary computer 35 is shut down during switching; (c) No hardware modification is required at either the main computer 10 or at any of the peripheral devices attached to the switchable interface 44; (d) No support by or alteration to the main computer operating system is required, nor does the operating system have to be notified each time the switchable interface 44 is switched (as it does in the case of conventional switching for which the VARY command is necessary with Operating System/360); and (e) Switching does not disturb the execution of any main system job on any item of peripheral equipment attached either to interface 14 or to the switchable interface 44.

Interface Capture thus permits a secondary computer 35 to "borrow" from the main computer 10 relatively expensive, high-performance peripheral equipment attached to the switchable interface 44. The secondary computer may then use this equipment for its own purposes and/or for the support of any other computer to which it (the secondary computer) may be attached—including the main computer 10 from which the switchable interface 44 itself was borrowed. And, as stated, this is done without affecting or stopping the normal operation of the main computer 10 and also without requiring either re-programming or restructuring of its operating system.

Brief Synopsis of Capture Procedure

Interface Capture is accomplished by the facilities of the intelligent switch 23 in response to the transmission by the main computer 10 of a pre-established sequence of data to a particular item of peripheral equipment connected to the switchable interface 44.

The secondary computer 35 initiates the interface capture procedure by (1) initializing and arming the monitor/capture controls 60, and (2) requesting the main computer 10 to synchronize capture. At this point, the monitor/capture controls 60 assume control of the actual switching operations, leaving the secondary computer 35 free for other work. When the autonomous operation of the monitor/capture controls 60 has been completed, the monitor/capture controls 60 then notify the secondary computer 35 and identify the reason for termination. Normally, the termination of autonomous operation of the monitor/capture controls 60 will occur just after the switchable interface 44 is switched from on-line mode to off-line mode. The secondary computer 35 and the switchable interface controls 72 then act to complete the capture procedure.

The duration of capture, that is, of off-line mode, can be varied by the secondary computer 35 to suit the needs of the particular installation. Just prior to returning the switchable interface 44 to the main computer 10, the secondary computer restores the state of the switchable interface to the state which existed earlier at the moment of capture. Actual restoration switching is then accomplished autonomously by the monitor/capture controls 60, again upon request from the secondary computer 35.

As will be seen, this entire procedure may be carried out without either disturbing the operation of the main computer 10 or causing it to be aware that the facilities of the switchable interface 44 have been borrowed.

Each of these aspects of the capture procedure will be explained in detail in the paragraphs which follow.

Summary of Assumptions for Preferred Embodiment

In order to fix ideas and to simplify the presentation, certain assumptions will be made as to the configuration of the system and its operation.

First of all, the main channel 12 may be either a byte-multiplexor or block-multiplexor channel; there is no distinction between these modes of operation insofar as interface capture is concerned. For this reason channel 12 will be called simply a "multiplexor channel". The use of a selector channel will be discussed later. (The distinction between these three modes of channel operation is fully described in Reference 1.)

Secondly, only one peripheral device will be associated with the switchable interface 44, namely a printer/control unit 46/48, as shown in FIGS. 1 and 2. This equipment will be assumed to have the operating characteristics of an IBM 1403/2821 printer. The treatment of multiple devices will also be explained later.

The Capture Program

Upon request from the secondary computer 35, the main computer 10 synchronizes interface capture by executing a very minimal application program called herein the "capture program". The capture program is permanently resident in the main computer 10 and, like all other application programs, is scheduled for execution by the operating system software of the main computer 10.

The main computer 10 executes the capture program in response to a request from the secondary computer 35 issued whenever the secondary computer 35 wishes to switch the switchable interface 44 from on-line mode to off-line mode, i.e., whenever the secondary computer 35 wishes to "capture" the switchable interface 44. The execution request is transmitted by means of the inter-computer adapter 50 which, as explained earlier, may simulate a standard, supported job-input device, such as a card read-punch or magnetic tape. Such simulation permits the secondary computer 35 to present the execution request in the form of conventional job statements, thereby avoiding special input-/output programming at the main computer 10.

While further details of the initiation and execution of the capture program will be discussed in subsequent paragraphs, it is important to note that the initiation of the capture program as described here does not require any modification of the design or operation of the main computer 10, and thereby conforms to the objectives of Interface Capture.

The main purpose of the capture program is to deliver a pre-determined data record, called the "capture key", to the item of peripheral equipment specified in the job statements which initiate execution of the capture program. The capture program may be characterized, therefore, as a simple information retrieval program with the unvarying capture key being the information retrieved.

The execution of the capture program also has a secondary and indirect function; to cause the sub-channel of the main channel 12 associated with the device attached to the switchable interface 44 to be placed in a busy, "waiting-for-Device-End" state. While this is not a necessary condition for capture, it is nevertheless highly desirable. The reason, of course, is that any subsequent attempt by the main computer 10 to address the associated device connected to the switchable interface 44 will be rejected in a conventional manner by the main channel 12 with a "sub-channel-busy" condition code. The sub-channel-busy condition prevents the channel 12 from initiating a selection sequence which, upon finding the switchable interface 44 absent (i.e., in off-line mode), would lead to the return of the select signal to the channel 12. This in turn causes a "Not-Operational" condition code to be returned to the operating system. Thus, by causing the sub-channel associated with the printer 46 to appear busy, execution of the capture program (1) prevents unnecessary interface activity and (2) avoids a potentially troublesome response to the operating system. As will be seen later, in order for the capture program to cause a sub-channel-busy condition it is only necessary that the capture key be delivered to the printer 46 using command chaining. Whether or not command chaining occurs, however, is determined by the data management routines of the operating system.

Choosing a Capture Key — The composition and size of the capture key is essentially arbitrary, but once established it must remain fixed and known to the monitor/capture controls 60. Ordinarily, a suitable key will consist of three to six bytes and must satisfy at least the following criteria: (1) The combination of bytes should represent a sequence of alpha-numeric characters which has reasonably small probability of being transmitted over the interface 14 by any program other than the capture program; (2) Each byte of the key must be a permissible or acceptable character for the printer 46 (and generally for all devices that participate in interface capture). Otherwise, rejection by the printer 46 of any byte of the key would interfere with the capture procedure. Thus, if the printer 46 is an IBM 1403/2821 equipped with the Universal Character Set feature, the capture key must not include an illegal graphic.

Initiating the Capture Program — A request for execution of the capture program by the main computer 10 is initiated at the secondary computer 35 by transmitting an appropriate set of job statements to the main computer 10 through the intercomputer adapter 50 and interface 14. The secondary computer 35 may do this whenever desired, quite independently of the operating condition of the main computer 10 and also independently of the status or operating condition of the printer 46. The job statements will call for the execution of the capture program and will identify the specific input/output device to be used in the interface capture procedure, in this case the printer/control unit 46/48.

The interface sequence by which the inter-computer adapter 50 signals the main computer 10 is entirely conventional (see, for example, Sequence Chart 3 of Appendix C of Reference 1 or FIG. 5F of Reference 2). Briefly, the inter-computer adapter 50 raises request-in, and the channel 12 responds over the interface line 14as with select-out. This signal will be stopped by the internal selection circuitry 50s of the inter-computer adapter 50. The inter-computer adapter then raises Operational-In and identifies itself by placing its address on Bus-In and raising Address-In. The channel 12 responds by raising command-out which tells the inter-computer adapter 50 to "proceed". The inter-computer adapter then transmits a status byte containing, for example, the device-end status bit. Upon acceptance of this asynchronous status byte by the channel 12, the inter-computer adapter 50 disconnects from the channel 12, thereby completing the asynchronous, inter-computer adapter-initiated signal sequence.

The address of the inter-computer adapter 50 together with the asynchronous status byte are recognized by the main computer program as a request for initiating read operations at the job-input device simulated by the inter-computer adapter 50. The operating system of the main computer 10 executes a START I/O instruction (see Ref. 4) directed at the simulated job-input device 50, and the main channel 12 then proceeds in a normal fashion to execute a sequence of channel 12 commands which will read the job statements from the inter-computer adapter 50.

Thus is the request for execution of the capture program transmitted to the main computer 10.

Executing the Capture Program — The execution of the capture program by the main computer 10 will be described here, briefly, in the context of an operating system environment, namely that of OS/360 (Operating System/360). Further information regarding these data management procedures and the associated terminology may be found in Reference 3.

The request for the execution of the capture program is handled and scheduled by the operating system of the main computer 10 in a conventional manner, that is, just as the operating system would handle a request for execution of any other application program. Ordinarily, however, the capture program is assigned a relatively high execution priority. Thus, the job scheduler enters the job request (i.e., the request for execution of the capture program) into the input work queue, associated with the inter-computer adapter 50, from which queue the job will eventually be executed.

Upon execution, the output of the capture program (consisting essentially of the capture key) is entered into an output work queue associated with the printer 46. When printer 46 is available and when no other higher-priority printing task is waiting for printer 46, the output writer program will remove the output of the capture program from the output work queue and deliver it to the printer 46.

Of importance here is that this operation involves transmission of the capture key over interface 14, through the intelligent switch 23, and thence to the printer 46 over the switchable interface 44. The monitor/capture controls 60 are designed to detect this event and to respond by switching the switchable interface 44 to off-line mode. How this is accomplished will be described next.

Operation of the Monitor/Capture Controls

Brief Synopsis — As indicated earlier, autonomous operation of the monitor/capture controls 60 is initiated by the secondary computer 35 just prior to requesting execution of the capture program by the main computer 10. From this time on, the monitor/capture controls 60 monitor all outbound signals on the main interface 14a and all inbound signals on the switchable interface 44b.

The monitor/capture controls 60, acting through a sequence of logic steps, will detect the tranmission of the capture key to the printer 46. This appearance of the capture key as part of a print line is a necessary condition for capture since it implies a known operating state at the main computer 10 with which subsequent operations may now be synchronized.

The monitor/capture controls 60 then detect the moment at which the printer 46 signals the channel 12 that its print buffer is full, i.e., that it no longer requires the service of the channel 12. This is a normal procedure and permits the channel 12 and the printer 46 to disconnect logically from one another, thereby releasing the interfaces 14/44 while the printer 46 is performing the relatively slow mechanical function of printing. In addition, if the capture key was delivered by means of a command chain, the associated sub-channel at the main channel 12 will be left in a busy, Device-End-pending condition.

At the precise moment that the channel 12 and the printer 46 logically disconnect from one another, the monitor/capture controls 60 switch the switchable interface 44 from on-line mode to off-line mode. This is done by dropping the two control lines 64, 64s which disable the on-line control gates 40, 42, 86, 88 and simultaneously enable the off-line control gates 38, 39, 80, 82 and 84.

Actual switching thus occurs after an ordinary and customary interface sequence which unconditionally permits the multiplexor channel 12 to logically disconnect from the printer 46, in which case the interfaces 14 and 44 become free for other use. This precise moment of switching also prevents possible switching transients from disturbing either the channel 12 or any attached device, since no new logical connection has yet been established. Furthermore, it is important to note that the switching procedure permits the printer 46 to be returned to the main channel 12 at any later time merely by re-establishing the state which existed at the printer at the time it was switched from on-line to off-line mode. This latter point will be discussed further under "Restoration".

The details of how the monitor/capture controls 60 perform these operations are described in the following paragraphs and in the flowcharts of FIGS. 4A through 4F.

Using the Flow Charts — FIGS. 4A through 4F are a set of related flowcharts which describe the essential features of autonomous operation of the monitor/capture controls 60. The flowcharting procedures are entirely conventional: The rectangular blocks represent operational steps performed by the monitor/capture controls 60 while the diamond-shaped blocks represent decisions that the monitor/capture controls 60 must make in order to carry out these operations. A pair of horizontal lines denotes that subsequent operations are executed in parallel, or that prior operations must be jointly completed before proceeding.

The notation used with the page-connector symbols is designed to assist the reader in moving from one chart to another: Exit-connectors identify both the destination figure and the specific point of entry. Thus, 4B/A refers to connector A of FIG. 4B. In addition, the origin of each entry is identified in parentheses near each entering connector. Thus, (4A) appearing near an entry connector of any figure means that a reference to this connector was made in FIG. 4A. In this way, it is easy to move from figure to figure within the set of flowcharts.

Similarly, the notation 4A/230, for example, is used to refer to operation or decision 230 located in FIG. 4A. The operation/decision numbers are never duplicated and appear only once in the entire set of figures.

For simplicity, the content of a register is considered synonymous with the register itself. Thus, any reference to "CCR", for example, means the "content of the CCR". (CCR is defined in the glossary which follows.)

The lines of the switchable interface 44 are always distinguished from those of the main interface 14 by means of an asterisk. Thus, "Operational*-In" refers to a line of the switchable interface 44, while "Operational-In" refers to a line of interface 14. In this way all ambiguity is avoided even through both interfaces are functionally identical.

The two binary states may be referred to in a variety of ways. For example, the "1" state may be denoted by 1, yes, true, on, set, etc... Similarly "0" is denoted by 0, no, false, off, reset, etc...

Generally speaking, these flowcharts are self-explanatory and will be readily understood by anyone familiar with the architecture of the IBM System/360 I/O Interface, as set forth in References 1 and 2. For this reason and in the interest of brevity, a detailed discussion of each step of the flow charts is not felt to be necessary herein. Discrete operations will, however, be referred to whenever required.

Error conditions and other status information are transmitted to the secondary computer 35 where indicated in the flowcharts by "Notify Secondary Computer", and autonomous operation of the monitor/capture controls 60 will terminate. Detection of an error condition will generally result in a re-initialization of the entire procedure by the secondary computer 35.

It is also helpful to note that the active state of the Hold-Out line is a necessary condition for the propagation or presence of Select-Out (see Reference 1). Select-Out herein refers to line 58s in FIG. 2.

The notation A:Z is equivalent to "A through Z".

Glossary of Terms — Before proceeding to the flowcharts, it is necessary to define all remaining terms that either appear therein or contribute to an unerstanding of the capture procedure; these terms are defined below.

capture command register (CCR) — The content of the CCR defines the single eight-bit channel command that will permit the monitor/capture controls 60 to continue working toward actual capture (see FIG. 4A, decision 230). Transmission by channel 12 of any other command to the capture device will cause the controls to reject the current selection sequence. The CCR is initialized by the secondary computer 35 prior to initiating operation of the monitor/capture controls 60. When the capture device is an IBM 1403 printer, for example, the CCR will ordinarily contain the basic WRITE command, namely $01_{16}$.

capture device — A standard peripheral device attached to the switchable interface 44 and used as a vehicle for accomplishing interface capture. Actual capture occurs while the capture device is executing a channel command issued by the channel 12, i.e., at a time when interface 14 and the operating system of the main computer 10 are in predictable states. Here, the capture device is the printer/control unit 46/48.

capture device address register (CDAR) — The CDAR is a one-byte register located in the monitor/capture controls 60. It contains the interface address of the current capture device and is loaded by the secondary computer 35 prior to initiating operation of the monitor/capture controls 60. The CDAR is examined at decision 208 (FIG. 4A) and decision 292 (FIG. 4F).

capture key — A sequence of consecutive data bytes delivered by the capture program to the capture device, upon request from the secondary computer 35. These bytes identically match the Reference Key stored in the monitor/capture controls 60. For purposes of the preferred embodiment, a four-byte capture key is used. (See Choosing a Capture Key.)

capture latch — A latch effectively set or reset by the secondary computer 35 prior to initiating operation of the monitor/capture controls 60. The set state causes the monitor/capture controls 60 to execute the data capture procedure; the reset state leads instead to interface capture. The function of the capture latch is merely to permit either form of capture to occur without unnecessary duplication of facilities. See operations 204, 502 (FIG. 4A) and decision 248 (FIG. 4B).

disconnect flag — This is a latch used to de-activate the operations described in FIG. 4F in the event that the main computer 10 executes a HALT I/O instruction (Reference 4) during a byte-multiplexed data sequence, i.e., after initial selection. The disconnect flag is set in FIG. 4A (operation 220), reset in FIG. 4C (operation 273), and tested in FIG. 4F (operation 282). Use of the disconnect flag is not a central issue.

lock — The lock is a conventional up-counter register with carry-out, here a two-bit counter. The lock is used by the monitor/capture controls 60 during detection of the four-byte capture key as it is transmitted over the main interface 14 (see FIG. 4C, operations 264, 266, 270, 298). The process of "unlocking" occurs as the counter is incremented (operation 270), but complete unlocking occurs only when the carry-out becomes active (see decision 264). This can occur only when the first four bytes of transmitted data precisely match the Reference Key, in which case it is assumed that the data indeed included the four-byte capture key (see decision 268). Intermediate states of the lock (4C/266) signify that a tentative key is being processed.

reference key — This is a pre-wired register card or circuit whose content represents a fixed sequence of bytes not likely to be encountered in ordinary output data transmitted over the interface 14. For purposes of the preferred embodiment, the reference key consists of a four-byte word. (See Choosing a Capture Key.)

restoration — The procedure subsequent to interface capture of returning the switchable interface 44 to the main channel 12, i.e., to on-line mode.

switch control lartches 64/64s — The output of each of these two latches corresponds to the control line 64 and 64s illustrated in FIGS. 1 and 2, respectively.

Detecting Initial Selection (FIG. 4A) — This figure describes how the monitor/capture controls 60 detect initial selection of the capture device (i.e., the printer 46) and then examine the command byte (decision 230). If the command agrees with the pre-established content of the CCR (see glossary), the capture procedure advances; otherwise, the monitor/capture controls 60 return to decision 206 to await another initial selection sequence.

Completing Initial Selection (FIG. 4B) — FIG. 4B carries the procedure through the end of a successful initial selection of the capture device (i.e., the printer 46). The capture device must return an all-zero initial status byte (decision 238) in order for the capture procedure to advance; otherwise, the monitor/capture controls 60 may either return to decision 206 (FIG. 4A) to await another initial selection sequence, or else terminate operation upon notification of the secondary computer (4B/241). Following a successful initial selection, the reset state of the Capture Latch (decision 248) advances the interface capture procedure to the next step (FIG. 4C).

Detecting the Capture Key (FIG. 4C) — This figure describes the essential steps of unlocking and shows how the monitor/capture controls 60 monitor the data transmitted over the interface 14 to the capture device, printer 46. Upon detecting four consecutive data bytes which match the Reference Key (see glossary), the lock carry-out becomes active and sets the stage for interface capture (decisions 264, 298). Finally, the rise of status*-in from the printer 46 (decision 254) permits the procedure to advance to the next and final step, namely actual switching. However, if the data does not match the Reference Key, the monitor/capture controls 60 abandon the procedure at decision 268 and return to the initial state 200 (FIG. 4A) to await another initial selection sequence. This latter alternative will occur repeatedly while the printer 46 is being used for purposes other than printing the output of the capture program.

Switching to Off-Line Mode (FIG. 4D) — The presence of channel-end status (decision 304) here indicates that the printer 46 has received and buffered the print line (containing the capture key); the printer 46 is thus ready to perform the printing operation. The monitor/capture controls 60 track ech step of the chanel-end status sequence and detect the amount of its completion: Operational\*-In down (decision 310) and Service-Out down (decision 308). The printer 47 has thus logically disconnected from the channel 12 in the customary manner to perform the printing operation, and the interface 14/44 of channel 12 is also idle. This is the preferred and critical moment for switching.

The monitor/capture controls 60 immediately reset the two switch control latches 64 and 64s (operations 312, 314), thereby switching the switchable interface 44 to off-line mode. Clearly, this switching occurs while the printer 46 is independently busy with its printing task. The secondary computer 35 is then notified (operation 316), and the monitor/capture controls 60 end their autonomous operation 318.

It should be noted that the printer 46 may drop its Operational\*-In (see decision 310) and thereby disconnect from the interface 14/44 only in the absence of Select-Out from the channel 12. For a multiplexor channel 12, this will always be the case, independent of command chaining: Select-Out will be down either prior to the data sequence (byte-multiplexor channel) or will be dropped in response to the rise of Status\*-In detected at decision 4C/254 (block-multiplexor channel).

Detection of Reselection of Capture Device by Byte-Multiplexor Channels (FIG. 4F) — The transmission of data to or from a byte-multiplexor channel does not necessarily occur in a single selection. Instead, the data may be transmitted in separate sequences consisting usually of one or two bytes. After each such sequence, the device logically disconnects from the interface (see decision 4C/250). It is therefore necessary for the device to initiate reselection each time it wishes to resume data transmission, and FIG. 4F describes one way of detecting this reselection. Once reselection has been accomplished, the logic of the controls 60 branches at once back to FIG. 4C where the capture procedure is resumed.

If the channel 12 attempts to disconnect the printer 46 during the data sequence, this will be detected in FIG. 4A where the disconnect flag will be set (operation 220); this will terminate FIG. 4F operations (see decision 282).

Summary of Conditions for Switching — FIGS. 4A through 4D describe the conditions under which the monitor/capture controls 60 will capture the switchable interface 44. The basic conditions were seen to be the following: (1) addressing of the printer 46 (4A/208); (2) transmission to the printer 46 of a predefined command (4A/230); (3) successful completion of initial selection, denoted by a zero status byte (4B/238); (4) transmission of the capture key during the data sequence (FIG. 4C); (5) successful completion of the data sequence, denoted by channel-end status (4D/304); (6) normal disconnection of the printer 46 from the interface 14/44 (4D/310); and, finally, (7) completion of the channel-end status sequence (4D/308).

Unless conditions (1) through (7) are satisfied in sequence, interface capture cannot occur. However, if these conditions are satisfied, the switchable interface 44 is switched to off-line mode without disturbing either the printer 46, the channel 12, or any peripheral device attached to the interface 14.

It should also be noted that condition (5) tacitly implies that switching will occur before the subsequent presentation of device-end status by the printer 46/48.

Completing Interface Capture

The switchable interface 44 is now logically connected to the secondary computer 35 through the switchable interface controls 72. The printer 46, in the meantime, is busy printing the print line initiated earlier by the main channel 12.

When printing of the content of the print buffer has been completed, the printer control unit 48 raises Request\*-In in the usual manner to request reselection for the presentation of device-end status. It is this device-end status that the main computer 10 is awaiting but does not now receive. Instead, the secondary computer 35 and its switchable interface controls 72 perform the customary channel function of extracting device-end status from the printer 46 (see Reference 1), thereby idling the printer 46.

Thus, normal operation of the printer 46 is not disturbed by the capture procedure, and the printing operation initiated by the main channel 12 is terminated normally by the second system 35/72. The printer 46 is now available for use by the secondary system 35/72.

If no other devices are attached to the switchable interface 44, the interface capture procedure is complete. However, if additional devices are present, the entire capture procedure must be repeated for each capturable device. This matter will be discussed later.

State of the Main Channel and Main Computer

The receipt of channel-end status by the multiplexor channel 12 (see FIG. 4D/304) causes the multiplexor channel 12 to retire the sub-channel associated with the printer 46/48. If command chaining is absent, this sub-channel is also released for subsequent use by the main computer 10; however, in the presence of command chaining the sub-channel will be placed in a "sub-channel-busy" state to await subsequent presentation of device-end status by the printer 46. The latter condition is preferred since it indicates to the main computer 10 that the printer 46 is busy printing and prevents the main computer 10 from initiating another operation requiring the now logically disconnected switchable interface 44. As described earlier, any attempt to address the printer 46 under these circumstances would lead to a "Not-Operational" response from the interface 14, and this might be troublesome to the operating system.

In either case, the capture procedure leaves the channel 12 in a normal condition, and the interface 14 is entirely free for use with other devices. If the sub-channel-busy condition also prevails, the absence of the printer 46 for reasons other than normal printing cannot be recognized by the main computer 10 since the sub-channel-busy condition can be tolerated by the hardware for an indefinite period of time. Interface capture may thus be viewed as a procedure whereby the main computer 10 is deceived into regarding its printer 46 to be performing a normal printing operation when, instead, the printer 46 and the switchable interface 44 are serving the secondary computer 35.

As will be shown, the switchable interface 44 will be later restored to the channel 12 without the main computer 10 ever recognizing the deception of interface capture, assuming, of course, that the sub-channel-busy condition prevails.

Duration of Off-Line Mode

The duration of off-line mode of the switchable interface 44 is controlled solely by the secondary computer.

The frequency of switching can be adjusted, however, to permit suitable availability of the switchable interface 44 (and the attached printer 46) to either system. If the service requirements of the main computer 10 are dominant, the switchable interface 44 can be returned to the main computer 10 at once upon completion of any single printing task. The secondary computer 35 may then attempt tp re-capture the switchable interface 44 by initiating another request for execution of the capture program, exactly as before. This will permit the operating system of the main computer 10 to delay the next execution of the capture program as long as necessary, in accordance with the pre-established priority schedule for executing applications programs.

At the other extreme, when the usage of the switchable interface 44 by the main computer 10 is light, off-line mode, once established, can be retained until all outstanding printing tasks have been performed for the secondary computer 10. Under these circumstances, interface capture execution overhead is minimized.

Restoration

The purpose of restoration is to return the switchable interface 44 to on-line operation with the main computer 10. As will be seen, the restoration procedure will not disturb the normal operation of either the main computer 10, the channel 12, or any peripheral device attached to the interface 14. Restoration may be initiated by the secondary computer 10 at any time after the printer 46 has completed a printing job and the switchable interface 44 is idle.

Preliminary Procedures — Before actual switching can occur, it is first necessary to restore the printer 46 to the exact state which existed at the moment of capture, namely the state at the moment of operations 4D/312/314. This restoration of the printer 46 is accomplished by a restoration program executed by the secondary computer 35. All that is necessary is for the restoration program to initiate the printing of a line by the printer 46. The content of the print line is arbitrary, but in practice may contain logging and other sign-off information.

The secondary system 35/72 initiates a WRITE command and subsequent acceptance by the printer 46 of the print data will lead to presentation of channel-end status in the standard manner (Reference 1 and 2). The secondary system 35/72 then responds by dropping Select*-Out and raising Service*-Out. The printer 46 drops both Status*-In and Operational*-In, thereby logically disconnecting from the switchable interface 44 to perform the printing task. The secondary system 35/72 then completes the channel-end sequence in the standard manner by dropping Service*-Out. The switchable interface 44 is now idle, and the condition of the printer 46 is exactly as it was at the earlier moment of capture.

The restoration program then sends a command to the monitor/capture controls 60 to initiate autonomous restoration switching. The secondary computer 35 is now free to return to other work.

Operation of Monitor/Capture Controls (FIGS. 4E) — The logic of the monitor/capture controls 60 assures that actual switching will not disturb operations at the main channel 12/14. In particular, switching cannot occur until all of the following conditions are simultaneously satisfied: (1) Operational-In, monitored via the receiver 55 (see FIG. 1), must be down (4E/322); (2) All outbound tag-lines on the interface 14 must be down (4E/324); (3) Hold-Out must be down (4E/326); (4) Operational*-In must also be down (4E/327).

Condition (1) assures that no peripheral device is logically connected to interface 14. (As mentioned earlier, the use of Operational-In for this purpose is merely convenient, but not necessary. There are other alternatives for assuring that al devices attached to interface 14 are idle.) Condition (2) prevents switching from occurring while any outbound tag from the channel 12 is active; in particular, switching will be blocked at the outset of initial selection when Address-Out is active. Condition (3) blocks switching whenever select-out is either active or incipient at the channel 12; use of Hold-Out thus permits the monitor/capture controls 60 to examine the state of select-out at its origin, independent of its propagation status. Finally, condition (4) is inserted merely to guarantee that the final channel-end sequence described earlier has indeed terminated, i.e., that the printer 46/48 has dropped Operational*-In.

When the above conditions are simultaneously satisfied, the controls 60 set both switch control latches 64/65s (4E/328/330) and notify the secondary computer 35 that restoration switching has been completed (4E/332). Again, the switching is seen to occur in a manner which avoids the possibly disturbing effects of switching transients.

Use of a Selector Channel

Thus far, to simplify the description of a particular embodiment, the channel 12 has been assumed to be either a byte- or block-multiplexor channel. Since there is no distinction between these two types of channels insofar as interface capture is concerned, these channels may be referred to as "multiplexor" channels without any qualifying prefix.

In practice, multiplexor-type channels are indeed the preferred channels for use with interface capture since command chaining can be used in connection with transmission of the capture key to the printer 46. As described earlier, command chaining prevents the main computer 10 from later re-using the sub-channel associated with the now unavailable printer 46, thereby blocking all further interface activity directed at the printer 46. This is a desirable (but not necessary) condition since it eliminates the possibly troublesome effects of Not-Operational responses from interface 14 in the event that the printer 46 is addressed while the switchable interface 44 is connected to the secondary system 35/72. The feature of multiplexor channels is that a busy sub-channel does not lock up the channel: other sub-channels are available entirely as usual for controlling operations on the interface 14. Thus, interface capture does not interfere with multiplexor channel operation, even when command chaining is used.

A selector channel, however, has effectively only one sub-channel. Thus, a sub-channel-busy condition here means that the selector channel itself is busy. If interface capture were permitted under these circumstances, the channel facilities would be locked up for the entire duration of off-line mode which, of course, is unacceptable: the purpose of interface capture is to borrow the switchable interface 44, not the channel 12.

The monitor/capture controls 60 automatically prevent such a channel lock-up, for any type of channel 12. Switching to off-line mode cannot occur unless the printer 46/48 drops Operational*-In (4D/310). If the channel 12 is a selector channel and command chaining is used to deliver the capture key to the printer 46, the selector channel will not drop Select-Out in response to the presentation of channel-end status at 4C/254. The decision 4D/310 cannot, therefore, be satisfied, and decision 4D/309 prevents lock-up of the monitor/capture controls 60. However, if command chaining is absent, the selector channel will drop Hold-Out and Select-Out in response to the rise of Status*-In at 4C/254 (exactly as would a block-multiplexor channel), and switching to off-line mode will occur as described in FIG. 4D. Decision 4D/309 is thus necessary only for selector channels.

It follows, therefore, that interface capture may indeed be performed when the main channel 12 is a selector channel, provided that command chaining is not used to deliver the capture key to the printer 46. Furthermore, the sequence of operations will be identical with those of a non-chaining block-multiplexor channel.

In summary, a selector channel may be used, but it is less attractive than a multiplexor channel since the selector channel permits the main computer 10 to address the printer 46 while the switchable interface 44 is connected to the secondary system 35/72. This exposes the main computer 10 to possibly troublesome not-operational responses from the interface 14. There are otherwise no other limitations.

Condition for Capture: Device Capturability

For purposes of the preferred embodiment it has been assured that only one peripheral device is attached to the switchable interface 44, and that this device is the printer/control unit 46/48. Actually, interface capture is possible with devices other than printers, and, having described the capture procedure in full, it is now easy to describe the general characteristics of such devices.

Any device having all of the following characteristics may participate in interface capture, exactly as did the printer/control unit 46/48: (1) the device must be capable of executing spontaneous channel-initiated operations; (2) the command repertoire of the device must include a non-immediate (see Reference 4) output command; (3) at least one of these commands must terminate normally with channel-end status; and, finally, (4) in executing the command (3) the device must accept at least the number of data bytes contained in the capture key. These are the necessary and sufficient conditions for capture, and any peripheral device which satisfies them is herein called "capturable."

Thus, capturable devices include line printers, such as the IBM 1403/2821 and IBM 1443, and card punches, such as the IBM 2540/2821. It is also important to note that disk storage devices, such as the IBM 2314, are also capturable by virtue of their SEEK command.

Multiple Devices on the Switchable Interface

It is now possible to further relax the constraints of the preferred embodiment to include multiple devices on the switchable interface 44. It will be convenient to treat this topic in terms of specific types of devices though, in practice, all the types of devices described below may be attached to the switchable interface 44 at any one time.

Multiple Capturable Devices — If, for example, a set of printer/control units 46/48 were attached to the switchable interface 44, the interface capture procedure is handled as follows: The entire procedure is performed, exactly as described previously, but using only the printer which has the highest selection priority on the switchable interface 44. (The selection priority is established at the time of installation by the point of insertion of the printer into the select loop 44as/44bs — see FIG. 2.) When the secondary system 35/72 has retired this printer (i.e., extracted device end for the print line containing the capture key), it at once requests the monitor/capture controls 60 to return the switchable interface 44 to the channel 12. This will occur in accordance with FIG. 4E.

The secondary computer then repeats the entire interface capture procedure, but this time with the printer that has the second-highest selection priority on the switchable interface 44. When the secondary system 35/72 has retired this second printer, it again requests the monitor/capture controls 60 to return the switchable inerface 44 to the channel 12.

This procedure is repeated for each capturable device on the interface 44, in the order of their selection priority. Only when each such device has been captured is the switchable interface 44 itself considered to be captured. (It may be noted that subsequent restoration must also be accomplished by performing the preliminary procedures of restoration with each of the captured devices taken one at a time; restoration switching, however, is performed only once since all of the capture devices are concurrently in the device-end-pending state.)

The reason for sequencing the capture of each device in the order of selection priority is that at the moment the switchable interface 44 is switched to off-line mode to await printing of the capture key line (4D/312/314), printers of lower selection priority may yet be operating normally with the main system 10/12; these operations must not be disturbed. Thus, the secondary system 35/72 must not respond at once to Request*-In since the signal may not be the request for presentation of device end for the capture key operation. All that is necessary, however, is for the secondary system 35/72 to delay its response to Request*-In long enough to assure that the current capture device has indeed raised Request*-In. (For printers such as the 1403 this time interval is on the order of 50milli-seconds.) This will assure that the current capture device, which has the currently highest selection priority, will stop the ensuing Select*-Out before it reaches and disturbs any other operating device.

It should be remarked that the capture of multiple devices exposes the channel 12 repeatedly to small intervals of time during which it is possible for the main computer 10 to receive a not-operational response in the event the main computer 10 addresses a yet un-captured device on the switchable interface 44. These "windows" coincide with the time interval between operations 4D/312/314 and 4E/328/330. However, since these are only momentary conditions, they are not expected to cause any disturbance that the main system 10/12 could not tolerate.

Input Devices — "Input devices" herein refer to devices whose operation must be operator-initiated; a typical example is a card reader. Input devices are not capturable since it is the operator who manually initiates their operation. Such devices may, however, be used with the switchable interface 44 provided that the operator can request the secondary computer 35 to switch and hold the switchable interface 44 in either mode of operation. Such communication between the operator and the secondary computer 35 presents no problem and can be handled by a variety of well-known methods — by priority interrupts, for example.

Thus, if the switchable interface 44 is operating with the main system 10/12, and the operator wishes to initiate card input to the secondary system 35/72, all that is necessary is for the operator to request that the secondary system 35/72 switch the switchable interface 44 to off-line mode. As shown earlier, the secondary system has this capability, and, indeed, if capturable devices are also present, the seconary system 35/72 will initiate the interface capture procedure. When off-line mode is achieved (visual indicators may be used to notify the operator), the operator may initiate card input in the usual manner.

Upon completion of card input operations, the operator may then notify the secondary system 35/72 that it may return the switchable interface 44 to the main system 10/12. The secondary system will do this, using the full restoration procedure if required.

Obviously, simultaneous card input to both systems cannot be carried out concurrently over a single switchable interface 44.

Other Devices — Generally speaking, if an input/output device is not shared by the two systems, that is, if it operates with either the main system 10/12 or the secondary system 35/72, and at predictable times, there is no restriction on the type of device that can be attached to the switchable interface 44. A non-capturable device used exclusively by the secondary system 35/72, for example, may be used as long as it is properly idled prior to switching the switchable interface 44 to the main system 10/12. The main system 10/12 will not address this device, nor will the device spontaneously disturb the main system 10/12.

Departures from IBM System/360 Architecture

It should be understood that modifications in the interface capture procedure may be required when the architecture of the interface 14 of the main computer differs from that of IBM System/360, as defined in References 1 and 2. The broad relational concepts, however, still apply.

In this connection it should be noted that for purposes of this invention there is no essential distinction between IBM System/360 and IBM System/370.

DATA CAPTURE

Introduction and Brief Synopsis of Procedure

It has been shown how the facilities of the intelligent switch 23, illustrated in FIGS. 1 and 2, permit the switchable interface 44 to operate with either the main computer 10 or the secondary computer 35. And, in particular, it has been shown how a specific switching procedure, herein called "interface capture", enables the secondary computer 35 to borrow the facilities of the switchable interface 44 from the main system 10/12 for an extended period of time without, however, disturbing the operation of the main computer system.

This same system organization, namely that described in connection with FIGS. 1 and 2, is also used with another switching procedure, herein called "data capture", which is another subject of this invention. Unlike interface capture, however, data capture involves only a momentary capture of the switchable interface 44, and this occurs during the operation of one of its attached peripheral devices, such a device being called the "capture device". The duration of this momentary capture encompasses only the data sequence portion of the associated input/output operation initiated by the main channel 12. The switchable interface 44 is switched from on-line mode (i.e., operation with the main system 10/12) to off-line mode (i.e., operation with the secondary system 35/72) immediately after transmission of zero initial status to the main channel 12 and is automatically returned to on-line mode immediately upon completion of the data sequence. Final status from the capture device is then extracted on-line by the main system 10/12 and not by the secondary system Data capture is, therefore, a dynamic switching procedure which, like interface capture, is performed by the facilities of the intelligent switch but which, unlike interface capture, results in a temporary capture of the switchable interface 44, namely during the execution of a single channel command. Inasmuch as this command may be either an input or output command (unlike interface capture), data capture causes the secondary system 35/72 either to "extract" (read) or "inject" (write) the associated data which, in the absence of data capture, would have otherwise been transmitted either to or from, respectively, the main system 10/12. Switching, first to off-line mode and then back to on-line mode, occurs while the capture device remains selected by the main channel 12. With interface capture on the other hand, switching from on-line to off-line mode does not occur until after the transmission of a "data key", and then only after the capture device has disconnected normally from the main system 10/12; the secondary system 35/72 then retains the switchable interface 44 for an indefinite period of time.

A full explanation of the data capture procedure, together with an illustration of its application, is presented in the paragraphs which follow.

System Organization (FIG. 3)

As before, in order to fix ideas and to simplify the presentation, it is convenient to describe the data capture procedure in terms of a specific embodiment, namely the system organization illustrated in FIG. 3. This arrangement of facilities is essentially the same as that shown in FIGS. 1 and 2, except for the particulars described below, and again refers to IBM System/360 or System/370.

Main Channel 12 — The data capture procedure is designed for use with either a selector channel or a block-multiplexor channel (see References 1, 2, and 4). Unlike interface capture, the byte-multiplexor channel is excluded. Thus, in the description which follows, the main channel 12 is assumed to be either a selector or a block-multiplexor channel, and there is no distinction between these two modes of channel operation insofar as the data capture procedure is concerned.

Intelligent Switch 23 — The intelligent switch 23 has exactly the same architecture as described earlier in connection with interface capture. It is only necessary to understand that the intelligent switch 23 also includes those facilities which are necessary for data capture, namely the following: (1) a so-called "dummy Service-In" tag line 65, (2) a "dummy Operational-In" control line 69, (3) an interlock line 61 which permits the monitor/capture controls 60 to start data capture at the controls 72, and (4) additional logic, or its equivalent, within the monitor/capture controls 60.

The single line 67 used for monitoring Operational-In (see FIG. 1) is not shown in FIG. 3 since it is not used by the data capture procedure. Organization of the election controls (FIG. 2), on the other hand, applies identically to FIG. 3.

Attached Peripheral Devices — For purposes of describing data capture it is convenient to use a direct-access storage facility as a peripheral device, and such device is illustrated schematically in FIG. 3 where it is shown attached to both the main channel interface 14 and the switchable interface 44. The attachment to each interface is made in the customary manner, using standard cabling procedures.

Other devices, such as the printer/control units 20/22, 46/48 (see FIG. 1), may also be attached to either interface without restriction since, as already indicated, data capture is executed on only one peripheral device at a time. Such additional devices are not shown in FIG. 3 only because of the absence of space, but their presence would in no way affect or disturb the operations to be described. Stated differently, the data capture procedure in no way disturbs the operation of either the main channel 12 or any of the devices attached to interfaces 14 and 44.

It is to be emphasized that any device attached to the switchable interface 44 may participate in the data capture procedure as a capture device. As will be seen, the choice of device will depend upon the aplication for which data capture is being used.

Switchable Interface 44 — Unless stated otherwise, the switchable interface 44 will be considered to be in on-line mode at all times. In particular, this means that the control lines 64, 64s (see FIGS. 3 and 2) are active, and the on-line gates 40, 42, 86 and 88 are consequently enabled. This will be the normal operating state of the switchable interface 44.

Under these circumstances, the main channel 12 has two access paths to the direct-access storage facility, namely via interface 14 or interface 44. How this seeming conflict is resolved will be explained shortly in connection with the topic of addressing.

Direct-Access Storage Facility (DASF)

While it is of course beyond the scope of this patent to describe every detail of a direct-access storage facility (DASF), it is nevertheless helpful to highlight those features or characteristics which contribute to an understanding of data capture. For purposes of this embodiment the direct-access storage facility may be considered to be an IBM 2314 which is described completely in Reference 5 and elsewhere.

Physical Organization — An IBM 2314 consists essentially of a control unit 100 and a family of one to eight disk-drive modules 102/0, 102/1, . . . 102/7. Each disk-drive module 102/X (X=0, 1, . . . , 7) includes its own access mechanism and provides for the use of an interchangeable disk pack assembly. Each disk pack, such as an IBM 2316, consists of a set of 11 disks 104 mounted about one-half inch apart on a vertical shaft. The disks rotate at 2,400 rpm and provide 20 magnetic surfaces upon which data can be recorded (written) by means of the access mechanism.

The control unit 100 itself consists of a two-channel switch 106, storage control unit logic 108, and the customary interface drivers/receivers 28/26. The two-channel switch 106 is an optional feature which permits the DASF to operate with either of the interfaces 14 or 44, essentially on a first-come, first-served basis. This feature is included here only for the purpose of illustrating the difference between it and the implementation of the data capture architecture, i.e., to contrast the invention with the prior art. The storage control unit logic 108, on the other hand, is an essential part of the DASF and performs a function analogous to that of the printer adapter logic 24 illustrated in FIGS. 1 and 2.

Addressing — The unit address of the DASF consists of eight bits 0:7, allocated as follows: Bits 0:3 refer to the address of the SCU logic 108. When the two-channel switch 106 is used, there are two such addresses, one for interface 14 and the other for interface 44. Bits 5:7 provide a unique three-bit address for each of the disk-drive modules 102/X. Bit 4 is always zero.

Thus, each disk-drive module 102/X has effectively two eight-bit addresses, one for interface 14 and the other for interface 44. It follows that the main system 10/12 may address any disk-drive module 102/X and specify the particular access path to the two-channel switch 106. Such addressing is accomplished by the execution of a START I/O instruction by the main computer 10 (see Reference 4).

SEEK Command — After the START I/O instruction has selected a particular disk-drive module, the SEEK command (executed by the channel 12) is used to locate a specific circular track among the 4000 available tracks in each disk pack 104. The SEEK command is merely a special control command which transmits six bytes of data, called the "seek argument", to the SCU logic 108. It is the seek argument which defines the track address.

Execution of the SEEK command by the SCU logic 108 is entirely analogous to the execution of a WRITE command by the printer/control unit 16/18. The SCU logic 108 disconnects from the interface 14 or 44 to perform the relatively slow mechanical function of seeking the addressed track. Average seek times are on the order of 75 milliseconds for the IBM 2314.

Track Address — The six-byte track address (i.e., the seek argument) is generally denoted by BBCCHH, where BB defines the bin number, CC the cylinder number, and HH the head number. For the IBM 2314 the first two bytes (BB) are always zero.

The term "cylinder" refers to the imaginary surface generated by tracks of the same radius on each recording surface. The concept of a cylinder is useful because all of the twenty read/write heads of the access mechanism are located in the same vertical plane; thus, for each of 200 radial positions of the access mechanism any one of 20 tracks may be electrically selected without further mechanical movement of the access mechanism. The cylinders are numbered 000 (outermost cylinder) to 199 (innermost cylinder).

The read/write heads are in turn numbered 0 to 19, from top to bottom, and this number is represented by the last two bytes (HH) of the track address.

Thus, the track-addressing scheme is effectively a set of cylindrical coordinates with the cylinder number defining the radial position of the track and the head number defining the particular recording surface or read/write head.

Record Format — Every record stored in a DASF consists of three distinct fields: (1) count field, (2) key field, and (3) data field. The first two fields are used for identifying the record (see below, under SEARCH command) while the last field ordinarily contains the variable working data.

Each record is formatted in such a way that sufficient space (i.e., time) is available between fields, and between records themselves, to permit the channel 12 and control unit 100 to perform the necessary control functions.

SEARCH Command — Once the SEEK command has located the proper track, a SEARCH command is used by the main channel 12 to identify a particular record among the many records which may be recorded on a single track. (Each track of an IBM 2314 has a capacity of about 7300 bytes.) The SEARCH command is merely a special WRITE command which transmits an arbitrary number of data bytes, called the "search argument", to the SCU logic 108. The SCU logic 108 compares the search argument, byte-by-byte as it is received from the main channel 12, with specific information read from the first full record which appears at the read head for the selected track. The SCU logic 108 then notifies the channel 12 (via the terminating status byte) whether or not the search condition was satisfied; if not satisfied, the channel 12 must branch back and repeat the SEARCH command for the next record.

Inasmuch as the SEARCH command must be reinitiated, if necessary, before the arrival of the next record on the track, the entire search operation is dynamic and sensitive to both the characteristics of the DASF and the responsiveness of the main channel 12. Successive SEARCH commands must be command-chained to one another.

READ/WRITE Data — The actual data field of a record is read (or written) by the main channel 12 using a READ DATA (or WRITE DATA) command. Again, because of the fact that the storage medium is moving, these commands must be executed immediately after the SEARCH command, and in time to permit data transfer from/to the data field of the record currently moving by the magnetic head assembly. The READ/WRITE DATA command must, therefore, be chained to the SEARCH command which located the record.

Summary; Reading a Record — Thus, whereever the main computer 10 wishes to retrieve a record from the DASF, the processing program of the main computer 10 must perform the following preliminary steps: (1) It must construct a channel 12 program consisting of a sequence of chained commands, namely a SEEK, SEARCH, and READ DATA; (2) It must identify the record, i.e., supply the channel program with the necessary seek and search arguments. The processing program may then address the specific disk-drive module 102 upon which the record is located (by means of the START I/O instruction) and initiate autonomous operation of the channel 12 program. The main computer 10 is then free for other work while the channel performs the operations previously described. Only after the desired data has been located and read from the DASF into the memory of the main computer 10, does the channel 12 notify the main computer 10 that execution of the channel program has been completed.

It will be helpful in understanding what follows to keep in mind this simplified description of the procedure by which the main computer 10 reads a record from the direct-access storage facility illustrated in FIG. 3.

An Application: Information Retrieval

In addition to setting forth a specific system organization for the purpose of describing data capture, it is also helpful to describe the data capture procedure in the context of an actual application, namely information retrieval. This category of applications refers to the increasingly important teleprocessing applications in which inquiries are transmitted to a central computer from various remote locations, usually by common-carrier facilities. The central computer interrogates its files for each inquiry and returns a response to the originating remote location. Quite frequently, very little, if any, processing is performed, and the main computer merely acts as a high-speed control buffer-a rather poor utilization of resources.

For purposes of this embodiment it will be assumed that the communication tasks with remote requestors are handled entirely by the secondary computer 35 with facilities not shown in FIG. 3. Every request, however, is ultimately sent by the secondary computer 35 to the main computer 10 which, in turn, interrogates the DASF. The information retrieved is then delivered to the secondary computer 35, from which the information is subsequently transmitted to the original requestor. The purpose of data capture, in the context of this application, is to cause the data extracted from the DASF by the main system 10/12 to be transferred directly to the secondary system 35/72.

Thus, the paragraphs which follow will be concerned only with the interaction between the secondary computer 35 and the main computer 10.

The Data Capture Program

The designation "data capture program" is used herein as a generic name for any applications program which has all of the following characteristics:

1. It is executed by the main computer 10 only in response to a request from the secondary computer 35.
2. It subsequently causes the main channel 12 to deliver a sequence of commands over the switchable interface 44 to the input/output device specified in the execution request from the secondary computer 35. (This I/O device is herein called the capture device.) One or more of these commands may be used for synchronization purposes, but one specific command of the sequence must cause the capture device to initiate the desired data transfer. This latter command, transmitted by the channel 12, is herein called the capture command.
3. The data capture program must prepare, and consequently expect, the capture command to transfer one-byte of data to or from the main system 10/12. This byte is herein called the dummy byte and is not used for information transfer. (In extensions of the data capture procedure, however, the dummy byte can be used for additional synchronization control messages.)

As a corollary, it must be noted that step (2) above must not be performed by any other program at any time. This restriction is necessary in order (a) to prevent premature data capture from interfering with the input/output operations of such other programs, and (b) to assure that the desired data capture is performed only in conjunction with the requested data capture program, that is, with the correct data field. In practice, however, it is not always possible to satisfy this corollary. In the present embodiment, for example, the operating system may interrogate the data capture device for purposes other than reading the requested record, and in particular to extract information from the so-called Volume Table of Contents (VTOC-see Reference 3). This difficulty can, however, be surmounted in a variety of ways, and a specific method is described later under the heading "Screening Procedures".

In this connection it should be noted also that the above corollary does not necessarily restrict the operations of the main system 10/12. For example, with the DASF illustrated in FIG. 3, the two-channel switch 106 permits the main channel 12 to access any disk-drive module 102/X at any time via interface 14; operations over this access path cannot trigger data capture, nor are such operations affected by a pending data capture state at the monitor/capture controls 60. Thus, while access to a data capture device 102/X, using the switchable interface 44, must be limited to the data capture program, other applications programs may freely access the same capture device 102/X using the main interface 14.

To summarize, the purpose of a data capture program is to cause the main channel 12 to initiate data transfer to or from the appropriate data field of the capture device specified in the execution request from the secondary computer 35. As will be seen, the actual data transfer will be performed by the secondary system 35/72; thus, the designation "data capture". If execution of a data capture program creates capture device access ambiguities, the secondary computer 35 must also use an appropriate screening procedure.

In the present embodiment the role of the data capture program is played by an essentially conventional information retrieval applications program. The execution request from the secondary computer 35 is in the form of an inquiry, and this request causes the information retrieval program to perform its customary function which includes, but is not restricted to, the essential steps described above.

Initiating the Data Capture Program — Whenever the secondary computer 35 wishes to transfer data to or from a peripheral device attached to the switchable interface 44, the secondary computer 35 requests execution of the appropriate data capture program. The secondary computer 35 presents this request to the main computer 10 as a set of conventional job-control language statements (Reference 3) using the facilities of the inter-computer adapter 50. Basically, all that is necessary is (a) to identify the particular data capture program and (b) to provide the required execution parameters. Often, because of the cataloging facilities of the operating system, the amount of data involved in the execution request is minimal.

In particular, for the information retrieval embodiment, the job-control language statements would effectively include (1) the name of the information retrieval program, (2) the name of the record desired, and (3) the name of the direct-access volume on which the data is stored. Item (3) is effectively the known address of the disk-drive module 102/X and, if previously cataloged, need not be specified again at this time. It is important to note that the secondary computer 35 need not be concerned with any other aspect of the file organization of the main system 10/12. The inquiry is thus an entirely conventional series of job-control language statements which constitute a standard "job definition" (see Reference 3).

The interface sequence by which the inter-computer adapter 50 signals the main system 10/12 is the same as that described earlier in connection with interface capture.

Executing the Data Capture Program — The procedure by which the main computer 10 executes the data capture program is identical with that used for executing any other applications program, and this procedure has already been described in connection with interface capture (see "Executing the Capture Program").

For the present embodiment, the information retrieval program, in conjunction with the data management routines of the operating system, will transform the name of the requested record into a channel program for extracting the record from the disk-drive module 102/X specified in the original execution request. This transformation also includes generation of the necessary seek and search arguments described earlier. This is a very complicated procedure, and what should be noted here is that it is performed entirely by the main computer 10 using established programming; the secondary computer 35 is thus completely free of this task of locating the requested record.

Eventually, the main computer 10 will initiate the aforementioned channel program, thereby causing the main channel 12 to deliver a sequence of commands (SEEK, SEARCH, and READ DATA) over the interface 14, through the intelligent switch 23, and thence to the named disk-drive module 102/X (the capture device). The monitor/capture controls 60 will detect the READ DATA command and then switch the switchable interface 44 to the secondary system 35/72 at the precise momemt that data transfer begins. How this switching is accomplished will be described shortly.

Screening Procedures

As explained earlier, the execution of the data capture program may create capture device access ambiguities, particularly in an operating system enviroment. For this reason, the secondary computer 35 must (a) prevent premature data capture, and (b) assure that the correct data field is indeed captured. The procedures by which the secondary computer 35 accomplishes the functions (a) and (b) are herein called "screening procedures". Ordinarily, each data capture application will have its own particular screening procedure.

In general, the screening procedures operate as follows Upon requesting execution of the data capture program, the secondary computer 35 also initiates operation of the monitor facilities of the monitor/capture controls 60. The controls 60 then screen every command transmitted by the channel 12 to the capture device. Any command which compares with a pre-established reference command is considered to be a synchronization command, or "sync command". Usually, a sync command is an output command, but this is not a requirement. In the case of output sync commands, however, the secondary system 35/60 inspects the associated output data and, based upon this data, takes one of at least the following three courses of action: (1) the monitoring procedure is repeated, exactly as before; (2) the monitoring procedure is repeated, but with a new reference command, or (3) the monitoring procedure is terminated, and operation of the data capture facilities of the monitor/capture controls 60 is initiated.

The screening procedure thus involves monitoring all commands transmitted to the capture device, detecting selected commands, examining the data transmitted by these commands, and eventually initiating data capture at the appropriate moment. In effect, the screening procedure enables the main system 10/12 to synchronize data capture, and the main system 10/12 may do this either intentionally, with special synchronization programs, or inadvertently, in the course of its normal operation. (The present embodiment involves only the second alternative.) In either case, however, the secondary system 35/60 must have some prior knowledge as to how to main system 10/12 will handle the capture device upon execution of the data capture program.

It is also important to note that screening procedures may also be used to assist in the synchronization of interface capture, whenever desired.

Monitoring Facilities of the Monitor/Capture Controls 60 — For the implementation illustrated herein, the aforementioned monitoring facilities are the same monitoring facilities that are used for interface capture, and the operations are almost identical. The data associated with each sync command is compared with a four-byte reference key, but the result of this comparison leads to a different set of operations than for interface capture. The particular operation is determined by the content of a two-bit "monitor control register" (MCR) which is initialized by the secondary computer 35.

The MCR provides four monitoring execution options, as follows:

| MCR | Action Taken by Monitor/Capture Controls 60 |
|---|---|
| 00 | This is the conventional interface capture operation, previously described. |
| 01 | If sync data compares with reference key, notify secondary computer 35; if sync data does not compare with reference key, repeat monitoring procedure. |
| 10 | If sync data compares with reference key, repeat monitoring procedure; if sync data does not compare with reference key, notify secondary computer 35. |
| 11 | Notify secondary computer that sync data does or does not compare with reference key. |

These options satisfy the aforementioned general requirements of the screening procedures and enable the secondary system 35/60 to handle a variety of data capture applications.

A specific screening procedure will be described next in connection with the present embodiment.

Assumptions for the Preferred Embodiment — It will be assumed herein that the main system 10/12 will address the capture device over the switchable interface 44 only for two purposes: either (1) to access the Volume Table of Contents (VTOC — see Reference 3), or (2) to access the desired data field.

Next, it will be assumed for simplicity herein that the VTOC resides on track 00 of cylinder 000. (As described earlier, a track is located at each intersection of an imaginary vertical cylinder with each of the 20 recording surfaces; the tracks for a given cylinder are numbered 00 through 19, while the cylinders themselves are numbered 000 through 199.) It is further assumed that the data field to be captured does not reside on any of the tracks of cylinder 000; however, the desired data field may be located anywhere else on the disk pack, and this location need not be known by the secondary computer 35.

Thus, as a consequence of the above assumptions it may be concluded that any access to the capture device by the channel 12 for which the seek argument (i.e., track address) specifies cylinder 000 is for the purpose of accessing the VTOC; conversely, if the seek argument specifies a cylinder other than 000, then that access must be for the desired data field, i.e., for the purpose of data capture.

Screening Procedure for the Preferred Embodiment — Clearly, all that is necessary is for the monitor/capture controls 60 to screen each SEEK command and to compare the first four bytes of the seek argument (BBCC) with a reference key of zero. If the seek argument BBCC is zero, the monitoring procedure is automatically continued. However, if the seek argument BBCC is not zero, the monitor/capture controls 60 at once notify the secondary computer 35; the secondary computer will then prepare to initiate data capture. (All of this is illustrated in the flow charts of FIG. 4.)

It should be mentioned here that there are a variety of SEEK commands (SEEK cylinder, SEEK head, etc..), but all are of the CONTROL command family. Thus, in practice the comparison facilities of the monitor/capture controls 60 must provide the capability to detect one or more selected SEEK commands; such capability is assumed herein but, for purposes of simplicity, is not further described. The objective, of course, is to be able to perform screening procedures without necessarily having to known the precise SEEK command used by the operating system of the main computer 10.

Glossary of Terms

Before proceeding further with the description of the data capture embodiment, it is again helpful to consolidate the definitions of the various terms that will appear therein in a single glossary. This glossary effectively extends or modifies the earlier interface capture glossary, and entries which have essentially the same meaning as for interface capture do not reappear.

capture command — Any command, transmitted to the capture device by the main system 10/12, which corresponds to the reference command for data capture operations of the monitor/capture controls 60 (see 4A/500). The capture command causes the capture device to initiate the desired data transfer.

capture device — A standard peripheral device, attached to the switchable interface 44, either from which or to which the desired data is transmitted, i.e., "captured", by the secondary system 35/72. The capture device is controlled by the main system 10/12, except during the data transfer sequence itself. For the preferred embodiment, the capture device is one of the disk-drive modules 102/X of the direct-access storage facility illustrated in FIG. 3.

DASF — Direct-access storage facility, such as the IBM 2314.

monitor control register (MCR) — A two-bit register located in the monitor/capture controls 60 and loadable by the secondary computer 35 (see text). The MCR is inspected at 4C/265, 4C/269, and 4C/299. It is reset automatically at 4A/202.

reference command — The content of the capture command register (CCR). The reference command is examined at 4A/230.

reference key — This refers to the content of the reference key register (RKR). The first four data bytes of each output sync command are compared (4C/268) with the reference key, and the result of this comparison determines the subsequent operation to be performed by the monitor/capture controls 60. (It should be noted that the fixed reference key used in interface capture can be stored in the RKR instead of being implemented in hardwired logic, as indicated in the interface capture glossary.)

reference key register (RKR) — A four-byte register located in the monitor/capture controls 60. The RKR is used either during monitoring operations (4A/201) or during interface capture operations (4A/200); the RKR is not used during data capture operations (4A/500). The RKR is always initialized by the seconary computer 35. (In principle, the width of the RKR not restricted to four bytes.)

sync command — Any command, transmitted to the capture device by the main system 10/12, which corresponds to the reference command for the current monitoring operations of the monitor capture controls 60 (see 4A/201). The sync command causes the monitor/capture controls 60 to compare the sync data with the reference key.

sync data — The sequence of consecutive data bytes delivered by the main system 10/12 during execution of a sync command. The first four bytes of the sync data are compared with the reference key at C/268.

Initialization of the Intelligent Switch 23

Whenever the secondary computer 35 wishes to transmit an inquiry to the main system 10/12, the secondary computer 35 first assures that the switchable interface 44 is in on-line mode; it then initializes the facilities of the intelligent switch 23, as follows Switchable Interface Controls 72 — The controls 72 must be prepared to execute a subsequent data sequence with the switchable interface 44. In particular, the secondary computer 35 will establish the appropriate byte count, the initial address in secondary memory 36, and the direction of data transfer (here, input). The controls 72 are now ready to begin immediate operation upon request from the monitor/capture controls 60. As will be seen, this request will occur only after a specific sequence of steps has been accomplished, and at the appropriate moment.

Monitor/Capture Controls 60 — The controls 60 are initialized to perform the monitoring procedure 4A/201 which detects the sync commands as they are transmitted to the capture device. In particular, the CDAR (see Glossary of Terms under Interface Capture) is loaded with the eight-bit address of the disk-drive module 102/X upon which the master file disk pack 104 is located. This address will correspond to the switchable interface 44 access path. Thus, as indicated previously, the secondary computer 35 must always know the location of the master file disk pack. This can be handled in a variety of ways, but the simplest is to use a given disk-drive module at all times for storage of the master file. (The use of multiple disk-drives will be discussed later.)

Secondly, the CCR is loaded with the appropriate reference command for the screening procedure. In view of the assumptions previously described, the reference command for the present embodiment is the basic SEEK command, namely $07_{16}$. (It should be remarked that in practice the monitor/capture controls 60 will be designed so that a selected set of reference commands can be used concurrently; such capability would permit the sync command to be any one of several acceptable SEEK commands.)

Next, the RKR is loaded with the four-byte reference key. Again in view of the previous assumptions, the necessary reference key must correspond to the first four bytes of a zero track address, namely BBCC = 0000. Thus, for the present embodiment, the reference key is zero.

Finally, the secondary computer 35 sets the monitor control register (MCR) to $10_2$ and starts autonomous operation of the monitor/capture controls 60 at 4A/201. The autonomous operation will thus continue until the controls 60 detect non-zero sync data, at which time the secondary computer 35 will be notified.

Inter-Computer Adapter 50 — The last preliminary step involves transmission of the inquiry to the main system 10/12. This is handled by the inter-computer adapter 50. As explained earlier, in connection with interface capture, the inter-computer adapter 50 may be designed to simulate a standard, supported, job-input device, such as a card reader or magnetic tape. Such simulation permits the secondary computer 35 to present the inquiry in the form of conventional job statements, thereby avoiding special input/output programming at the main computer 10. The content of the job-control statements has already been discussed under the heading "Initiating the Data Capture Program".

Thus, initialization and operation of the inter-computer adapter 50 involves essentially the same steps as for interface capture. Only the data transmitted is different.

Operation of the Intelligent Switch 23

Introductory Remarks — The details of how the monitor/capture controls 60 and the switchable interface controls 72 participate in data capture will now be described with the aid of the flowcharts, namely FIGS. 4A, 4B, 4C, and Figure 5. As before, FIGS. 4A:4C constitute a set of related flowcharts which describe the essential features of autonomous operation of the monitor/capture controls 60. FIG. 5, on the other hand, refers to the switchable interface controls 72. All remarks under the earlier heading "Using the Flowcharts" apply here and should be reviewed at this time. Again, since the charts are essentially self-explanatory, particularly in the context of the preceding paragraphs, only the essential highlights will be explicitly described in what follows.

Monitoring Procedure (FIGS. 4A:4C) — These operations, initiated by the secondary computer 35 at 4A/201, are esentially identical with the monitoring operations performed for interface capture. The only basic difference is that the $10_2$ state of the monitor control register will here prevent interface capture and, instead, create a different set of options.

Briefly, upon detection of a sync command at 4A/230, the sync data is compared with the reference key at 4C/268. If the sync data compares with the reference key (thereby denoting a SEEK to cylinder 000), the lock carry-out will be set upon the fourth and final pass through 4C/270; the carry-out will then be detected at 4C/264 upon transmission of the next byte of sync data from the main channel 12. As a consequence of the $10_2$ setting of the MCR (4C/265), the monitoring procedure at once branches back to 4A/G where it is automatically repeated. This recycling will continue as long as necessary without disturbing either the secondary computer 35 or the on-line state of the switchable interface 44.

Ultimately, however, the main system 10/12 will seek the desired data field, and this will be detected at 4C/268 when the sync data fails to compare with the all-zero reference key. The $10_2$ setting of the MCR at 4C/269 will then cause the monitor/capture controls 60 to notify the secondary computer 35 (4C/271).

In the meantime, of course, the capture device 102/X is executing the relatively slow seek operation which mechanically re-positions the access mechanism to the addressed cylinder.

Re-Initialization of the Monitor/Capture Controls 60 — The secondary computer 35 responds by re-initializing the controls 60 to perform the data capture procedure. In particular, the CCR is loaded with a new reference command which, for the present application, is the READ DATA command ($06_{16}$) of the DASF. (In general, the choice of the reference command for data capture will depend upon the particular application and may also require a minimal knowledge of the data mangagement procedures used by the main computer 10.) The content of the CDAR is not changed, and, as will be seen, the content of both the RKR and the MCR is now immaterial.

The secondary computer 35 once again starts autonomous operation of the monitor/capture controls 60, but this time at 4A/500. It should be noted that the execution of this reinitialization procedure must be completed before the capture command is transmitted by the main channel 12; for the present application this is not a critical requirement inasmuch as the re-initialization is over-lapped with the relatively slow seek operation. Other screening procedures may, however, be time critical, and the secondary computer 35 will in general respond quickly to the signal generated at either 4C/267, 4C/271, or 4C/301.

Detecting the Capture Command (FIGS. 4A and 4B) — Operations here are again identical with those for interface capture: Following detection of the addressing of the capture device (i.e., the disk-drive module 102/X) at 4A/208, the transmitted command is examined at 4A/230. If the transmitted command does not compare with the reference command, the controls 60 abandon the current selection sequence and return to 4A/206 to await the next appearance of Address-Out. For the present embodiment this will occur, for example, during searching operations. Detection of the capture command (i.e., READ DATA), however, permits the procedure to advance upon the fall of Address*-In at 4A/232.

Upon completion of the Address*-In/Command-Out sequence at 4B/234, the presentation of initial status by the capture device is recognized at 4B/236. The controls 60 then inspect the status byte (4B/238); an all-zero byte indicates that the capture device 102/X is ready to perform the capture command.

The completion of the initial selection sequence by the main channel 12 is then detected upon the fall of Service-Out at 4B/246. The set state of the capture latch (4B/248) then advances the procedure to 4B/504. (The capture latch was set automatically at 4A/502.)

The stage is now set for data capture.

Switching to Off-Line Mode (FIG. 4B) — Unlike interface capture, the switchable interface 44 is switched to offline mode (i.e., to the secondary system 35/72) immediately upon completion of the initial selection sequence for the capture command, i.e., upon the fall of Service-Out at 4B/246. However, if Select-Out is absent (4B/504), which would be the case only for a byte-multiplexor channel, switching is not permitted (4B/506).

Switching occurs at 4B/509, at which time the swtich control line 64 (see FIG. 3) is reset. Just prior to switching, however, the dummy Operational-In line 69 (see FIG. 3) is raised (4B/508) in order to prevent the channel from detecting the temporary switch-over. It is important to note that switching does not here involve the selection control lines: the state of Select*-Out 44as must not be disturbed during the data sequence, and the state of Select*-Out 44as is thus maintained by the main channel 12. In particular, the switch control line 64s is not reset (see FIG. 2). Hold*-Out must also be maintained.

Once the off-line state of the switchable interface 44 has been established, the monitor/capture controls 60 then perform two parallel (i.e., concurrent) sequences: one sequence begins at 4B/510 with a signal to the switchable interface controls 72 to start data capture. This signal is transmitted by the single control line 61 shown in FIG. 3. The monitor/capture controls 60 then go into a wait loop (4B/520) where they remain until the rise of Status*-In, that is, until the data transfer between the secondary system 35/72 and the capture device 102/X has been completed. The steps which follow the exit from the wait loop at 4B/520 will be described separately under the heading "Return to On-Line Mode".

The other sequence performed after switching at 4B/509 begins at 4B/512 and is also described separately (see "Dummy Data Cycle").

Data Capture (FIG. 5) — Data transfer, either to or from the capture device, is performed by the secondary system 35/72, and not by the main channel 12. This data is herein said to be captured. For the information retrieval embodiment, data is read from the disk-drive module 102/X specified in the original inquiry (see Initiating the Data Capture Program).

Data transfer begins at once upon the rise of Service*-In (5/606). The secondary system 35/72 reads the content of Bust*-In (5/612) and then raises Service*-Out (5/614) to notify the control unit 100 that the data byte has been accepted. The control unit 100 then drops Service*-In (5/616), and the controls 72 respond by dropping Service*-Out (5/618). This sequence is then repeated for each byte of data read from the disk file 104.

Data transfer may be terminated in one of three ways: either by the secondary system 35/72 (5/602), by the control unit 100 (5/604), or by both concurrently (5/622). In the event that the byte counter of the controls 72 is reduced to zero, the secondary computer is at once notified (5/620). The controls 72 then wait for the control unit 100 to present either Status*-In (5/622) or Service*-In (5/624). If Service*-In appears, the controls 72 automatically execute a Command*-Out "stop" sequence (5/626/628/630) to notify the control unit 100 that the secondary system 35/72 will not accept any further data. The control unit 100 then terminates data transfer, generates final status, and raises Status*-In; this is detected at 5/622. On the other hand, if the control unit 100 itself initiates termination, it spontaneously raises Status*-In (instead of Service*-In). This is detected either at 5/604 (Byte Counter 0) or at 5/622 (Byte Counter = 0). In any event, however, the appearance of Status*-In will always end the data capture operations of the switchable interface controls 72 at 5/632.

It is important to note that the data transfer is accomplished by the controls 72 using only a conventional demand/response control sequence. Apart from the simple stop sequence, no other interface 44 control function is performed by the controls 72. Initial selection and, as will be seen, termination sequences are performed by the main channel 12. Thus, the actual data capture requires only a minimal amount of interface control capability on the part of the switchable interface controls 72, namely the capability described in FIG. 5.

Dummy Data Cycle (FIG. 4B) — In the meantime, while data transfer is in progress between the capture device and the secondary system 35/72, the main channel awaits receipt of the single data byte requested by the data capture program (see The Data Capture Program). This data byte, however, is never transmitted by the capture device; instead, the monitor/capture controls 60 spontaneously initiate a dummy data cycle at 4B/512, so called because no meaningful data is transmitted. The controls 60 simply raise the dummy Service-In line 65 (see FIG. 3) and await the Service-Out response from the main channel 12. Upon the rise of Service-Out (5/514), the controls 60 drop the dummy Service-In line (5/516), and the main channel 12 will respond by dropping Service-Out, thereby ending the dummy data cycle. The main channel 12 and its interface 14 thereafter remain "busy" for the duration of data capture, even though there is no additional data transfer activity on the interface 14.

The sole purpose of the dummy data cycle is to avoid an incorrect-length condition at the main channel 12 upon completion of data capture. This, in turn, makes it unnecessary to prepare the data management routines of the operating system for such a contingency, regardless of the data capture application.

It is important to note, however, that while the dummy byte is not herein used for information transfer, it could be so used in extensions of the data capture procedure. Under these circumstances the dummy byte would instead be used as a "message-byte" to the data capture program. Such a message-byte could be used, for example, to define subsequent operations of the data capture program.

Another application for the dummy byte is to force a data check at the main channel 12 in the event that a parity error is detected by the switchable interface controls 72 and/or the secondary computer 35 during input data transfer from the capture device. This could be accomplished by not performing the dummy data cycle until the rise of Status*-In from the capture device; in this way the data sequence with the secondary computer 35 is allowed to run to completion before performing the dummy data cycle. If any parity errors are detected during off-line data capture, that fact can be passed along to the main computer simply by generating a dummy byte with incorrect parity and transmitting it to the main channel 12 via a dummy data cycle. This would cause a data check at the main channel 12, and the main computer 10 would respond in its customary way to take corrective action. With this approach, therefore, there would be no need for the secondary computer 35 to duplicate the data-check error-recovery software of the main computer 10.

Return to On-Line Mode (FIG. 4B) — The rise of Status*-In at 4B/520 notifies the monitor/capture controls 60 of the completion of the data transfer between the capture device 102/X and the secondary system 35/72. The controls 60 then read and save the status byte on Bus*-In (4B/522) so that the secondary computer 35 may later analyze the status and determine whether or not the data transfer terminated properly. For the present embodiment, for example, the normal ending status upon completing the READ DATA command would be channel end/device end.

The switchable interface 44 is then returned at once to on-line mode (4B/524) by raising the switch control line 64 (see FIG. 3). Inasmuch as Op*-In is now returned to the interface 14, the dummy Op-In control line 69 is dropped (4B/525). The secondary computer 35 is then notified (4B/526) that data capture operations of the monitor/capture controls 60 has successfully ended, and the procedure terminates (4B/528).

Upon switching the switchable interface 44 back to on-line mode, the active state of Status*-In is also detected at once by the main channel 12. The main channel 12 then initiates the customary termination sequence which extracts the final status byte from the capture device 102/X. This status byte is then analyzed by the main system 10/12 in the usual manner. It is important to note that normal operation of the main system 10/12 is in no way disturbed by the data capture procedure, and the main system 10/12 is unaware that the data has been captured by the secondary system 35/72.

Summary of Conditions for Data Capture — Autonomous data capture operation of the monitor/capture controls 60 is initiated by the secondary computer 35 only upon completion of an appropriate screening procedure; completion of the screening procedure assures the secondary system 35/60 that all subsequent commands transmitted over the interface 14/44 to the capture device 102/X will be part of the data capture command sequence initiated by the data capture program. Thus, in effect, the screening procedure screens all preliminary operations and eliminates capture device access ambiguities.

In general, the intelligent switch 23 will perform data capture whenever the main system 10/12 performs the following steps, using the interface 14/44; (1) satisfies the screening conditions; (2) addresses the capture device; (3) transmits the capture command. If the capture device accepts the capture command, data capture commences immediately upon completion of initial selection, provided that the main channel 12 is not a byte-multiplexor channel. These are the necessary conditions a byte-multiplexer channel. These are the necessary conditions for data capture.

Thus, for the preferred embodiment, step (1) corresponds to addressing the disk-drive module 102/X and seeking any cylinder other than cylinder 000. Once this has been detected by the monitor/capture controls 60, any subsequent transmission of a READ DATA command to the disk-drive module 102/X will, if accepted by the disk-drive module 102/X, initiate data capture, that is, data transfer to the secondary system 35/72. Acceptance of the data capture command by the capture device 102/X is denoted by the customary all-zero initial status byte.

Comparison with Conventional Information Retrieval Procedures

The information retrieval application which has been discussed herein consists of the following steps: (a) transmission of an inquiry from the secondary system 35/50 to the main system 10/12; (b) accessing the requested data in direct-access storage 102/X by the main system 10/12; and (c) delivering the information to the secondary computer 35. Basically, it is only in connection with step (c) that conventional procedures differ from those of the data capture procedure; but the difference is significant.

As shown previously, the data capture procedure causes the data accessed by the main system 10/12 to flow directly from the disk file 104/X to the secondary system 35/72, via the switchable interface 44 access path; no data whatever is transferred to the main system 10/12 from the disk file 104/X.

By contrast, conventional procedures would cause the accessed data to be read into the main memory of the main computer 10. (Specifically, the only difference at this point is that the switchable interface 44 is not switched to off-line mode upon execution of the READ DATA command, thereby causing the data to be read by the main channel 12 in the customary manner.) The information retrieval program is then notified by the main channel 12 that the data has been read from the file 104/X. (Such notification also occurs in the case of the data capture embodiment; however, for the data capture embodiment, only a single dummy byte is read into main memory, and 102/(X+event concludes the information retrieval application insofar as the main system 10/12 is concerned). Thus, with the conventional information retrieval procedure, all of the data extracted from the file 104/X now resides in main memory, and the information retrieval program must yet act to deliver it to the requestor, namely the secondary system 35/50. As a consequence, the information retrieval program will request the data management programs of the operating system to deliver the information to the secondary system 35/50, and this output data transfer will occur over interface 14 in the customary manner.

Clearly, the data capture procedure eliminates essentially all of the main system 10/12 overhead associated with the otherwise required intermediate buffering of the information extracted from the file 104/X. Such overhead includes memory space for all of the data, memory interference (for data transfer, both in and out), additional steps in the execution of the information retrieval program, and all of the hardware and software overhead associated with execution of the data management routines and with the use of the channel 12 to deliver the data to the secondary system 35/50 over the interface 14. Moreover, in addition to relieving the main system 10/12 of the menial tasks of acting as a transfer buffer, the data capture procedure also reduces the time required to transmit the requested information to the secondary system 35/50. Stated differently, the data capture procedure enhances the performance of the main system 10/12 for information retrieval applications.

Variations and Extensions

While the data capture procedure has been described herein in connection with a specific embodiment (illustrated in FIG. 3) and a specific application (information retrieval), it is to be understood that many variations, both in implementation and application, are possible within the spirit and scope of the invention. To illustrate, some of these variations and extensions are described in the following paragraphs.

Implementation — The data capture procedure has been shown to depend upon detecting certain events on the interface 14 to which the intelligent switch 23 is connected. In particular it is required to detect specific address, command, and data bytes as they are transmitted to the capture device by the channel 12. While such detection was carried out herein by comparing transmitted bytes with suitable reference bytes, it is to be understood that the detection procedure may be carried out in a variety of ways and also with fewer than eight bits of each byte. The basic requirement is merely that the monitor/capture controls 60 supply whatever detection facilities are necessary for the application.

As an example of the consequences of one variation, consider the effect on the present embodiment when only the left-most seven bits of the unit address are used when monitoring for selection of a capture device (see 4A/208). Clearly, this permits two disk-drive modules 102/X, 102(X+1) to be used concurrently as capture devices (X is here understood to be an even integer). It of course follows that the use of even fewer address bits at 4A/208 will permit either four, or even all eight, disk-drive modules to be used concurrently as capture devices.

It should be further understood that reference keys need not be restricted to four bytes, as in the preferred embodiment (see 4C/266). Any number of bytes can be used, consistent with the application.

Screening Procedures — It has already been pointed out that the screening procedures are many and varied, and that the choice of procedure will usually depend upon both the type of capture device and the particular application. For the information retrieval application illustrated herein, the screening condition that had to be satisfied was very loose, namely a seek to any cylinder other than cylinder 000. However, the screening condition could have been more restrictive: it could have been required to detect a seek to a specific cylinder, and even a specific track, before initiating data capture. This is, of course, possible since the operating system provides standard procedures for creating data files at specific locations in direct-access storage.

The information retrieval application may be further refined, for example, by creating the records in the file with special key fields (see "Record Format") that can be later identified with a SEARCH command. If the records are written with keys known to the secondary system, these keys could be used by the secondary system 35/50 when the latter requests a record. And, in turn, the screening procedure would involve detection of this search argument by the monitor/capture controls 60. Thus, the file design can be tailored to the data capture procedure, if desired.

In any event, through screening of SEARCH arguments, the secondary system can access any record without knowing the precise location of that record in the auxiliary storage device. This capability is an important feature of the data capture invention.

Other Applications — Data capture is not restricted to direct-access storage devices, nor must the direction of data transfer be only from the capture device to the secondary system 35/72. For example, data capture can be used to perform "logging" operations onto magnetic tape: large blocks of data, accumulated by the secondary computer 35, can be written directly onto magnetic tape (attached to the switchable interface 44) without first routing the data through the main system 10/12. Thus, the data capture procedure is attractive for logging applications in which no processing is required by the main computer 10 at the time the data is transmitted to magnetic tape.

It is also possible to imagine using the data capture procedure in conjunction with special application programs of the main computer 10 to slave a dedicated printer attached to the switchable interface 44. The secondary system 35/50 could, in effect, request any print function from the main system; upon detecting the appropriate response on the interface 14/44, the secondary system 35/72 could then inject data for printing. This particular application would jointly exploit the "Execute Channel Program" facilities of the operating system together with the screening and message-byte capabilities of the intelligent switch 23. (It is portant to note that when a printer is dedicated to this type of operation, it cannot also be used for standard printing tasks by the operating system of the main computer 10. Interface capture, on the other hand, does not introduce this restriction).

In general, the architecture of the data capture procedure permits it to be used with any device capable of operation with either a selector or block-multiplexor channel. Consequently, the applications of data capture can be many and varied.

Mixing Data Capture and Interface Capture — In view of the characteristics of each of the two capture procedures, the only possibility of performing both procedures concurrently is when the main channel 12 is a block-multiplexor channel. To illustrate, consider an embodiment in which the system organization is a composite of that illustrated in FIGS. 1 and 3. Furthermore, assume (as before) that the main system 10/12 will not spontaneously address the DASF over the switchable interface 44.

The secondary computer 35 may therefore capture the switchable interface 44 using only the printer 46/48 as the capture device; thereafter, the secondary computer 35 can use the printer 46/48 for an extended period of time. During this time, however, the secondary computer 35 may also process inquiries, using data capture, simply by pausing in the printing job at any point after receipt of device-end status from the printer 46/48 and returning the switchable interface 44 to on-line mode. (This switching would be accomplished using only the restoration procedure of FIG. 5; restoration of the main channel 12 sub-channel associated with the printer 46 would be omitted. Failure to restore this sub-channel of course continues to prevent the main system 10/12 from addressing the printer 46, even after the switchable interface 44 has been returned to on-line mode; this, in turn, prevents the main system 10/12 from disturbing the partially completed job at the printer 46.) With the access path 14/44 now restored, the DASF can be addressed by the main system 10/12 using the sub-channel assigned to the switchable interface 44 access path of the DASF. The secondary computer 35 would then initiate the data capture procedure, and the requested data would be captured from the disk file 104/X exactly as previously described. Upon completion of the data capture procedure, however, the switchable interface 44 is at once switched back to off-line mode (merely by initiating the switching procedure of FIG. 4D), and the printing task is resumed at the point where it had been abandoned earlier.

A disadvantage of this mixed approach is that it tends to reduce printing performance and to lengthen information retrieval response time. For example, an information retrieval request from the secondary system 35/50 may be delayed by as much as the time required to print a full line before the request can be transmitted to the main system 10/12. And, similarly, printing is delayed by the execution of the information retrieval procedure. However, if the frequency of the information retrieval requests is low relative to the printing frequency, overall performance is not seriously reduced.

It should be noted that while the two-channel switch 106 is shown in FIG. 3 only for purposes of illustrating the difference between it and the implementation of the data capture architecture, the two-channel switch — or a second control unit — would, in practice, be necessary in order to apply mixed-mode capture in the way just described. Switching of the switchable interface 44 to off-line mode for printing would deny the main system 10/12 access to all disk-drive modules 102/X of the shared-path control unit 100 via the switchable interface 44. If the switchable interface 44 were the only access path, such switching could not ordinarily be tolerated since it would seriously impact auxiliary storage throughput. Thus, a second access path 14 — here provided by the two-channel switch 100 — would be required in order to tolerate interface capture of the switchable interface 44.

Thus, in general, the decision to mix the capture procedures will depend entirely upon the application requirements. However, when such mixing is contraindicated, separate switchable interfaces must be used for each procedure. This, of course, is tantamount to the use of multiple intelligent switches 23, and the application of such multiple facilities is also within the scope and spirit of this invention. In connection with the use of multiple intelligent switches 23, it should also be noted that they need not be attached to a single interface 14 of the main system; other channel interfaces of the main system may also be used, if they are available.

Byte-Multiplexor Channels — While the data capture embodiment described herein explicitly excludes the use of a byte-multiplexor channel, this is not a mandatory restriction for the data capture procedure in general. If desired, the implementation and operation of the intelligent switch 23 can be modified to permit data capture to be performed when the main channel 12 is a byte-multiplexor channel.

Role Reversal/Applying System/360 as a Secondary Computer — This embodiment has, thus far, illustrated the application of the Intelligent Switch 23 to an IBM System/360 as the main computer 10. A specific implementation for the main computer then made it possible to describe in detail an embodiment of the Intelligent Switch 23. And, for that purpose, it was sufficient to treat the secondary computer 35 in a generic way without identifying it as a particular computer product. If, however, the secondary computer 35 is given a role-independent name, it is possible to describe how the Intelligent Switch 23 can be applied to perform data capture in reverse, i.e., with the roles of computers 10 and 35 reversed, that is, with System/360 acting as a secondary computer. Thus, for this purpose, let the computer 35 be called SYSTEM/X.

If SYSTEM/X 35 and the switchable interface controls 72 are modified to include means for full, independent control of the Direct-Access Storage Facility (DASF) 100/12, and if the monitor/capture controls 60 are modified in a relatively minor way to perform additional monitoring/sensing functions (to be described), it may be shown that the Intelligent Switch 23 can operate in reverse with System/360 10/12 acting as a secondary computer and SYSTEM/X 35/36/37 acting as the main computer — in conformity with the definitions of the terms "main" and "secondary" given in the Introduction. These modifications are consistent with the teachings previously set forth herein. To see this, it is only necessary to note that the inter-computer adapter 50 already provides the means for System/360 10/12 to communicate with SYSTEM/X 35 and to request execution of a data capture program — now resident in SYSTEM/X 35/36. The monitor/capture controls 60 already have the means to monitor all outbound signals on the interface 14, so that it is a relatively minor modification to include means for recognizing requests from System/360 10/12 as they are presented to the intercomputer adapter 50 for data capture service from SYSTEM/X 35/36. The request message can be organized so that reference criteria — say a record key — can be extracted on the fly from the request message by the monitor/capture controls 60. The monitor/capture controls 60 can then use this reference criteria in the manner already described in detail to detect the completion of conditioning (here by SYSTEM/X 35 and/or the switchable interface controls 72) of the capture device 102/X for the requested data transfer. If the interface 14 is in a state to respond at once to data service requests from the capture device 102/X, then the switchable interface 44 can be switched from the controls 72 to the interface 14 for capture data transfer at the moment of incipient data transfer.

In order to place interface 14 in the proper state for asynchronous switching, command chaining can be used. The System/360 output operation which transmits the request message from System/360 10/12 to the inter-computer adapter 50 would be command-chained to the READ or WRITE channel command used for capture data transfer with the channel 12. This simple scheme will provide the necessary channel 12 conditions to perform capture data transfer as required, but it would also lead to an unacceptable period of "hang-up" of the channel 12 as it waits for data capture service — unless the channel 12 is dedicated to this application. (This potential problem may be eliminated, however, if the System/360 10/12 requesting operation is terminated with channel-end and not channel-end/device-end status. This can be done when, for example, "modified" data capture is used — see the topics of Modified Data Capture and A Block Storage Subsystem for System/360 which follow.)

This application (role-reversal) is of twofold importance. First, it serves as an illustration of the data capture invention, i.e., a secondary computer (here System/360 10) is given the means to access directly and transparently auxiliary storage-resident data space organized and managed by a main computer (here SYSTEM/X 35/36) without the secondary computer having to duplicate (and execute) the access-method software of the main computer. Secondly, it illustrates how a separate SYSTEM/X main computer can be applied as an outboard file management and/or simple data management support system for System/360 (and/or other) secondary computers — without routing data through the SYSTEM/X main computer 35/36. This application of SYSTEM/X permits the main system (SYSTEM/X 35/36) to have a relatively modest main storage 36 — both in capacity and in bandwidth.

Modified Data Capture (MDC) — The Intelligent Switch 23 (see FIG. 3) provides means for a secondary computer to capture a switchable item of peripheral equipment 100/102 while the latter is in operation with a main computer — and means to return that item of peripheral equipment to the main computer during the same input/output operation. The Intelligent Switch 23 also provides means for a secondary computer to communicate with the main computer and means for the secondary computer to pre-condition the monitor/capture controls 60 for sensing the particular input/output operation or sequence of input/output operations during which data capture is to be performed. The Intelligent Switch 23 thus provides the means to accomplish the objectives of this invention as set forth in the introductory pages under Scope and Purpose of the Invention. One of these objectives was complete transparency of the invention to the main computer, an objective motivated by applications directed at existing main computer systems and, in particular, at IBM System/360/370.

The application of Data Capture in the way described thus far can, for convenience herein, be called Fundamental Data Capture (FDC). FDC is therefore characterized by:

1. pre-conditioning of the monitor/capture controls 60 by the secondary computer,
2. requesting of data capture service by a secondary computer, and
3. intra-operation device-switching, from main computer to secondary computer — and back again.

In order to apply FDC for purposes of accessing data space in direct-access storage devices controlled by a main computer, therefore, it is necessary for the secondary computer to know at least something about the data space (file) organization. In particular, if the secondary computer knows the actual SEARCH arguments that will be used by the main computer in accessing the file records, then FDC is always possible.

If, however, the secondary computer has no knowledge whatever about the file organization, data capture can still be performed if the main computer is allowed to participate in the data capture process, specifically by preconditioning the monitor/capture controls 60 in response to the request for data capture service from a secondary computer. In this case, the secondary computer can request records in direct-access storage with identifiers or names transmitted to the main computer that need not bear a one-to-one correspondence with the actual SEARCH argument that will be used by the responding main computer. This mode of data capture will be given the name Modified Data Capture (MDC), and it may be seen to be characterized by:

1. pre-conditioning of the monitor/capture controls 60 by the secondary computer,
2. requesting of data capture service by a secondary computer, and
3. intra-operation device-switching, from main computer to secondary computer — and back again.

Thus MDC can be applied to the design of main computer systems and to existing main computer systems for which modification and/or extension of the main computer operating system is acceptable to the user. Apart from this sacrifice of complete transparency of the invention to the main computer — to eliminate the need for the secondary computer to know the precise SEARCH arguments that will be used by the main computer in accessing a requested record — MDC is otherwise identical with FDC. And, in particular, the benefits to the main computer of eliminating the detour of inter-system data through its facilities are present with MDC as with FDC.

The paragraphs which follow include examples of the application of MDC.

A Block Storage Subsystem (BSS) for System/360 (and Other Computers) — A Block Storage Subsystem (BSS) for a System/360 computer 10/12 (see FIG. 3) is defined for purposes of this discussion to have the following characteristics: (1) It is attached to a System/360 channel 12/14 and appears to System/360 10/12 as an input/output auxiliary storage device having a relatively large, sequentially addressable to the byte (0,1,2...) memory space. (2) It may have a relatively long access-time, but its block-transfer data rate is high. (3) System/360 may access a given data block in BSS by executing a pair of chained channel command words (CCWs), the first CCW delivering the address of the first byte of the data block, the byte count, and the direction of data transfer desired (read or write). The execution of this CCW would be terminated first by channel-end status from the BSS and then, after the BSS is ready to access the data space, by device-end status. Command chaining would then ensue to a READ or WRITE CCW to accomplish the actual data transfer.

Evidently, such an auxiliary storage subsystem could provide a simply organized, easily applied extension to main storage for use by a large number of application programs. And this could be done with very little access-method overhead at System/360. As such, BSS provides a potentially valuable alternative to virtual storage.

BSS can, of course, be implemented by existing, conventional means, for example, by attaching a "minicomputer" sub-system to System/360 and using that subsystem, which would include a large-capacity direct-access storage device, to emulate BSS. The mapping of the sequentially-addressed block storage onto disk space and the management of this disk space would be handled entirely by the minicomputer. While this means of implementing BSS is entirely straightforward, it nevertheless has at least two drawbacks: (1) The size and performance of BSS would be limited to that of the auxiliary storage facilities of the mini system, and these facilities might be inadequate for the desired application. (2) All data must be moved through main storage of the minicomputer on its way to or from System/360. This constitutes a potential bottleneck — particularly if several auxiliary storage devices are to be operated concurrently and/or there are several requesting computers to service. In any event, to achieve high performance under these circumstances, the minicomputer would require a high-performance — and correspondingly expensive — main storage system.

Both of these drawbacks may, however, be eliminated entirely by applying the present invention and, in particular Modified Data Capture (MDC). This can be explained easily using FIG. 3 if, as was done under the heading Role Reversal, computer 35/36 is given the name SYSTEM/X and if the roles of System/360 10/12 and SYSTEM/X 35/36 are reversed so that System/360 10/12 becomes the secondary computer and SYSTEM/X 35/36 the main computer. Under these circumstances, and with the SYSTEM/X main computer 35 having full capability to control the Direct-Access Storage Facility (DASF) 100/102, the Intelligent Switch 23 may be seen to provide precisely the means to perform MDC: (1) means for the System/360 secondary computer 10/12 to capture the attached DASF 100/102 while the latter is executing an input/output operation with the SYSTEM/X main computer 35/36 — and to return the DASF to SYSTEM/X during the same input/output operation (monitor/capture controls 60); (2) means for System/360 10 to request data capture service from SYSTEM/X 35 (inter-computer adapter 50); and (3) means for SYSTEM/X 35 to pre-condition the monitor/capture controls (MCC) 60 in response to the request for data capture service from System/360 10 (the interface 37).

With these facilities, a BSS could be emulated as follows. The first CCW from System/360 10/12 would transmit the block storage parameters (see above) to the inter-computer adapter (ICA) 50. The ICA 50 would, in turn, transmit these parameters on to SYSTEM/X 35 where they would be used by the SYSTEM/X mapping facilities to identify the particular record/s in the DASF 100/102 whose data field/s correspond to the particular data block being requested. SYSTEM/X would then (1) construct the channel program required to access the aforementioned record/s and (2) transmit the SEEK and/or SEARCH arguments of this channel program to the monitor/capture controls 60 to pre-condition the MCC 60 to capture the data field/s of the appropriate record/s. SYSTEM/X then notifies the ICA 50 to initiate as asynchronous status sequence over interface 14 for the purpose of terminating the aforementioned first CCW with device-end status from the ICA 50. Upon detecting the response of System/360 to this asynchronous status request, a suitable element of the Intelligent Switch 23 would notify System/X 35 to initiate the channel program whose execution the MCC 60 has been preconditioned to detect. SYSTEM/X and/or the switchable interface controls 72 begin execution of the channel program, and the switchable interface 44 is switched to interface 14 at the precise moment that data transfer is to begin with the selected record. System/360, which in the meantime has command-chained to a READ or WRITE CCW, thereupon performs the capture data transfer with the selected record.

Clearly, the invention provides the means to act as a BSS without routing data through SYSTEM/X main storage 36. Moreover, because of the design features of the Intelligent Switch 23, it can be inserted transparently into a System/360 channel 12/14 to permit SYSTEM/X to share the existing large-capacity, high-performance DASF 100/102 of System/360. (It may be noted that if the DASF 100/102 were shared in this way, individual disk drives 102/X could be permanently assigned to SYSTEM/X 35, and the Intelligent Switch 23 could be modified to allocate the switchable inter- face 44 to either controlling computer on the basis of an appropriate demand algorithm. The two-channel switch 106 is not required.)

Thus it has been shown how the Intelligent Switch 23 and modified data capture can be used to implement BSS without the drawbacks of conventional implementation. Or, stated differently, it has been shown how the invention permits a relatively modest SYSTEM/X main computer 35/36 to be used as the control element of a large-capacity, high-performance BSS for System/360.

Multiple Secondary Computers — While this invention has been described thus far in the context of two computers, namely, a main computer and a secondary computer, it is also applicable to multiple secondary computers.

To illustrate, imagine that the secondary computer 35 (see FIG. 3) is augmented by an N-member set of secondary computers (35/1, . . . 35/X, . . . 35/N) with each member of the set having an interface 37/X connected to interface 37 (see FIG. 6). Clearly, by this means, each of the secondary computers 35/X can communicate with the secondary computer 35. Further, imagine that the gating facilities 38 are duplicated N-times to accommodate N additional switchable interface controls (72/1, 72/2, . . . 72/N) with each of the switchable interface controls 72/X being connected also to the interface 37/X of the associated secondary computer 35/X. If N additional gating lines (64/1, 64/2, . . . 64/N) are then provided by the monitor/capture controls (MC)60, it may be seen that the switchable interface 44 can be switched, under the control of the MCC 60, to any one of the secondary computers 35/X via the corresponding switchable interface controls 72/X. Finally, imagine that the secondary computer 35/36 is absorbed into the facilities of the Intelligent Switch 23 so that the former becomes, in effect, a Switch Control Processor whose responsibility it is to coordinate the operation of the ICA 50 and MCC 60 with that of the requesting secondary computers (35/1, 35/2, . . . 35/N). This structure is illustrated schematically in FIG. 6.

With this structure it may be seen that any member 35/X of the set of secondary computers can itself act as a secondary computer of the invention to perform data capture (and interface capture). For example, a request from a secondary computer 35/X for data capture service would be passed on to the ICA 50 by the Switch Control Processor (SCP) 35. At the same time, the SCP 35 would pre-condition the MCC 60 for the appropriate data capture and for switching switchable interface 44 to the switchable interface controls 72/X of the secondary computer 35/X. All operations otherwise follow exactly as before, and the characteristic features of data capture remain unchanged.

A Data Capture-Organized Multiprocessor — One of the primary purposes of this invention — as stated in the introductory pages of this embodiment — is to provide means for a secondary computer to access directly and transparently auxiliary storage-resident data space organized and managed by a main computer — and to do so with relatively modest access-method software and with little execution overhead at the secondary computer. Indeed, this embodiment has described in detail how this purpose is accomplished, in total by Fundamental Data Capture, and, in part, by Modified Data Capture (see Modified Data Capture for the distinction between these terms). But the emphasis, thus far, has been directed primarily to the application of the invention to essentially unrelated, otherwise independent computers. An IBM System/360 was, for example, chosen to represent the computer 10/12 while no particular commercial product was used to represent the computer 35/36.

Nevertheless, the invention may also be used as an architectural element in the design of a data capture-based central processing unit (to be henceforth called DCPU) comprising a Master Control Processor (MCP) and multiple sub-processors called Functional Support Processor (FSPs). The structure of the DCPU can be visualized easily in terms of the set of secondary computers described in the preceding topic. The secondary computer 35 (see FIGS. 3 and 6 and refer to the previous topic) would be the MCP and each secondary computer 35/X would correspond to a FSP. Next, disconnect the main computer 10/12/14 at 30a, 32a, 30, and 32 (see FIG. 3) and give the switchable interface controls 72 and the MCP 35 the capability for full control of the Direct-Access Storage Facility (DASF) 100/102. The result may be seen to be a unified multiprocessor (DCPU) consisting of a Master Control Processor 35 (which can now be considered to be the main computer), a MCP 35 data channel 72, a set of FSP secondary computers 35/X, and the remaining elements of the Intelligent Switch 23 (as modified in the previous topic).

The significance of this architecture is (1) that all the DASF 100/102 control and data management facilities can be concentrated in the MCP 35 and channel 72, and (2) that Modified DAta Capture can be used to give any FSP 35/X direct access to data space in the DASF 100/102, i.e., without routing the data through the memory facilities 36 of the MCP 35. Thus, as has been mentioned earlier, this can lead to significant economies in the design of the memory structure 36 of the MCP 35 — particularly when multiple, concurrently operating, high-performance DASDs are utilized. And, because of the features of MDC, the economy of design also appears at the FSPs 35/X which require only trivial access-method software to access the DASD data space. It may be noted, moreover, that if a System/360 is now connected to the Intelligent Switch 23, the System/360 10/12 may be handled by the DCPU simply as another (although external) secondary computer (see Role Reversal). The DCPU can therefore be used also as an outboard file management and/or general-purpose support system for the attached System/360 10/12.

Scope, Importance and Features of Data Capture

As shown herein, the data capture invention provides a means for one computer (a secondary computer) to share items of peripheral equipment controlled principally by another computer (a main computer) without, however, the necessity of providing at that (secondary) computer the full complement of hardware and software that would otherwise be required for conventional sharing of such items of peripheral equipment. And, it has been shown that when the data capture invention is applied to the sharing of direct-access auxiliary storage devices, the invention makes it possible for a secondary computer to access directly data space organized and managed by a main computer without having to duplicate the access-method softward of the main computer and without having to know the precise location of any particular record it may wish to access.

As such, data capture provides an important and distinctly unique alternative to device-sharing by the two-channel switch means of the prior art for which a full complement of hardware and software facilities must be provided at all sharing processors. But, there are trade-offs in the application of these two methods of device-sharing, and these trade-offs may be understood most easily in the context of a particular application, namely the use of device-sharing to eliminate the need for any one processor of a multiprocessor computer system to act as an input/output support processor for other processors of the multiprocessing system. Such an input/output support processor has an overhead burden which may be separated into two general categories:

1. Containing and executing the access-method software to access data space in direct-access storage devices on behalf of the other processors.
2. Managing, buffering and dispatching data to/from the other processors.

The object of introducing means for the other processors to communicate directly with the auxiliary storage device, i.e. means for sharing that device, is to reduce or eliminate the aforementioned overhead at the input/output support processor. How the two methods of evice sharing — data capture and the two-channel vitch — differ in their application to this situation is ghlighted in the following table. The designation nain computer" represents the input/output support rocessor and the designation "secondary computer" a requesting processor.

A Comparison of Three Methods By Which a Secondary Computer May Access Auxiliary-Storage Data Space Managed by a Main Computer tion of the second kind. For example, the secondary computer 35 can request the operating system of the main computer 10 to format records, each with a known key field, and to place these records on certain cylinders of a disk file 104/X. The secondary computer 35 may thereupon transfer data to and from the data fields of these records, using the data capture procedure. Thus, the secondary computer 35 has exclusive use of these data fields for its own purposes and, in effect, shares the expensive auxiliary storage facilities of the main system 10/12.

|  | Through the Main Computer (non-shared DASF) | Two-Channel Switch (shared DASF) | Data Capture (shared DASF) |
|---|---|---|---|
| Is data routed through main storage of the main computer? | Yes | No | No |
| Is there access-method execution overhead at the main computer? | Yes | No | Yes |
| Does access-method software have to be provided - and executed - at the secondary computer? | No | Yes | No |
| Is it necessary to provide, at the main computer, operating system software support for the switching facilities? | (NA) | Yes | No(FDC)*<br>Yes(MDC)+ |
| Is it necessary to apply the switching facilities to the item of shared peripheral equipment, i.e. is it necessary to modify the item of peripheral equipment? | (NA) | Yes, the two-channel switch | No |
| How many computers can be supported by a single switch? | (NA) | 2 | 1 main and N secondarys - with dynamic role-reversal capabilities |

*Fundamental Data Capture
+Modified Data Capture

The preceding table is seen to summarize some of the differences between device sharing by the data capture invention and by the prior art (the two-channel switch nd indirect-accessing methods). The table shows that data capture achieves only partial relief at the main omputer — in exchange for considerable simplification at the secondary computer. This distinction together with the other differences between the two methods will, in practice, dictate the choice of method or any particular application.

Clearly, data capture is an important and broadly applicable means for sharing computer peripheral equipment. When applied to the sharing of large-system resources by a relatively modest secondary computer (see FIG. 3), it has been seen that the data capture procedure can be used to advantage either (1) to assist the main computer 10 in operations which require data to be moved between one of its peripheral devices and a secondary computer 35, or (2) to enable a secondary computer 35 to share the peripheral facilities of a main computer 10 for mainframe-independent applications. The information retrieval embodiment described herein is a representative example of an application of the first kind and, with a slightly different interpretation, can be used also to illustrate an application of the second kind.

Features Which Distinguish Data Capture from Interface Capture — Among the characteristic features of fundamental data capture are the following:

1. Only a minimal amount of special hardware is required to move the data to or from the peripheral device. The switchable interface controls 72 can be relatively simple since they must provide only the switchable interface 44 control capability described in FIG. 5. Stated differently, the full capability of a System/360/370 channel (see References 1 and 2) is not required. The secondary system 35/72 performs neither initial selection nor termination operations with the capture device.

2. Only a minimal amount of program support is required on the part of the secondary computer 35 in order to control the capture device. All input/output control, error-recovery, and other necessary program support for operating the capture device is provided by the main system 10/12. Furthermore, such support programming at the main computer 10 is already available: it is the customary programming which is always used with the capture device, and no modification or alteration of these programs is required for participation in the data capture procedure.

3. For applications involving direct-access storage devices, the responsibility of file organization and file management can be left with the more sophisticated main computer 10. Such tasks as creating files, formatting records, and later locating them, are performed by the established programs of the main computer 10 in the customary manner. In general, for any type of capture device, the secondary computer 35 may draw upon the application program resources of the main computer 10 for a variety of support functions.

Features of Data Capture in Common with Interface Capture — The data capture procedure also includes many of the features found with interface capture.

Among these features are the following: (a) data capture requests to the main computer 10 may be initiated by the secondary computer 35 at any time, provided that the switchable interface 44 is in on-line mode; (b) dynamic — data capture occurs during the normal execution of a command by the main channel 12; (c) no hardware modification is required at either the main computer 10 or at any capture device; (d) no support by, or alteration to, the main computer operating system is required; and (e) no incorrect length or other exceptions are created which would disturb normal program execution at the main computer 10.

In short, the data capture procedure does not interfere with the normal operation of the main system 10/12.

SUMMARY: COMPARATIVE HIGHLIGHTS OF THE TWO CAPTURE PROCEDURES

Having separately described both interface capture and data capture in considerable detail herein, it is helpful by way of summary to compare the essential features of each procedure and to delineate their similarities as well as their differences. The objective, of course, is to establish a clear distinction between the two capture procedures and to indicate when each should be used.

Common Characteristics

As shown earlier, both procedures are accomplished using the facilities of the intelligent switch 23 in conjunction with programs executed at the secondary computer 35 and at the main computer 10. Both procedures, in fact, have the same basic capability, significance, and general application, and neither procedure interferes with the normal operation of the main system 10/12.

Basic Capability — Either capture procedure enables a secondary computer system 35/23 to transfer data directly to or from the peripheral devices of a main computer system 10/12, that is, without routing the data through the main computer 10.

Significance — As a result of this basic capability, inter-system data transfers between peripheral devices of a main computer system 10/12 and a secondary computer system 35/23 can be accomplished with far less operating overhead at the main computer 10 than would otherwise be the case using conventional procedures. The capture procedures avoid using the main computer 10 as an intermediate data buffer, thereby releasing memory, processing, and channel resources of the main computer 10 for other work.

General Application — Either capture procedure may therefore be used to advantage either (1) to assist the main computer 10 in operations which require data to be moved between one or more of its peripheral devices and a secondary computer 35, (2) to enable a secondary computer 35 to use the peripheral devices of a main computer 10, or (3) to assist the main computer 10 in transferring data from one to another of its peripheral devices, using the secondary computer 35 as an intermediary.

Distinctive Characteristics

While both capture procedures have much in common as to their scope and purpose, the means by which they accomplish these common objectives and the effect on both computer systems are quite different.

Degree and Duration of Off-Line Control — Interface capture causes the switchable interface 44 and all attached peripheral devices to be switched to the secondary system 35/72 for an extended and essentially arbitrary period of time. During this time the secondary system 35/72 is completely responsible for all aspects of the control of the switchable interface 44 and its attached devices.

Data capture, on the other hand, causes only momentary switching of the switchable interface 44 to the secondary system 35/72. Furthermore, only a single peripheral device at a time is involved, and this device remains selected by the main channel 12. Here, during "off-line" operation, the secondary system 35/72 is responsible only for reading or writing the associated data; no other interface control responsibility is required (except for executing the simple "stop" sequence, when necessary).

State of the Main System During Off-Line Operations — For interface capture, any one of four possible sets of residual states is possible at the main system 10/12, the particular set depending upon the type of channel and upon whether or not command chaining is used in connection with transmission of the capture key. For purposes of the present discussion of interface capture, only a multiplexor channel (either type) will be considered, and it will be further assumed that command chaining is specified during execution of the capture command.

When executed under these circumstances, the interface capture procedure leaves the channel 12 in a normal condition, and the main interface 14 becomes entirely free for use with other devices. Furthermore all sub-channels associated with capture devices are left in a busy condition waiting for device-end status from their respective capture devices. Thus, the residual state of the main system 10/12 is identical with the state which would exist were the capture devices merely performing their normal off-line functions in the absence of interface capture.

With data capture, on the other hand, and excluding the use of a byte-multiplexor channel, the main channel 12 and the interface 14 remain busy during the entire period of off-line operation. The main system 10/12 simply performs the normal function of executing a channel command (in this case the capture command) and awaits the presentation of either data or status service requests from the capture device. The eventual presentation of terminating status by the capture device will cause the main channel 12/14 to terminate the capture command in the customary manner.

Required Facilities at the Secondary System — As a consequence of the above characteristics, interface capture requires full main-channel capability at the secondary system 35/72. And, furthermore, the secondary computer 35 must provide all the data management programming required to support the operation of these channel facilities.

Data capture, on the other hand, requires only a minimal amount of special hardware to move the data to or from the peripheral device, and the switchable interface controls 72 may be relatively simple. As a consequence, the data management support programming responsibilities of the secondary computer 35 are also minimal.

Responsibilities of the Main System — Once interface capture has been accomplished, the main system 10/12 is completely free of all further responsibility for control of the switchable interface 44 and its attached devices. Thus, interface capture transfers all such responsibility to the secondary system 35/72.

With data capture, however, the main system 10/12 performs all of its usual functions with the single exception of the data transfer itself. Thus, all responsibility for initial selection, termination, error-recovery, and other necessary program support remains with the main system 10/12.

Trade-Offs — In view of the distinctive characteristics of each capture procedure, there is a trade-off between complexity of the secondary system 35/72, on the one hand, and the amount of overhead removed from the main system 10/12, on the other. Interface capture is associated with greater complexity at the secondary system 35/72 and with essentially zero overhead at the main system 10/12, while the converse is true for data capture. Data capture, in fact, involves relatively little reduction in operating overhead at the main system 10/12 for the actual data transfer: only memory interference and space requirements are reduced; program support responsibilities are essentially unchanged, and the main system 10/12 does most of the work.

Nevertheless, it is important to note that, regardless of the procedure used, the data is never routed through main memory 10, and it is this fact that is of overall significance. Thus, while data capture requires use of main system 10/12 facilities to access the data space, it always removes the main system 10/12 overhead associated with inter-system data transfers between a secondary computer 35 and the main system 10/12.

In order to further emphasize this point, consider conventional inter-system data transfers of the aforementioned type for which the data is routed through the main system 10/12. The data transfer involes two steps, defined as follows — Step A: to/from the peripheral device from/to the main system 10/12; and, Step B: from/to the secondary system 35/50 to/from the main system 10/12. The capture procedures, on the other hand, perform the data transfer in a single step, Step A': to/from the peripheral device from/to the secondary system 35/72, thereby eliminating the routing of the data through the main computer 10. Thus, prior interface capture allows Step A' to be performed without further assistance from the main system 10/12. Data capture, on the other hand, performs Step A' with just about the same involvement of the main system 10/12 as for Step A of the conventional procedure; however, Step B is entirely eliminated, as it is with interface capture. Stated differently, data capture uses the resources of the main system 10/12 to perform Step A' in lieu of Step A, and this is the essence of data capture.

Finally, it should be noted that the use of data capture also permits the secondary computer 35 to draw upon the application program resources of the main computer 10, as in the case of the information retrieval embodiment described herein. Thus, while data capture removes less inter-system data transfer overhead from the main computer 10 than does interface capture, data capture may be performed with less applications programming support at the secondary computer 35. This may be the significant consideration for some applications.

Method of Execution

Initiation — Either capture procedure can be initiated by the secondary computer 35 at any time by requesting the main computer 10 to execute an appropriate capture program: the secondary computer 35 presents this request to the main computer 10 as a set of conventional job statements using the facilities of the inter-computer adapter 50. The only distinction here between the two capture procedures is in the information supplied by the job statements; the execution parameters for the two capture procedures are, of course, different.

Capture Programs — Both procedures require an application-type program at the main computer 10 whose execution effectively synchronizes capture.

In the case of interface capture there is only one capture program, and its sole function is to cause a preestablished capture key to be transmitted to the capture device specified in the aforementioned job statements which initiate execution of the capture program.

With data capture, on the other hand, there may be a variety of capture programs (called "data capture programs"), and the choice of a particular data capture program will depend upon the application. Each data capture program, however, has a common function: to cause, either directly or indirectly, the transmission to the capture device of a sequence of sync (synchronization) commands followed by a so-called capture command. The sync command/s may also transmit sync data to the capture device, but this is not necessarily a requirement.

Conditions for Switching — For interface capture a necessary condition for switching the switchable interface 44 to off-line mode is transmission of the capture key from the main system 10/12 to the capture device. The capture device must accept this data key and then disconnect normally from the switchable interface 44. These events, taken together, are the necessary and sufficient conditions for interface capture.

For data capture the conditions are somewhat different: First, the main system 10/12 must satisfy a series of one or more sync conditions. One type of sync condition, for example, is satisfied upon transmission to the capture device of an output sync command whose associated data ("sync data") matches a pre-established reference key. Another type of sync condition, on the other hand, is satisfied upon transmission to the capture device of an output sync command for which the sync data does not match the reference key. And, still another sync condition may be satisfied merely upon transmission of a sync command, independent of sync data. In any case, each application has its own set of sync conditions, and a necessary condition for data capture is that the sync conditions be satisfied. The procedure by which the secondary system 35/23 determines when the sync conditions have been satisfied is called "screening".

Once the sync conditions have been satisfied, the transmission to the capture device of a pre-defined capture command from the main system 10/12 is a sufficient condition for data capture. Thus, the sync conditions are chosen to assure that the capture command will be delivered solely by the requested data capture program and by no other program.

Moment of Switching to Off-Line Mode — Interface capture occurs upon completion of the channel-end status sequence which notifies the main system 10/12 that the capture device has accepted the capture key.

Data capture, on the other hand, occurs upon successful completion of the initial selection sequence for the capture command, that is, upon transmission to the main system 10/12 of zero initial status by the capture device.

Restoration to On-Line Mode — With the interface capture procedure, it is first necessary for the secondary system 35/72 to terminate all off-line activity on the switchable interface 44 and to place each capture device in a device-end pending state. The switchable interface 44 is then returned to the main system 10/12 at a moment that the interface 14 is effectively idle and no peripheral devices are operational.

In the case of data capture, restoration to on-line mode is automatic and occurs at once upon completion of the execution of the capture command by the capture device. The switchable interface 44 is returned to the channel 12 upon presentation of terminating status for the capture command, and the main channel 12 performs the customary termination sequence.

Indicated Application

Clearly, each capture procedure has its own characteristic features, and the choice of procedure for a given application will depend upon a variety of factors, such as the type of main channel 12, the characteristics of the main computer 10, and the nature of the capture device. In addition, there is also the matter of trade-off between capability of the switchable interface controls 72 and the amount of overhead removed from the main system 10/12. And, as the channel capability of the secondary system 35/72 is increased, so is the responsibility of the latter for supplying the necessary program support to operate these facilities.

In spite of the complexity of the matter it is nevertheless possible to make some generalizations. First of all, data capture is not suited for use with byte-multiplexor channels, nor is a selector channel the preferred channel for interface capture. Secondly, some devices are not "capturable", that is, they cannot be used as a vehicle for interface capture. Thus, if a non-capturable magnetic tape drive must be shared by both systems, only the data capture procedure can be used.

Another consideration involves whether or not the operation of a given device is amenable to screening, as in the case of a "system printer" (Reference 3). Here, it is not possible to establish a set of sync conditions, and consequently, only interface capture may be used if the normal operation of the printer is not to be disturbed. On the other hand, if the printer were a "private device", special main channel 12 programs could be constructed to provide the necessary sync commands, thereby permitting the use of data capture. This illustrates that it is not only the device itself which dictates the capture procedure, but also how that device is used by the main system 10/12.

In any case, the above considerations are representative of those that will be encountered by the system designer when selecting a particular capture procedure. In practice, despite the apparent complexity, the choice will be relatively straightforward in the context of a specific application.

I claim:

1. A multiprocessor computer system having at least one non-symmetrically shared item of peripheral equipment, comprising:
   a main computer,
   a secondary computer, and
   an intelligent switch connected to said main computer and to said secondary computer, said item of peripheral equipment being connected to said intelligent switch and switchable by said intelligent switch to said main computer or to said secondary computer, said item of peripheral equipment being initially switched to said main computer,
   wherein said main computer performs a predetermined first data transfer to said item of peripheral equipment, said intelligent switch comprising means for sensing said predetermined first data transfer, and
   said intelligent switch switches said item of peripheral equipment from said main computer to said secondary computer in response to the completion of said predetermined first data transfer.

2. The multiprocessor computer system of claim 1 wherein said secondary computer performs a predetermined second data transfer to said item of peripheral equipment switched to said secondary computer, said intelligent switch further comprising means for sensing said predetermined second data transfer, and
   said intelligent switch return-switches said item of peripheral equipment from said secondary computer to said main computer in response to the completion of said predetermined second data transfer.

3. The multiprocessor computer system of claim 1 further comprising:
   inter-computer communication means for said secondary computer to communicate with said main computer,
   wherein said secondary computer transmits a request message to said main computer through said inter-computer communication means,
   said predetermined first data transfer being performed by said main computer in response to said request message.

4. The multiprocessor computer system of claim 3 wherein:
   said inter-computer communication means comprises an inter-computer adapter connected to said main computer and to said secondary computer, said inter-computer adapter comprising means for said secondary computer to appear to said main computer as a standard, system-software supported item of peripheral equipment of said main computer.

5. The multiprocessor computer system of claim 1 further comprising:
   adapter means to enable said item of peripheral equipment to operate with said secondary computer.

6. The multiprocessor computer system of claim 1 wherein said secondary computer is a member of a set of secondary computers connected to said intelligent switch.

7. A multiprocessor computer system having at least one non-symmetrically shared item of peripheral equipment, said item of peripheral equipment having means to operate off-line for performance of off-line tasks and to generate at least one task-complete signal signalling completion of off-line operation, said multiprocessor computer system comprising:

a main computer, a secondary computer, and an intelligent switch connected to said main computer and to said secondary computer, said item of peripheral equipment being connected to said intelligent switch and switchable by said intelligent switch to said main computer or to said secondary computer, said item of peripheral equipment being initially switched to said main computer, wherein said main computer performs an output operation conditioning said item of peripheral equipment for a predetermined first off-line operation, said intelligent switch comprising monitor means to detect said conditioning and to sense the completion of said conditioning, said intelligent switch switching said item of peripheral equipment from said main computer to said secondary computer in response to the completion of said conditioning, and said item of peripheral equipment performing said predetermined first off-line operation and generating a first task-complete signal, said first task-complete signal being transmitted through said intelligent switch to said secondary computer.

8. The multiprocessor computer system of claim 7 wherein said secondary computer performs an output operation re-conditioning said item of peripheral equipment for a predetermined second off-line operation, said intelligent switch further comprising means to detect said re-conditioning and to sense the completion of said re-conditioning, said intelligent switch return-switching said item of peripheral equipment from said secondary computer to said main computer in response to the completion of said re-conditioning, and said item of peripheral equipment performing said predetermined second off-line operation and generating a second task-complete signal, said second task-complete signal being transmitted through said intelligent switch to said main computer.

9. The multiprocessor computer system of claim 7 wherein:

said item of peripheral equipment is a printer having a print-line data buffer, said conditioning comprises loading said print-line data buffer with predetermined data, and said predetermined first off-line operation comprises printing of said predetermined data.

10. The multiprocessor computer system of claim 7 wherein said secondary computer is a member of a set of secondary computers connected to said intelligent switch.

11. A multiprocessor computer system having a plurality of non-symmetrically shared items of peripheral equipment connected to a switchable interface, each item of said plurality of items of peripheral equipment having means to operate off-line for performance of off-line tasks and to generate at least one task-complete signal signalling completion of off-line operation, said multiprocessor computer system comprising:

a main computer having a main interface, a secondary computer having a secondary interface, inter-computer communication means for said secondary computer to communicate with said main computer, an intelligent switch connected to said main interface and to said secondary interface, said switchable interface being connected to said intelligent switch and switchable by said intelligent switch to said main interface or to said secondary interface, said switchable interface being initially switched to said main interface, wherein said main computer performs an output operation on each item of said plurality of items of peripheral equipment, one at a time, beginning with that item of peripheral equipment having the highest selection priority on said switchable interface and proceeding serially, in order of decreasing selection priority, to that item of peripheral equipment having the lowest selection priority on said switchable interface, each said output operation being performed in response to a request message from said secondary computer, said request message being transmitted to said main computer through said inter-computer communication means, and each said output operation conditioning each respective item of said plurality of items of peripheral equipment for a predetermined first off-line operation, said intelligent switch comprising monitor means to detect each said conditioning and to sense the completion of each said conditioning, said intelligent switch switching said switchable interface from said main interface to said secondary interface in response to the completion of said conditioning of each item of said plurality of items of peripheral equipment, each said item of said plurality of items of peripheral equipment performing its said predetermined first off-line operation and generating a first task-complete signal, each said first task-complete signal being transmitted through said intelligent switch to said secondary computer, said secondary computer transmitting a control signal to said intelligent switch and a said request message to said main computer, said transmitting being in response to each said first task-complete signal from each said item of said plurality of items of peripheral equipment other than the one item of said plurality of items of peripheral equipment having the lowest selection priority on said switchable interface, and said intelligent switch return-switching said switchable interface from said secondary interface to said main interface in response to each said control signal.

12. The multiprocessor computer system of claim 11 wherein said secondary computer performs an output operation on each item of said plurality of items of peripheral equipment re-conditioning each respective item of said plurality of items of peripheral equipment for a predetermined second off-line operation, said secondary computer transmitting a final control signal to said intelligent switch after all items of said plurality of items of peripheral equipment have each initiated said predetermined second off-line operation, and said intelligent switch return-switching said switchable interface from said secondary interface to said main interface in response to said final control signal.

13. The multiprocessor computer system of claim 11 wherein at least one said request message specifies the item of peripheral equipment upon which said output operation is to be performed.

14. The multiprocessor computer system of claim 11 wherein said secondary computer is a member of a set of secondary computers connected to said intelligent switch.

15. An intelligent switch providing means for a secondary computer of a multiprocessor computer system to capture an item of peripheral equipment while said item of peripheral equipment is in operation with a main computer of said multiprocessor computer system, said intelligent switch comprising:

switch means connected to said main computer and to said secondary computer, said item of peripheral equipment being connected to said switch means and switchable by said switch means to said main computer or to said secondary computer, said item of peripheral equipment being initially switched to said main computer, and monitor/capture controls connected to said switch means, said monitor/capture controls providing means for monitoring communication between said main computer and said item of peripheral equipment and for controlling said switch means, wherein said main computer performs a predetermined first data transfer to said item of peripheral equipment, and said monitor/capture controls sense said predetermined first data transfer and, in response to the completion of said predetermined first data transfer, cause said switch means to switch said item of peripheral equipment from said main computer to said secondary computer.

16. The intelligent switch of claim 15 wherein said monitor/capture controls further provide means for monitoring communication between said secondary computer and said item of peripheral equipment, wherein said secondary computer performs a predetermined second data transfer to said item of peripheral equipment switched to said secondary computer, and wherein said monitor/capture controls sense said predetermined second data transfer and, in response to the completion of said predetermined second data transfer, cause said switch means to return-switch said item of peripheral equipment from said secondary computer to said main computer.

17. The intelligent switch of claim 15 further comprising:

inter-computer communication means for said secondary computer to communicate with said main computer, wherein said secondary computer transmits a request message to said main computer through said inter-computer communication means, said predetermined first data transfer being performed by said main computer in response to said request message.

18. The intelligent switch of claim 17 wherein:

said inter-computer communication means comprises an inter-computer adapter connected to said main computer and to said secondary computer, said inter-computer adapter comprising means for said secondary computer to appear to said main computer as a standard, system-software supported item of peripheral equipment of said main computer.

19. The intelligent switch of claim 15 further comprising:

adapter means to enable said item of peripheral equipment to operate with said secondary computer, said switch means being connected to said secondary computer through said adapter means.

20. The intelligent switch of claim 15 wherein said secondary computer is a member of a set of secondary computers connected to said intelligent switch.

21. An intelligent switch providing means for a secondary computer of a multiprocessor computer system to capture an item of peripheral equipment while said item of peripheral equipment is in operation with a main computer of said multiprocessor computer system, said item of peripheral equipment having means to operate off-line for performance of off-line tasks and to generate at least one task-complete signal signalling completion of off-line operation, said intelligent switch comprising:

switch means connected to said main computer and to said secondary computer, said item of peripheral equipment being connected to said switch means and switchable by said switch means to said main computer or to said secondary computer, said item of peripheral equipment being initially switched to said main computer, and monitor/capture controls connected to said switch means, said monitor/capture controls providing means (1) for detecting the conditioning by said main computer of said item of peripheral equipment for a predetermined first off-line operation, and (2) for controlling said switch means, wherein said main computer performs said conditioning of said item of peripheral equipment, and said monitor/capture controls detect said conditioning and, in response to the completion of said conditioning, cause said switch means to switch said item of peripheral equipment from said main computer to said secondary computer, said item of peripheral equipment performing said predetermined first off-line operation and generating a first task-complete signal, said first task-complete signal being transmitted through said switch means to said secondary computer.

22. The intelligent switch of claim 21 wherein said monitor/capture controls further provide means for detecting re-conditioning by said secondary computer of said item of peripheral equipment for a predetermined second off-line operation, wherein said secondary computer performs said re-conditioning of said item of peripheral equipment, and wherein said monitor/capture controls detect said re-conditioning and, in response to the completion of said re-conditioning, cause said switch means to return-switch said item of peripheral equipment from said secondary computer to said main computer, said item of peripheral equipment performing said predetermined second off-line operation and generating a second task-complete signal, said second task-complete signal being transmitted through said switch means to said main computer.

23. The intelligent switch of claim 21 wherein:

said item of peripheral equipment is a printer having a print-line data buffer, said conditioning comprises loading said print-line data buffer with predetermined data, and said predetermined first off-line operation comprises printing of said predetermined data.

24. The intelligent switch of claim 21 wherein said secondary computer is a member of a set of secondary computers connected to said intelligent switch.

25. An intelligent switch providing means for a secondary computer of a multiprocessor computer system to capture a plurality of items of peripheral equipment connected to a switchable interface while said plurality of items of peripheral equipment is in operation with a main computer of said multiprocessor computer system, said main computer having a main interface, said secondary computer having a secondary interface, and each item of said plurality of items of peripheral equipment having means to operate off-line for performance of off-line tasks and to generate at least one task-complete signal signalling completion of off-line operation, said intelligent switch comprising:

inter-computer communication means for said secondary computer to communicate with said main computer, switch means connected to said main interface and to said secondary interface, said switchable interface being connected to said switch means and switchable by said switch means to said main interface or to said secondary interface, said switchable interface being initially switched to said main interface, and monitor/capture controls connected to said switch means, said monitor/capture controls providing means (1) for detecting the conditioning by said main computer of any item of said plurality of items of peripheral equipment for a predetermined first off-line operation, and (2) for controlling said switch means, wherein said main computer performs said conditioning of each item of said plurality of items of peripheral equipment, one at a time, beginning with that item of peripheral equipment having the highest selection priority on said switchable interface and proceeding serially, in order of decreasing selection priority, to that item of peripheral equipment having the lowest selection priority on said switchable interface, each said conditioning being performed in response to a request message from said secondary computer, said request message being transmitted to said main computer through said inter-computer communication means, said monitor/capture controls detecting each said conditioning and, in response to the completion of each said conditioning, causing said switch means to switch said switchable interface from said main interface to said secondary interface, each said item of said plurality of items of peripheral equipment performing its said predetermined first off-line operation and generating a first task-complete signal, each said first task-complete signal being transmitted through said switch means to said secondary computer, said secondary computer transmitting a control signal to said monitor/capture controls and a said request message to said main computer, said transmitting being in response to each said first task-complete signal from each said item of said plurality of items of peripheral equipment other than the one item of said plurality of items of peripheral equipment having the lowest selection priority on said switchable interface, and said monitor/capture controls responding to each said control signal by causing said switch means to return-switch said switchable interface from said secondary interface to said main interface.

26. The intelligent switch of claim 25 wherein said secondary computer (1) performs an output operation on each item of said plurality of items of peripheral equipment re-conditioning each respective item of said plurality of items of peripheral equipment for a predetermined second off-line operation, and (2) transmits a final control signal to said monitor/capture controls after all items of said plurality of items of peripheral equipment have each initiated said predetermined second off-line operation, said monitor/capture controls responding to said final control signal by causing said switch means to return-switch said switchable interface from said secondary interface to said main interface.

27. The intelligent switch of claim 25 wherein at least one said request message specifies the item of peripheral equipment upon which said output operation is to be performed.

28. The intelligent switch of claim 25 wherein said secondary computer is a member of a set of secondary computers connected to said intelligent switch.

29. A multiprocessor computer system having at least one non-symmetrically shared item of peripheral equipment, comprising:

a main computer, a secondary computer, and an intelligent switch connected to said main computer and to said secondary computer, said item of peripheral equipment being connected to said intelligent switch and switchable by said intelligent switch to said main computer or to said secondary computer, said item of peripheral equipment being initially switched to said main computer, wherein said main computer performs at least one input/output operation conditioning said item of peripheral equipment for data transfer in a predetermined direction, said intelligent switch comprising monitor means to detect said conditioning and to sense the completion of said conditioning, said intelligent switch switching said item of peripheral equipment from said main computer to said secondary computer in response to the completion of said conditioning, and said secondary computer performing capture data transfer in said predetermined direction with said item of peripheral equipment.

30. The multiprocessor computer system of claim 29 wherein:

said intelligent switch further comprises means to sense the end of said capture data transfer between said secondary computer and said item of peripheral equipment, and said intelligent switch return-switches said item of peripheral equipment from said secondary computer to said main computer in response to said end of said capture data transfer.

31. The multiprocessor computer system of claim 29 wherein:

said intelligent switch further comprises dummy control means to perform dummy data transfer in said predetermined direction with said main computer, and said dummy control means performs said dummy data transfer in response to said completion of said conditioning.

32. The multiprocessor computer system of claim 29 further comprising:

inter-computer communication means for said secondary computer to communicate with said main computer, wherein said secondary computer transmits a request message to said main computer through said inter-computer communication means, said input/output operation being performed by said main computer in response to said request message.

33. The multiprocessor computer system of claim 32 wherein:

said inter-computer communication means comprises an inter-computer adapter connected to said main computer and to said secondary computer said inter-computer adapter comprising means for said secondary computer to appear to said main computer as a standard, system-software supported item of peripheral equipment of said main computer.

34. The multiprocessor computer system of claim 32 wherein said request message identifies a particular direction of data transfer for which said item of peripheral equipment is to be conditioned, said predetermined direction of data transfer established by said main computer being said particular direction.

35. The multiprocessor computer system of claim 29 further comprising:

adapter means to enable said item of peripheral equipment to perform said capture data transfer with said secondary computer.

36. The multiprocessor computer system of claim 29 wherein:

said conditioning comprises an initial selection sequence, said completion of said conditioning comprises the completion of said initial selection sequence, and said switching occurs after said completion of said initial selection sequence and before the initiation of said capture data transfer with said item of peripheral equipment.

37. The multiprocessor computer system of claim 29 wherein said secondary computer is connected to said monitor means and preconditions said monitor means to detect said conditioning.

38. The multiprocessor computer system of claim 34 wherein said secondary computer is connected to said monitor means and preconditions said monitor means to detect said conditioning.

39. The multiprocessor computer system of claim 29 wherein said secondary computer is a member of a set of secondary computers connected to said intelligent switch.

40. The multiprocessor computer system of claim 29 wherein said main computer is connected to said monitor means and preconditions said monitor means to detect said conditioning.

41. The multiprocessor computer system of claim 34 wherein said main computer is connected to said monitor means and preconditions said monitor means to detect said conditioning.

42. The multiprocessor computer system of claim 31 wherein said intelligent switch further comprises means to detect parity errors occurring during capture data transfers from said item of peripheral equipment to said secondary computer, said intelligent switch detecting a parity error during a capture data transfer to said secondary computer and responding by causing at least one item of data of said dummy data transfer to said main computer to have incorrect parity, said item of data thereby indicating said parity error to said main computer.

43. A multiprocessor computer system having at least one non-symmetrically shared item of peripheral equipment, comprising:

a main computer, a secondary computer, inter-computer communication means for said secondary computer to communicate with said main computer, and an intelligent switch connected to said main computer and to said secondary computer, said item of peripheral equipment being connected to said intelligent switch and switchable by said intelligent switch to said main computer or to said secondary computer, said item of peripheral equipment being initially switched to said main computer, wherein said secondary computer transmits a request message to said main computer through said inter-computer communication means, said request message identifying a particular direction of data transfer for which said item of peripheral equipment is to be conditioned by said main computer, said main computer responding to said request message by performing at least one input/output operation conditioning said item of peripheral equipment for data transfer in said particular direction identified by said request message, said intelligent switch comprising monitor means for monitoring communication between said main computer and said item of peripheral equipment, said monitor means being preconditioned by said secondary computer to detect said connditioning, said intelligent switch switching said item of peripheral equipment from said main computer to said secondary computer in response to the completion of said conditioning detected by said monitor means, said secondary computer performing capture data transfer in said particular direction with said item of peripheral equipment, said intelligent switch further comprising means to sense the end of said capture data transfer, said intelligent switch return-switching said item of peripheral equipment from said secondary computer to said main computer in response to the end of said capture data transfer, and said item of peripheral equipment signalling said main computer that said item of peripheral equipment has completed data transfer operations.

44. The multiprocessor computer system of claim 43 wherein said secondary computer is a member of a set of secondary computers connected to said intelligent switch.

45. A multiprocessor computer system having at least one non-symmetrically shared item of peripheral equipment, said item of peripheral equipment having a plurality of storage locations for storing data and containing therein a particular data field among a plurality of data fields, said multiprocessor computer system comprising:
- a main computer,
- a secondary computer, and
- an intelligent switch connected to said main computer and to said secondary computer, said item of peripheral equipment being connected to said intelligent switch and switchable by said intelligent switch to said main computer or to said secondary computer, said item of peripheral equipment being initially switched to said main computer,
- wherein said main computer performs at least one input/output operation conditioning said item of peripheral equipment for data transfer in a predetermined direction with said particular data field, said intelligent switch comprising monitor means to detect said conditioning and to sense the completion of said conditioning,
- said intelligent switch switching said item of peripheral equipment from said main computer to said secondary computer in response to the completion of said conditioning, and
- said secondary computer performing capture data transfer in said predetermined direction with said particular data field located within said item of peripheral equipment.

46. The multiprocessor computer system of claim 45 wherein said secondary computer is a member of a set of secondary computers connected to said intelligent switch.

47. The multiprocessor computer system in claim 45 wherein:
- said intelligent switch further comprises means to sense the end of said capture data transfer between said secondary computer and said item of peripheral equipment, and
- said intelligent switch return-switches said item of peripheral equipment from said secondary computer to said main computer in response to said end of said capture data transfer.

48. The multiprocessor computer system of claim 45 further comprising:
- inter-computer communication means for said secondary computer to communicate with said main computer,
- wherein said secondary computer transmits a request message to said main computer through said inter-computer communication means,
- said input-output operation being performed by said main computer in response to said request message.

49. The multiprocessor computer system of claim 48 wherein said request message identifies a particular direction of data transfer for which said item of peripheral equipment is to be conditioned, said predetermined direction of data transfer established by said main computer being said particular direction.

50. The multiprocessor computer system of claim 45 wherein said secondary computer is connected to said monitor means and preconditions said monitor means to detect said conditioning.

51. The multiprocessor computer system of claim 49 wherein said secondary computer is connected to said monitor means and preconditions said monitor means to detect said conditioning.

52. The multiprocessor computer system of claim 45 wherein said main computer is connected to said monitor means and preconditions said monitor means to detect said conditioning.

53. The multiprocessor computer system of claim 49 wherein said main computer is connected to said monitor means and preconditions said monitor means to detect said conditioning.

54. The multiprocessor computer system of claim 48 wherein:
- said request message contains at least one field-identification parameter identifying said particular data field with which said data transfer is to be performed, said main computer having means to determine from said field-identification parameter the location address of said particular data field within said item of peripheral equipment,
- said main computer responds to said request message by determining from said field-identification parameter said location address of said particular data field, and
- said conditioning of said item of peripheral equipment includes the transmission of said location address to said item of peripheral equipment.

55. The multiprocessor computer system of claim 54 wherein said secondary computer is connected to said monitor means and preconditions said monitor means to detect said conditioning.

56. The multiprocessor computer system of claim 48 wherein:
- said plurality of data fields comprise keyed data fields and said request message contains at least one field-identification parameter identifying said particular data field with which said data transfer is to be performed, said main computer having means to determine from said field-identification parameter the identification key of said particular data field,
- said main computer responds to said request message by determining from said field-identification parameter said identification key, and
- said conditioning of said item of peripheral equipment includes the transmission of said identification key to said item of peripheral equipment.

57. The multiprocessor computer system of claim 56 wherein said secondary computer is connected to said monitor means and preconditions said monitor means to detect said conditioning.

58. The multiprocessor computer system of claim 57 wherein said secondary computer comprises means to determine a reference key, said reference key being identical with said identification key, and
- the preconditioning of said monitor means by said secondary computer to detect said conditioning comprises transmitting said reference key to said monitor means.

59. The multiprocessor computer system of claim 45 wherein:
- said item of peripheral equipment is a direct-access auxiliary storage device,
- said plurality of storage locations for storing data is a plurality of tracks, and
- said particular data field is the data field of at least one particular formatted record located on at least one track of said plurality of tracks.

60. The multiprocessor computer system of claim 54 wherein said main computer is connected to said monitor means and preconditions said monitor means to detect said conditioning.

61. The multiprocessor computer system of claim 56 wherein said main computer is connected to said monitor means and preconditions said monitor means to detect said conditioning.

62. A multiprocessor computer system having at least one non-symmetrically shared item of peripheral equipment, said item of peripheral equipment having a plurality of storage locations for storing data and containing therein a particular data field among a plurality of keyed data fields, said multiprocessor computer system comprising:
 a main computer,
 a secondary computer,
 inter-computer communication means for said secondary computer to communicate with said main computer, and
 an intelligent switch connected to said main computer and to said secondary computer, said item of peripheral equipment being connected to said intelligent switch and switchable by said intelligent switch to said main computer or to said secondary computer, said item of peripheral equipment being initially switched to said main computer,
 wherein said secondary computer transmits a request message to said main computer through said inter-computer communication means, said request message containing at least one identification parameter identifying (1) a particular direction of data transfer for which said item or peripheral equipment is to be conditioned by said main computer and (2) said particular data field with which said data transfer is to be performed, said main computer having means to determine from said identification parameter the location address and the identification key of said particular data field located within said item of peripheral equipment,
 said main computer responding to said request message by (1) determining from said identification parameter said location address and said identification key of said particular data field, and (2) performing at least one input/output operation conditioning said item of peripheral equipment for data transfer in said particular direction with said particular data field, said conditioning including the transmission of said location address and said identification key to said item of peripheral equipment,
 said intelligent switch comprising monitor means for monitoring communication between said main computer and said item or peripheral equipment, said monitor means being preconditioned by aid secondary computer to detect said conditioning,
 said intelligent switch switching said item of peripheral equipment from said main computer to said secondary computer in response to the completion of said conditioning detected by said monitor means,
 said secondary computer performing capture data transfer in said particular direction with said particular data field, said intelligent switch further comprising means to sense the end of said capture data transfer,
 said intelligent switch return-switching said item of peripheral equipment from said secondary computer to said main computer in response to the end of said capture data transfer, and
 said item of peripheral equipment signalling said main computer that said item of peripheral equipment has completed data transfer operations.

63. The multiprocessor computer system of claim 62 wherein said secondary computer comprises means to determine a reference key, said reference key being identical with said identification key, and
 the preconditioning of said monitor means by said secondary computer to detect said conditioning comprises transmitting said reference key to said monitor means.

64. The multiprocessor computer system of claim 62 wherein said secondary computer is a member of a set of secondary computers connected to said intelligent switch.

65. An intelligent switch providing means for a secondary computer of a multiprocessor computer system to capture an item of peripheral equipment while said item of peripheral equipment is in operation with a main computer of said multiprocessor computer system, said intelligent switch comprising:
 switch means connected to said main computer and to said secondary computer, said item of peripheral equipment being connected to said switch means and switchable by said switch means to said main computer or to said secondary computer, said item of peripheral equipment being initially switched to said main computer, and
 monitor/capture controls connected to said switch means, said monitor/capture controls providing means for detecting the conditioning by said main computer of said item of peripheral equipment for data transfer in a predetermined direction and for controlling said switch means,
 wherein said main computer performs said conditioning of said item of peripheral equipment, and
 said monitor/capture controls detect said conditioning and, in response to the completion of said conditioning, cause said switch means to switch said item of peripheral equipment from said main computer to said secondary computer,
 said secondary computer performing capture data transfer in said predetermined direction with said item of peripheral equipment.

66. The intelligent switch of claim 65 wherein:
 said monitor/capture controls further provide means for detecting the end of said capture data transfer between said secondary computer and said item or peripheral equipment, and
 said monitor/capture controls detect the end of said capture data transfer and in response cause said switch means to return-switch said item of peripheral equipment from said secondary computer to said main computer.

67. The intelligent switch of claim 65 wherein:
 said monitor/capture controls further provide dummy control means for performing dummy data transfer in said predetermined direction with said main computer, and
 said dummy control means performs said dummy data transfer in response to said completion of said conditioning.

68. The intelligent switch of claim 65 further comprising:
 inter-computer communication means for said secondary computer to communicate with said main computer,
 wherein said secondary computer transmits a request message to said main computer through said inter-computer communication means,
 said conditioning being performed by said main computer in response to said request message.

69. The intelligent switch of claim 68 wherein:

said inter-computer communication means comprises an inter-computer adapter connected to said main computer and to said secondary computer, said inter-computer adapter comprising means for said secondary computer to appear to said main computer as a standard, system-software supported item of peripheral equipment of said main computer.

70. The intelligent switch of claim 68 wherein said request message identifies a particular direction of data transfer for which said item of peripheral equipment is to be conditioned, said predetermined direction of data transfer established by said main computer being said particular direction.

71. The intelligent switch of claim 65 further comprising:
adapter means to enable said item of peripheral equipment to perform said capture data transfer with said secondary computer.

72. The intelligent switch of claim 65 wherein:
said conditioning comprises an initial selection sequence,
said completion of said conditioning comprises the completion of said initial selection sequence, and
said switching occurs after said completion of said initial selection sequence and before the initiation of said capture data transfer with said item of peripheral equipment.

73. The intelligent switch of claim 65 wherein said secondary computer is connected to said monitor/capture controls and preconditions said monitor/capture controls to detect said conditioning.

74. The intelligent switch of claim 70 wherein said secondary computer is connected to said monitor/capture controls and preconditions said monitor/capture controls to detect said conditioning.

75. The intelligent switch of claim 65 wherein said main computer is connected to said monitor/capture controls and preconditions said monitor/capture controls to detect said conditioning.

76. The intelligent switch of claim 70 wherein said main computer is connected to said monitor/capture controls and preconditions said monitor/capture controls to detect said conditioning.

77. The intelligent switch of claim 67 further comprising means to detect parity errors occurring during capture data transfers from said item of peripheral equipment to said secondary computer,
wherein said intelligent switch detects a parity error during a capture data transfer to said secondary computer and responds by causing at least one item of data of said dummy data transfer to said main computer to have incorrect parity, said item of data thereby indicating said parity error to said main computer.

78. The intelligent switch of claim 65 wherein said secondary computer is a member of a set of secondary computers connected to said intelligent switch.

79. An intelligent switch providing means for a secondary computer of a multiprocessor computer system to capture an item of peripheral equipment while said item of peripheral equipment is in operation with a main computer of said multiprocessor computer system, said intelligent switch comprising:
inter-computer communication means for said secondary computer to comunicate with said main computer,
switch means connected to said main computer and to said secondary computer, said item of peripheral equipment being connected to said switch means and switchable by said switch means to said main computer or to said secondary computer, said item of peripheral equipment being initially switched to said main computer, and
monitor/capture controls connected to said switch means, said monitor/capture controls providing means for (1) monitoring communication between said main computer and said item of peripheral equipment, (2) monitoring communication between said secondary computer and said item of peripheral equipment, and (3) controlling said switch means,
wherein said secondary computer transmits a request message to said main computer through said inter-computer communication means, said request message identifying a particular direction of data transfer for which said item of peripheral equipment is to be conditioned by said main computer,
said main computer responding to said request message by performing at least one input/output operation conditioning said item of peripheral equipment for data transfer in said particular direction identified by said request message, said monitor/capture controls being preconditioned by said secondary computer to detect said conditioning,
said monitor/capture controls detecting said conditioning and, in response to the completion of said conditioning, causing said switch means to switch said item of peripheral equipment from said main computer to said secondary computer,
said secondary computer performing capture data transfer in said particular direction with said item of peripheral equipment,
said monitor/capture controls detecting the end of said capture data transfer and in response causing said switch means to return-switch said item of peripheral equipment from said secondary computer to said main computer, and
said item of peripheral equipment signalling said main computer that said item of peripheral equipment has completed data transfer operations.

80. The intelligent switch of claim 79 wherein said secondary computer is a member of a set of secondary computers connected to said intelligent switch.

81. An intelligent switch providing means for a secondary computer of a multiprocessor computer system to capture a particular data field among a plurality of data fields located within an item of peripheral equipment having a plurality of storage locations for storing data, said capture occurring while said item of peripheral equipment is in operation with a main computer of said multiprocessor computer system, said intelligent switch comprising:
switch means connected to said main computer and to said secondary computer, said item of peripheral equipment being connected to said switch means and switchable by said switch means to said main computer or to said secondary computer, said item of peripheral equipment being initially switched to said main computer, and
monitor/capture controls connected to said switch means, said monitor/capture controls providing means (1) for detecting the conditioning by said main computer of said item of peripheral equipment for data transfer in a predetermined direction with said particular data field, and (2) for controlling said switch means, wherein said main computer performs said conditioning of said item of peripheral equipment, and said monitor/capture controls detect said conditioning and, in response to the completion of said conditioning, cause said switch means to switch said item of peripheral equipment from said main computer to said secondary computer, said secondary computer performing capture data transfer in said predetermined direction with said particular data field located within said item of peripheral equipment.

82. The intelligent switch of claim 81 wherein said secondary computer is a member of a set of secondary computers connected to said intelligent switch.

83. The intelligent switch of claim 81 wherein:

said monitor/capture controls further provide means for detecting the end of said capture data transfer between said secondary computer and said item of peripheral equipment, and said monitor/capture controls detect the end of said capture data transfer and in response cause said switch means to return-switch said item of peripheral equipment from said secondary computer to said main computer.

84. The intelligent switch of claim 81 further comprising:

inter-computer communication means for said secondary computer to comunicate with said main computer, wherein said secondary computer transmits a request message to said main computer through said inter-computer communication means, said conditioning being performed by said main computer in response to said request message.

85. The intelligent switch of claim 84 wherein said request message identifies a particular direction of data transfer for which said item of peripheral equipment is to be conditioned, said predetermined direction of data transfer established by said main computer being said particular direction.

86. The intelligent switch of claim 81 wherein said secondary computer is connected to said monitor/capture controls and preconditions said monitor/capture controls to detect said conditioning.

87. The intelligent switch of claim 85 wherein said secondary computer is connected to said monitor/capture controls and preconditions said monitor/capture controls to detect said conditioning.

88. The intelligent switch of claim 81 wherein said main computer is connected to said monitor/capture controls and preconditions said monitor/capture controls to detect said conditioning.

89. The intelligent switch of claim 84 wherein:

said request message contains at least one field-identification parameter identifying said particular data field with which said data transfer is to be performed, said main computer having means to determine from said field-identification parameter the location address of said particular data field within said item of peripheral equipment, said main computer responds to said request message by determining from said field-identification parameter said location address of said particular data field, and said conditioning of said item of peripheral equipment includes the transmission of said location address to said item of peripheral equipment.

90. The intelligent switch of claim 89 wherein said secondary computer is connected to said monitor/capture controls and preconditions said monitor/capture controls to detect said conditioning.

91. The intelligent switch of claim 84 wherein:

said plurality of data fields comprise keyed data fields and said request message contains at least one field-identification parameter identifying said particular data field with which said data transfer is to be performed, said main computer having means to determine from said field-identification parameter the identification key of said particular data field, said main computer responds to said request message by determining from said field-identification parameter said identification key, and said conditioning of said item of peripheral equipment includes the transmission of said identification key to said item of peripheral equipment.

92. The intelligent switch of claim 91 wherein said secondary computer is connected to said monitor/capture controls and preconditions said monitor/capture controls to detect said conditioning.

93. The intelligent switch of claim 92 wherein said secondary computer comprises means to determine a reference key, said reference key being identical with said identification key, and the preconditioning of said monitor/capture controls by said secondary computer to detect said conditioning comprises transmitting said reference key to said monitor/capture controls.

94. The intelligent switch of claim 81 wherein:

said item of peripheral equipment is a direct-access auxiliary storage device, said plurality of storage locations for storing data is a plurality of tracks, and said particular data field is the data field of at least one particular formatted record located on at least one track of said plurality of tracks.

95. The intelligent switch of claim 85 wherein said main computer is connected to said monitor/capture controls and preconditions said monitor/capture controls to detect said conditioning.

96. The intelligent switch of claim 89 wherein said main computer is connected to said monitor/capture controls and preconditions said monitor/capture controls to detect said conditioning.

97. The intelligent switch of claim 91 wherein said main computer is connected to said monitor/capture controls and preconditions said monitor/capture controls to detect said conditioning.

98. The intelligent switch of claim 91 wherein said secondary computer is a member of a set of secondary computers connected to said intelligent switch.

99. An intelligent switch providing means for a secondary computer of a multiprocessor computer system to capture a particular data field among a plurality of keyed data fields located within an item of peripheral equipment having a plurality of storage locations for storing data, said capture occurring while said item of peripheral equipment is in operation with a main computer of said multiprocessor computer systems, said intelligent switch comprising:

inter-computer communication means for said secondary computer to communicate with said main computer, switch means connected to said main computer and to said secondary computer, said item of peripheral equipment being connected to said switch means and switchable by said switch means to said main computer or to said secondary computer, said item of peripheral equipment being initially switched to said main computer, and monitor/capture controls connected to said switch means, said monitor/capture controls providing means for (1) monitoring communication between said main computer and said item of peripheral equipment, (2) monitoring communication between said secondary computer and said item of peripheral equipment, and (3) controlling said switch means, wherein said secondary computer transmits a request message to said main computer through said inter-computer communication means, said request message containing at least one identification parameter identifying (1) a particular direction of data transfer for which said item of peripheral equipment is to be conditioned by said main computer and (2) said particular data field with which said data transfer is to be performed, said main computer having means to determine from said identification parameter the location address and the identification key of said particular data field located within said item of peripheral equipment, said main computer responding to said request message by (1) determining from said identification parameter said location address and said identification key of said particular data field, and (2) performing at least one input/output operation conditioning said item of peripheral equipment for data transfer in said particular direction with said particular data field, said conditioning including the transmission of said location address and said identification key to said item of peripheral equipment, said monitor/capture controls being preconditioned by said secondary computer to detect said conditioning, said monitor/capture controls detecting said conditioning and, in response to the completion of said conditioning, causing said switch means to switch said item of peripheral equipment from said main computer to said secondary computer, said secondary computer performing capture data transfer in said particular direction with said particular data field, said monitor/capture controls detecting the end of said capture data transfer and in response causing said switch means to return-switch said item of peripheral equipment from said secondary computer to said main computer, and said item of peripheral equipment signalling said main computer that said item of peripheral equipment has completed data transfer operations.

100. The intelligent switch of claim 99 wherein said secondary computer is a member of a set of secondary computers connected to said intelligent switch.

101. The intelligent switch of claim 99 wherein said secondary computer comprises means to determine a reference key, said reference key being identical with said identification key, and the preconditioning of said monitor/capture controls by said secondary computer to detect said conditioning comprises transmitting said reference key to said monitor/capture controls.

102. A multiprocessor computer system having at least one non-symmetrically shared item of peripheral equipment, comprising:

a main computer, a secondary computer, and an intelligent switch connected to said main computer and to said secondary computer, said item of peripheral equipment being connected to said intelligent switch and switchable by said intelligent switch to said main computer or to said secondary computer, said item of peripheral equipment being initially switched to said main computer, wherein said main computer exchanges control signals with said item of peripheral equipment, said intelligent switch comprising monitor means to detect said control signals, and said intelligent switch switches said item of peripheral equipment from said main computer to said secondary computer in response to the detection of at least one predetermined control signal.

103. The multiprocessor computer system of claim 102 wherein said secondary computer is a member of a set of secondary computers connected to said intelligent switch.

104. A multiprocessor computer system having at least one non-symmetrically shared item of peripheral equipment, comprising:

a main computer, a secondary computer, and an intelligent switch connected to said main computer and to said secondary computer, said item of peripheral equipment being connected to said intelligent switch and switchable by said intelligent switch to said main computer or to said secondary computer while said item of peripheral equipment is in operation, said item of peripheral equipment being initially switched to said main computer, wherein said main computer causes said item of peripheral equipment to perform at least one predetermined input/output operation, said intelligent switch comprising monitor means to monitor the operation of said item of peripheral equipment, and said intelligent switch switches said item of peripheral equipment from said main computer to said secondary computer while said item of peripheral equipment is executing said predetermined input/output operation.

105. The multiprocessor computer system of claim 104 wherein said secondary computer is a member of a set of secondary computers connected to said intelligent switch.

106. The multiprocessor computer system of claim 104 wherein:

said item of peripheral equipment switched to said secondary computer terminates said predetermined input/output operation after connection to said secondary computer, said secondary computer subsequently causes said item of peripheral equipment to perform at least one predetermined second input/output operation, said intelligent switch return-switches said item of peripheral equipment from said secondary computer to said main computer while said item of peripheral equipment is executing said predetermined second input/output operation, and said item of peripheral equipment terminates said predetermined second input/output operation after re-connection to said main computer.

107. The multiprocessor computer system of claim 104 wherein:

said item of peripheral equipment switched to said secondary computer performs capture data transfer with said secondary computer, said capture data transfer being part of said predetermined input/output operation, said intelligent switch return-switches said item of peripheral equipment from said secondary computer to said main computer in response to the completion of said capture data transfer, and said item of peripheral equipment signals said main computer that said item of peripheral equipment has completed data transfer operations.

108. An intelligent switch providing means for a secondary computer of a multiprocessor computer system to capture an item of peripheral equipment while said item of peripheral equipment is in operation with a main computer of said multiprocessor computer system, said intelligent switch comprising:

switch means connected to said main computer and to said secondary computer, said item of peripheral equipment being connected to said switch means and switchable by said switch means to said main computer or to said secondary computer, said item of peripheral equipment being initially switched to said main computer, and monitor/capture controls connected to said switch means, said monitor/capture controls providing means for monitoring control signals between said main computer and said item of peripheral equipment and for controlling said switch means, wherein said main computer exchanges said control signals with said item of peripheral equipment, said control signals including at least one predetermined control signal, and said monitor/capture controls detect said predetermined control signal and in response cause said switch means to switch said item of peripheral equipment from said main computer to said secondary computer.

109. The intelligent switch of claim 108 wherein said secondary computer is a member of a set of secondary computers connected to said intelligent switch.

110. An intelligent switch providing means for a secondary computer of a multiprocessor computer system to capture an item of peripheral equipment while said item of peripheral equipment is in operation with a main computer of said multiprocessor computer system, said intelligent switch comprising:

switch means connected to said main computer and to said secondary computer, said item of peripheral equipment being connected to said switch means and switchable by said switch means to said main computer or to said secondary computer while said item of peripheral equipment is in operation, said item of peripheral equipment being initially switched to said main computer, and monitor/capture controls connected to said switch means, said monitor/capture controls providing means for monitoring the operation of said item of peripheral equipment and for controlling said switch means, wherein said main computer causes said item of peripheral equipment to perform at leat one predetermined input/output operation, and said monitor/capture controls detect said predetermined input/output operation and cause said switch means to switch said item of peripheral equipment from said main computer to said secondary computer while said item of peripheral equipment is executing said predetermined input/output operation.

111. The intelligent switch of claim 110 wherein said secondary computer is a member of a set of secondary computers connected to said intelligent switch.

112. The intelligent switch of claim 110 wherein:

said item of peripheral equipment switched to said secondary computer terminates said predetermined input/output operation after connection to said secondary computer, said secondary computer subsequently causes said item of peripheral equipment to perform at least one predetermined second input/output operation, said monitor/capture controls detect said predetermined second input/output operation and cause said switch means to return-switch said item of peripheral equipment from said secondary computer to said main computer while said item of peripheral equipment is executing said predetermined second input/output operation, and said item of peripheral equipment terminates said predetermined second input/output operation after re-connection to said main computer.

113. The intelligent switch of claim 110 wherein:

said item of peripheral equipment switched to said secondary computer performs capture data transfer with said secondary computer, said capture data transfer being part of said predetermined input/output operation, said monitor/capture controls detect the end of said capture data transfer and in response cause said switch means to return-switch said item of peripheral equipment from said secondary computer to said main computer, and said item of peripheral equipment signals said main computer that said item of peripheral equipment has completed data transfer operations.

114. The multiprocessor computer system of claim 64 wherein said identification key contains an identification code identifying the particular secondary computer to which said item of peripheral equipment is to be switched in response to said completion of said conditioning.

115. The intelligent switch of claim 98 wherein said identification key contains an identification code identifying the particular secondary computer to which said item of peripheral equipment is to be switched in response to said completion of said conditioning.

116. The intelligent switch of claim 100 wherein said identification key contains an identification code identifying the particular secondary computer to which said item of peripheral equipment is to be switched in response to said completion of said conditioning.

117. The multiprocessor computer system of claim 56 wherein said secondary computer is a member of a set of secondary computers connected to said intelligent switch.

118. The multiprocessor computer system of claim 117 wherein said identification key contains an identification code identifying the particular secondary comuter to which said item of peripheral equipment is to be switched in response to said completion of said conditioning.

119. A computer subsystem providing means for a secondary computer of a multiprocessor computer system to capture a particular data field among a plurality of keyed data fields located within a shared direct-access auxiliary storage item of peripheral equipment, said item of peripheral equipment having a plurality of tracks for storing data, each of said tracks having a unique track address, said plurality of tracks containing said plurality of keyed data fields, and each of said keyed data fields being identified by a unique identification key, said computer subsystem comprising:

a main computer, inter-computer communication means for said secondary computer to communicate with said main computer, and an intelligent switch connected to said main computer and to said secondary computer, said item of peripheral equipment being connected to said intelligent switch and switchable by said intelligent switch to said main computer or to said secondary computer, said item of peripheral equipment being initially switched to said main computer, wherein said secondary computer transmits a request message to said main computer through said inter-computer communication means, said request message containing at least one identification parameter identifying (1) a particular direction of data transfer for which said item of peripheral equipment is to be conditioned by said main computer and (2) said particular data field with which said data transfer is to be performed, said main computer having means to determine from said identification parameter the track address and the identification key of said particular data field located within said item of peripheral equipment, said main computer responding to said request message by (1) determining from said identification parameter said track address and said identification key of said particular data field, and (2) performing at least one input/output operation conditioning said item of peripheral equipment for data transfer in said particular direction with said particular data field, said conditioning including the transmission of said track address and said identification key to said item of peripheral equipment, said intelligent switch comprising monitor means for monitoring communication between said main computer and said item of peripheral equipment, said monitor means being preconditioned by said main computer to detect said conditioning, said intelligent switch switching said item of peripheral equipment from said main computer to said secondary computer in response to the completion of said conditioning detected by said monitor means, said secondary computer performing capture data transfer in said particular direction with said particular data field, said intelligent switch further comprising means to sense the end of said capture data transfer, said intelligent switch return-switching said item of peripheral equipment from said secondary computer to said main computer in response to the end of said capture data transfer, and said item of peripheral equipment signalling said main computer that said item of peripheral equipment has completed data transfer operations.

* * * * *